(12) United States Patent
Rieffanaugh, Jr.

(10) Patent No.: US 7,613,708 B2
(45) Date of Patent: Nov. 3, 2009

(54) HUMAN CREDIT RESOURCE NETWORKING METHOD

(76) Inventor: Neal King Rieffanaugh, Jr., 2840 Roena Ave., P.O. Box 39878, Los Angeles, CA (US) 90039

( * ) Notice: Subject to any disclaimer, the term of this patent is extended or adjusted under 35 U.S.C. 154(b) by 457 days.

(21) Appl. No.: 10/651,903

(22) Filed: Aug. 29, 2003

(65) Prior Publication Data

US 2004/0153472 A1 Aug. 5, 2004

Related U.S. Application Data

(63) Continuation-in-part of application No. 10/355,343, filed on Jan. 31, 2003.

(60) Provisional application No. 60/493,651, filed on Aug. 7, 2003.

(51) Int. Cl.
*G06F 17/30* (2006.01)
(52) U.S. Cl. ............................. 707/100; 707/3; 707/10; 707/101; 707/102
(58) Field of Classification Search .................. None
See application file for complete search history.

(56) References Cited

U.S. PATENT DOCUMENTS

| | | | | |
|---|---|---|---|---|
| 5,978,768 | A | * | 11/1999 | McGovern et al. ............. 705/1 |
| 6,049,776 | A | * | 4/2000 | Donnelly et al. ............... 705/8 |
| 6,385,620 | B1 | * | 5/2002 | Kurzius et al. ............ 707/104.1 |
| 6,578,008 | B1 | * | 6/2003 | Chacker ........................ 705/10 |
| 6,742,002 | B2 | * | 5/2004 | Arrowood ................. 707/104.1 |
| 6,757,674 | B2 | * | 6/2004 | Wiens et al. .................... 707/3 |
| 2002/0133369 | A1 | * | 9/2002 | Johnson .......................... 705/1 |
| 2003/0101067 | A1 | * | 5/2003 | Duran et al. .................... 705/1 |
| 2003/0139938 | A1 | * | 7/2003 | Meyers ........................... 705/1 |
| 2003/0177027 | A1 | * | 9/2003 | DiMarco ........................ 705/1 |
| 2003/0182171 | A1 | * | 9/2003 | Vianello ......................... 705/9 |

* cited by examiner

*Primary Examiner*—Khanh B Pham
(74) *Attorney, Agent, or Firm*—Raymond Y. Chan; David and Raymond Patent Firm

(57) ABSTRACT

A Human Resource Networking System, which is a novel Method establishing a business system for locating, identifying, promoting and assisting in the employing of career project workers in the non-career workforce, includes a Relational Database comprising an Industry Credit Inductive Lineage Construct Matrix containing People Elements, Places Elements, Projects Elements, and Things Elements derived from People Information, Places Information, Project Elements, and Things Elements; a plurality of Credit Constructs each of which is formed by associating two or more of the People Elements, the Places Elements, the Projects Elements, and the Things Elements and stored in the Industry Credit Inductive Lineage Construct Matrix of the Relational Database; and a Display Device for outputting Credit Bytes generated by combining the Credit Constructs upon query.

91 Claims, 73 Drawing Sheets

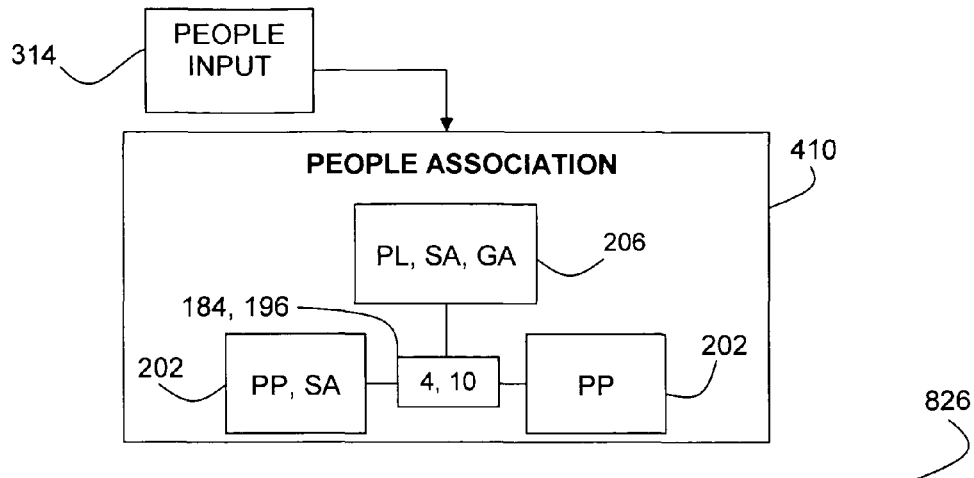

PL – PLACE, SA – SOLO ARTIST, GA – GROUP ARTIST, PP – PEOPLE

A PEOPLE ASSOCIATION MAY BE CONSTRUCTED USING THE FOLLOWING PARENT-CHILD ASSOCIATIONS.

ONE PLACE TO MANY PEOPLE:
- THE PLACE EMPLOYS THE PEOPLE
- THE PLACE REPRESENTS THE PEOPLE

ONE SOLO ARTIST TO ONE OR TO MANY PEOPLE:
- THE PERSON PERFORMS AS THE SOLO ARTIST
- THE PEOPLE ARE EMPLOYED BY THE SOLO ARTIST
- THE PERSON INSTRUCTED THE ARTIST

ONE GROUP ARTIST TO MANY SOLO ARTISTS:
- THE SOLO ARTISTS ARE MEMBERS OF THE GROUP

ONE GROUP ARTIST TO ONE OR TO MANY PEOPLE:
- THE PEOPLE ARE EMPLOYED BY THE GROUP

A PEOPLE ASSOCIATION MAY ALSO BE CONSTRUCTED AS A SINGLE ELEMENT.

ONE PERSON:
- THE PERSON IS FREELANCE (OR INDEPENDENT)

ASSOCIATIVE VALUE:
4 – VALUES FOR PEOPLE TO PLACES 184 E.G. "EMPLOY, PERFORM, REPRESENT, MEMBER, FREELANCE"

DEFINITIONS
PEOPLE – PERFORMED AN EFFORT THAT CONTRIBUTED TO THE DEVELOPMENT OR PRODUCTION OF A PRODUCT OR PROJECT

FIG. 4b

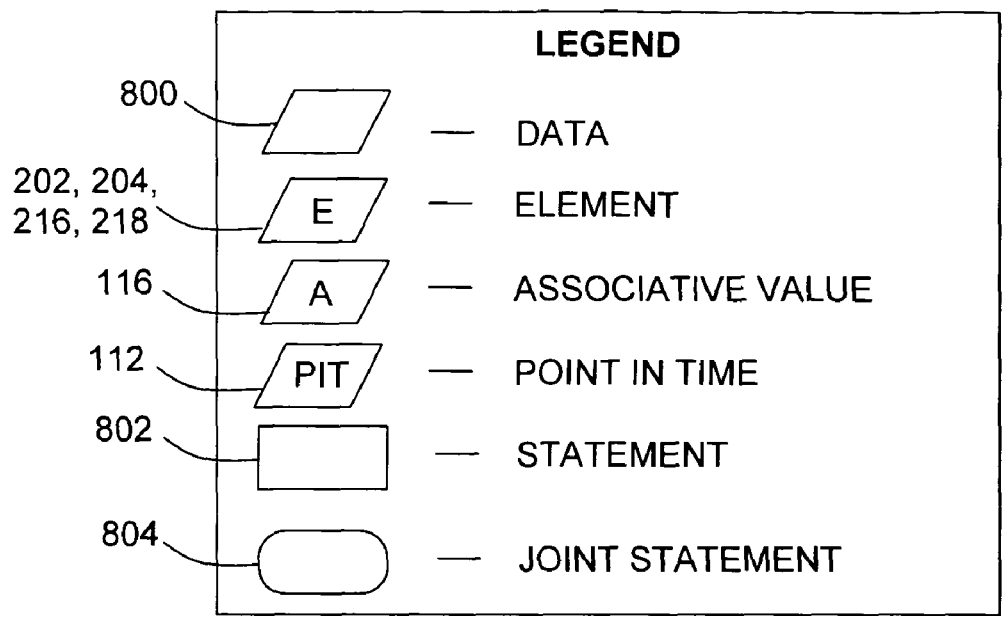

| | LEGEND | |
|---|---|---|
| 800 | ▱ | — DATA |
| 202, 204, 216, 218 | ▱ E | — ELEMENT |
| 116 | ▱ A | — ASSOCIATIVE VALUE |
| 112 | ▱ PIT | — POINT IN TIME |
| 802 | ▭ | — STATEMENT |
| 804 | ⬭ | — JOINT STATEMENT |

CREDIT DATA (302) IS DATA THAT IS SUBMITTED. CREDIT BITS (102) ARE ELEMENTS (202, 204, 216, 218), ASSOCIATIVE VALUES (116), AND POINT IN TIME (112). CREDIT INSTANCES (164) ARE FOUR ELEMENTS JOINED BY THREE ASSOCIATIVE VALUES, WITH A POINT IN TIME. CREDIT BYTES (164) ARE TWO, THREE, OR FOUR ELEMENTS JOINED BY ONE, TWO, OR THREE ASSOCIATIVE VALUES. CREDIT BYTES ARE EXTRACTED (890) AND INFERRED (864) FROM CREDIT INSTANCES (200). THE PROJECT SENTENCES OF CREDIT CONSTRUCT (554, 580, 600, 612) REPORT THE ELEMENTS PEOPLE (202), PLACES (204), PROJECTS (216), AND THINGS (218) IN A FORMAT PREDETERMINED BY THE QUERY'S PERSPECTIVE (624, 626, 628, 630) FROM THE PEOPLE CREDIT BYTES (166), PLACES CREDIT BYTES (168), PROJECTS CREDIT BYTES (170), AND THINGS CREDIT BYTES (172). HENCE EACH ELEMENT IN A PROJECT SENTENCE OF CREDIT CONSTRUCT REFLECTS THE PERSPECTIVE OF THAT PROJECT SENTENCE OF CREDIT CONSTRUCT QUERY. THIS PERSPECTIVE IS A PROJECT SENTENCE OF CREDIT CONSTRUCT'S "POINT OF VIEW" [SEE FIG.16A].

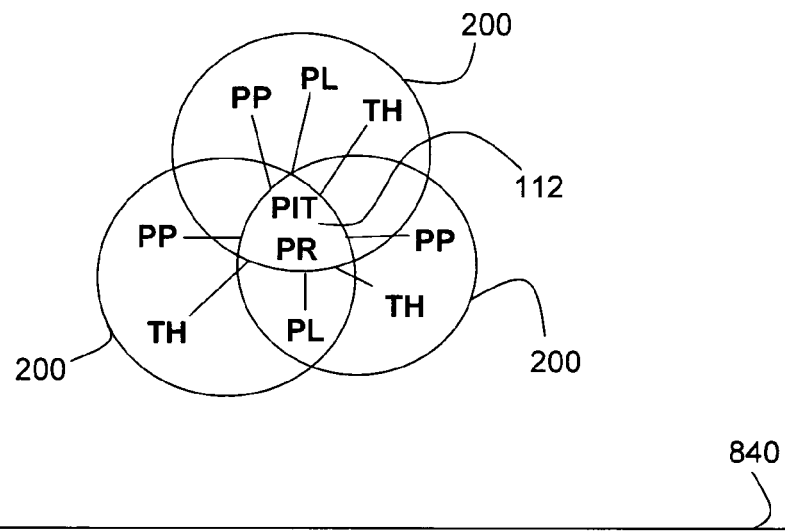

INTERSECTING INSTANCES IS A SPECIAL CASE OF OVERLAPPING. DATA SETS THAT REPRESENT EVENTS DO NOT INTERSECT IF THE POINTS IN TIME VALUE IS DIFFERENT. IF THE PROJECT AND THE POINT IN TIME FOR THE CONSTRUCTS ARE EQUAL, THEN THE INSTANCES INTERSECT. INTERSECTING INSTANCES ALLOW INFERENCES TO BE MADE. AN EXAMPLE OF AN INFERENCE IS "THESE TWO PEOPLE WORKED TOGETHER". IN AN INTEFERENCE, THE RELATIONSHIP BETWEEN TWO ELEMENTS IS KNOWN, THOUGH THIS INFORMATION IS NOT INPUT.

FIG. 10c

| PROJETS | | | PEOPLE | | | |
|---|---|---|---|---|---|---|
| *PROJECT* | *ASSOC.* | *PARENT* | *PERSON* | *ASSOC.* | *PARENT* | *ROLE* |
| CRUNCH HOUR 2 - SOUNDTRACK | USED | CRUNCH HOUR 2 | JOHN SMITH | FREE-LANCE | | MIXED |
| CRUNCH HOUR 2 - SOUNDTRACK | USED | CRUNCH HOUR 2 | MATT MARSHALL | PERFORMER | DJ QUERY | LEAD VOCAL |
| CRUNCH HOUR 2 - SOUNDTRACK | USED | CRUNCH HOUR 2 | JOHN SMITH | FREE-LANCE | | PRODUCED |
| PLACES | | | | THINGS | | | |
| *PLACE* | *ASSOC.* | *PARENT* | *CONTR.* | *THING* | *ASSOC.* | *PARENT* | *UTIL.* |
| STUDIO 1 | OPERATE | SOUND-CASTLE | AUDIO POST | SSL G+ CLASSIC | MANUF-ACTURER | SOLID STATE LOGIC | MIX |
| STUDIO 1 | OPERATE | SOUND-CASTLE | AUDIO POST | | | | |

548

TO COMBINE CREDIT INSTANCES 200 INTO A PROJECT SENTENCE OF CREDIT CONSTRUCT:
1. SELECT ALL CONSTRUCTS CONTAINING THE ELEMENT CORRESPONDING TO THE REPORT
2. EXTRACT CONSTRUCT VALUES INTO LINES IN THE ABOVE QUERY FORMAT
3. FOR EACH LINE, OUTPUT THE ROLE, PLACE, CONTRIBUTION, PROJECT, UTILIZATION, AND THING
FORMAT THE OUTPUTTED VALUES ACCORDING TO THE DOCUMENT TEMPLATE SPECIFICATIONS AND PARAMETERS, CREATING HYPERLINKS IF AVAILABLE

526

TO DRILL-DOWN CREDIT INSTANCES 200 INTO A SEARCH RETURN:
1. CONFORM THE SEARCH CRITERIA INTO THE ABOVE QUERY FORMAT
2. LOCATE ALL CONSTRUCTS THAT CONTAIN THE QUERY CRITERIA VALUES
   ◆ IF THE SEARCH IS IN CONJUNCTION, THE CONSTRUCTS MUST INTERSECT
   ◆ IF THE SEARCH IS NOT IN CONJUNCTION, THE CONSTRUCTS MAY OR MAY NOT INTERSECT
3. FOR EACH LOCATED CONSTRUCT, OUTPUT THE RELATIONAL INFORMATION ACCORDING TO THE ELEMENT TYPE THAT IS BEING SEARCHED
FORMAT THE OUTPUTTED INFORMATION ACCORDING TO DOCUMENT TEMPLATE SPECIFICATIONS

FIG. 15

[PEOPLE NAME]

[PROFESSIONAL/PEOPLE NAME]
AKA: [AKA]

POINT OF CONTACT:
[POC NAME]
[POC TYPE: *DEFAULT: CONSUMER*]:
[POC DETAIL]

HEADSHOT

LATEST PRESS RELEASE:
[PRESS RELEASE TITLE]
TAGLINE:XXXXXXXXXXXX

PROFILE OR HIGHLIGHTS
[UP TO 500 CHARACTER DESCRIPTION
XXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXX]

HIGHLIGHTS
- [HIGHLIGHT XXXXXXXXXXXXXXXXXXXXXXXXXXXXXXXXXXXXX]
- [HIGHLIGHT XXXXXXXXXXXXXXXXXXXXXXXXXXXXXXXXXXXXX]
- [HIGHLIGHT XXXXXXXXXXXXXXXXXXXXXXXXXXXXXXXXXXXXX]
- [HIGHLIGHT XXXXXXXXXXXXXXXXXXXXXXXXXXXXXXXXXXXXX]
- [HIGHLIGHT XXXXXXXXXXXXXXXXXXXXXXXXXXXXXXXXXXXXX]

SKILLS & TALENTS
- [SKILL/TALENT NAME]: [SKILL/TALENT DESCRIPTION XXXXXXXXXX]
- [SKILL/TALENT NAME]: [SKILL/TALENT DESCRIPTION XXXXXXXXXX]
- [SKILL/TALENT NAME]: [SKILL/TALENT DESCRIPTION XXXXXXXXXX]
- [SKILL/TALENT NAME]: [SKILL/TALENT DESCRIPTION XXXXXXXXXX]

MEDIASTYLING

| IMAGE WITH / WITHOUT POP-UP DATA LINK OR VIRTUAL IMAGE TOUR (PER REAL ESTATE MODEL) | IMAGE WITH / WITHOUT POP-UP DATA LINK OR VIRTUAL IMAGE TOUR (PER REAL ESTATE MODEL) | IMAGE WITH / WITHOUT POP-UP DATA LINK OR VIRTUAL IMAGE TOUR (PER REAL ESTATE MODEL) |
|---|---|---|

CLICK FOR ADDITIONAL ATTRIBUTES

COPY HERE (100-350 WORDS) XXXXXXXXXXXXX
XXXXXXXXXXXXXXXXXXXXXXXXXXXXXXXXX

FIG. 17a

FEATURED CREDITS

[MEDIA CATEGORY]

"PROJECT NAME" ([PROJECT TYPE] : [PROJECT GENRE]) [PUBLICATION DATE]: [FEATURED INDIVIDUAL] ([OWNER])
° [ROLE]: [PLACE NAME] ([THING NAME])

AWARDS
- [AWARD] ([STATUS]) [YEAR] - [AWARD CATEGORY]: [PROJECT NAME]

RELATED AWARDS
- [AWARD] ([STATUS]) [YEAR]- [AWARD CATEGORY]: [RECIPIENT] - [PROJECT NAME]

AFFILIATIONS
- [ORG. NAME] ([ORG. TYPE]) – YEARS ACTIVE: [YEARS ACTIVE] [POSITION HELD] [YEAR]

EDUCATION
- [DEGREE TYPE] [DEGREE] ([SCHOOL]) – MINOR: [MINOR] [DEGREE DESCRIPTION]
- [SCHOOL] - [COURSE OF STUDY] [COURSE OF STUDY DESCRIPTION]

ADDITIONAL CONTACTS

[PEOPLE NAME]
[STREET ADDRESS]
[CITY], [STATE/PROVINCE] [ZIP/POSTAL CODE] [COUNTRY]

[CONTACT NAME]:[CONTACT VALUE]
[CONTACT NAME]:[CONTACT VALUE]

FOR PROFESSIONAL CONTACT INFORMATION CLICK HERE

UP TO 350 CHARACTER DESCRIPTION SUMMARY ACTS AS A FOLLOW UP LETTER. THE WEB PRESS KIT OWNER THANKS THEM FOR VISITING THE SITE AND INVITES THEM TO VISIT THEIR OTHER SITES, WHETHER THEY ARE IN SHOWTOWN, SHOWTRADE, SHOWCHAT, WHATEVERXXXXXXXXXXXXXXXXXXXXXXXXXXXX

FIG. 17b

| THE SHOWTOWN COMMUNITY RESOURCE LOCATOR | SEARCH SHOWTOWN |
|---|---|
| PEOPLE \| PLACES \| PROJECTS \| THINGS | [_____] (GO) |

| THE MINI EPK WED 12-31-03 | [PROFESSIONAL/PEOPLE NAME] |
|---|---|

1ST INITIAL LAST INITIAL

- HOME PAGE
- FEATURED CREDITS
  o MUSIC — 954
  o THEATER — 956
  o MOVIES — 958
  o RADIO — 960
  o TELEVISION — 962
  o MULTIMEDIA — 964
  o THE WEB — 966
  o OTHER — 968
- ADDITIONAL CREDITS

MINI EPK LINKS

SHOWWIRE
PRESS RELEASE

SHOWTRADE
*MY E-STOREFRONT*

SHOWCHAT
*INDUSTRY POLL*

SHOWTOWN
*TOWNSHIP*

SHOWLINKS
*PRESS KIT*

[PROFESSIONAL/PEOPLE NAME]

AKA: [AKA]

LOGO *ADDITIONAL CREDITS* LOGO

— 952     — 930

- "PROJECT NAME" ([PROJECT TYPE] : [PROJECT GENRE])
  [PUBLICATION DATE]: [FEATURED INDIVIDUAL] ([OWNER])
  o [ROLE]: [PLACE NAME] ([THING NAME])
  ⇑                                                        1092
- "PROJECT NAME" ([PROJECT TYPE] : [PROJECT GENRE])

*ROLLOVER POP UP:*
  SUBMITTED 8/15/02 BY JOHN SMITH (USER RATING: 9 OF 10)

942

- "PROJECT NAME" ([PROJECT TYPE] : [PROJECT GENRE])
  WIP: [FEATURED INDIVIDUAL] ([OWNER])
  o [ROLE]: [PLACE NAME] ([THING NAME])
  950
- "PROJECT NAME" ([PROJECT TYPE] : [PROJECT GENRE])
  [PUBLICATION DATE]: [FEATURED INDIVIDUAL] ([OWNER])
  o [ROLE]: [PLACE NAME] ([THING NAME])

*DISCLAIMER: ADDITIONAL CREDITS MIGHT NOT BE CHOSEN BY THIS MINI EPK'S OWNER AND MAY ALSO REFERENCE UPCOMING PROJECTS WHOSE WORK-IN-PROGRESS "WIP" IS SUBJECT TO CHANGE.

TOUR SHOWTOWN.COM >>
Showscape | Mediawalk | Showire | Showlinks | Showtrade | Peopleads | Showchat
Copyright 2003, Showtown Is Patent Pending And A Registered Trademark Of Buddy King Inc. All Rights Reserved. Use Of This Website Constitues Your Acceptance Of Showtown Privacy Policy And Terms & Conditions

PHYSICAL ATTRIBUTES – JOHN SMITH

SEX: MALE
ETHNICITY: CAUCASIAN, MIDDLE EASTERN
REGIONAL PREFERENCE: SOUTH WEST U.S., ASIA
AGE: 62
EYES: HAZEL
HAIR COLOR: BLUE
HAIR LENGTH: MEDIUM, SHOULDER
HAIR TYPE: STRAIGHT
HEIGHT: 6'8
PHYSIQUE: SLENDER
LANGUAGES: ENGLISH, JAPANESE, RUSSIAN
ACCENT: YIDDISH
WARDROBE: CASUAL, UPSCALE, GRUNGE, GUTTER PUNK
SHIRT: ADULT SMALL
SLEEVE: 28
NECK: 14
JACKET: 38S
BUST: 38D
DRESS: N/A
HIP: 8
WAIST: 12
INSEAM: 30
SHOE: 14
SPECIAL: DANCE, BALLET, MODELING, ACTING
SKILLS: UNDERWATER BASKET WEAVING, JOGGING, ROLLERBLADING
UNIQUE: WILL COLOR HAIR
DOUBLES: ROBERT BLEK, ROB DA NERO
STUNT WORK: EXPERIENCED

| SHOWTOWN COMMUNITY RESOURCE LOCATOR | SEARCH SHOWLINKS |
|---|---|
| PEOPLE \| PLACES \| PROJECTS \| THINGS | [_____] GO |

| SIGN IN | *SHOWTOWN'S* SHOWLINKS *PROMOTING AND NETWORKING AMERICA'S ENTERTAINMENT!* | ICON |
|---|---|---|

| SHOWSCAPE DISTRICTS | Music \| Theater \| Radio \| Movies \| Television \| Multimedia \| *The* Web \| Other |
|---|---|

▷ ENTERTAIN. DIRECTORY
▷ TOWNSHIPS

SHOWLINKS OVERVIEW

SHOWLINKS WEB TOUR

SHOWLINKS EDITOR

SCIN NEWSLETTER

SHOWTOWN SITE MAP

SHOWTOWN COMMUNITY

▷ HOME
▷ *SHOWLINKS*
▷ MEDIAWALK
▷ SHOWIRE
▷ SHOWTRADE
▷ PEOPLEADS
▷ SHOWCHAT
▷ SCiN

WELCOME TO THE SHOWLINKS NATIONAL ENTERTAINMENT COMMUNITY DIRECTORY!

★ Seattle, Chicago, New York, Hollywood, Atlanta, Dallas, Nashville

*SHOWLINKS PROMOTES AMERCIA'S LOCAL ENTERTAINMENT VENUES VIA NATIONAL INDUSTRY CREDITS!*

SHOWLINKS

| TO INFORM | TO PROMOTE | TO NETWORK |
|---|---|---|

LOCAL COMMUNITY ENTERTAINMENT MISSION:
XXXXXXXXXXXXXXXXXXXXXXXXX
XXXXXXXXXXXXXXXXXXXXXXXXX

WELCOME VISITOR
WED 12-31-03

LOCAL ENTER-TAINMENT
XXXXXXXXXX
XXXXXXXXXX
XXXXXXXXXX

BUILD A TOWNSHIP
XXXXXXXXXX
XXXXXXXXXX
XXXXXXXXXX

SHOWLINKS EDITOR
XXXXXXXXXX
XXXXXXXXXX
XXXXXXXXXX

Tour Showtown World Wide Communities >>

Copyright 2003. Showtown® is a patent pending application and a registered trademark of Buddy King, Inc. dba "The Showtown Group." All Rights Reserved! Use of this website constitutes YOUR acceptance of Showtown Privacy Policy and Terms & Conditions.

FIG. 21b

| SHOWTOWN COMMUNITY RESOURCE LOCATOR | | | | SEARCH SHOWIRE | |
|---|---|---|---|---|---|
| PEOPLE | PLACES | PROJECTS | THINGS | [_____] | GO |

| SIGN IN | SHOWTOWN'S SHOWIRE ENTERTAINMENT INDUSTRY NEWS...AS IT HAPPENS! | ICON |
|---|---|---|

| MEDIA NEWS LOCATOR | Music | Theater | Radio | Movies | Television | Multimedia | *The* Web | Other |
|---|---|---|---|---|---|---|---|---|

▷ MINI EPK NEWS
▷ SUBMIT A PRESS RELEASE

SHOWIRE OVERVIEW

SHOWIRE WEB TOUR

SHOWIRE EDITOR

SCIN NEWSLETTER

SHOWTOWN SITE MAP

SHOWTOWN COMMUNITY

▷ HOME
▷ SHOWLINKS
▷ MEDIAWALK
▷ *SHOWIRE*
▷ SHOWTRADE
▷ PEOPLEADS
▷ SHOWCHAT
▷ SCiN

SHOWiRE NEWS SERVICES
✓ ALL ENTERTAINMENT NEWS EMANATE DIRECTLY FROM OUR WEB PRESS RELEASE NEWS SERVICE! AN INTERACTIVE SERVICE ALLOWING INDUSTRY NEWS TO BE PUBLISHED IN MINUTES HERE FIRST!

✓ NEWS IS CATEGORIZED, AND IN THE FUTURE WILL BE DISTRIBUTED TO QUALIFIED JOURNALISTS, ANALYSTS, AND CONSUMER ORGANIZATIONS VIA RELEVANT ENTERTAINMENT INTEREST AND NEWS WORTHINESS!

TODAY'S TOP NEWS HEADLINES:

XXXXXXXXXXXXXXXXX
   XXXXXXXXXXXXXXXXXXXXXXX
XXXXXXXXXXXXXXXXX
   XXXXXXXXXXXX

MORE

WELCOME VISITOR
WED 12-31-03

COMMUNITY HIGHLIGHTS
XXXXXXXXXX
xxxxxxxxxx

NETWORK HIGHLIGHTS
XXXXXXXXXX
xxxxxxxxxx

PRESS RELEASES
XXXXXXXXXX
xxxxxxxxxx

SCIN NEWSLETTER
XXXXXXXXXX
XXXXXXXXXX
XXXXXXXXXX
XXXXXXXXXX
XXXXXXXXXX
XXXXXXXXXX
xxxxxxxxx Banner Ad Tour Showtown World Wide Communities >>

Copyright 2003. Showtown® is a patent pending application and a registered trademark of Buddy King, Inc. dba "The Showtown Group." All Rights Reserved! Use of this website constitutes YOUR acceptance of Showtown Privacy Policy and Terms & Conditions.

FIG. 21d

| SHOWTOWN COMMUNITY RESOURCE LOCATOR | SEARCH PEOPLEADS |
|---|---|
| PEOPLE \| PLACES \| PROJECTS \| THINGS | [_____] (GO) |

| SIGN IN | SHOWTOWN'S PEOPLEADS <br> *THE ENTERTAINMENT AND IT SKILLS CLASSIFIEDS!* | ICON |
|---|---|---|

| EMPLOYMENT LOCATOR | Music \| Theater \| Radio \| Movies \| Television \| Multimedia \| *The* Web \| Other |
|---|---|

▷ SEARCH JOBS
▷ MY PRESSUME
▷ EMPLOYERS
▷ ROBOCRUITER

PEOPLEADS OVERVIEW

PEOPLEADS WEB TOUR

PEOPLEADS EDITOR

SCIN NEWSLETTER

SHOWTOWN SITE MAP

SHOWTOWN COMMUNITY

▷ HOME
▷ SHOWLINKS
▷ MEDIAWALK
▷ SHOWIRE
▷ SHOWTRADE
▷ *PEOPLEADS*
▷ SHOWCHAT
▷ SCiN

PROMOTING YOUR SKILLS AND TALENTS IN PEOPLEADS...

Pressume

NETWORKING YOUR INDUSTRY CREDITS WITH INDUSTRY CREDITS!

YOUR INDUSTRY WORKFORCE FULFILLMENT HOUSE!

FOR OUR RESEARCH, WE SHOULD CHECK ON THE AMOUNT OF SCHOOLS WITH ENTERTAINMENT STUDIES. OUR MISSION: TO START WITH SCHOOLS THEN BRANCH INTO A FULL JOB SERVICE FOR RELATED ENTERTAINMENT AND IT INDUSTRIES.

IN THE BEGINNING, OUR SOLE SOURCE OF INCOME WILL BE DERIVED FROM BANNER ADVERTISING! THEN WE BEGIN CHARGING 1) COMPANIES FOR REGISTERING, 2) PEOPLE WILL PAY FOR PRESSUMES/OPTIONS, AND FOR BANNER ADVERTISING. THESE PRESSUME ADS HAVE LINKS TO REELS ON MEDIAWALK!

WELCOME VISITOR
WED 12-31-03

PEOPLEADS HIGHLIGHTS
XXXXXXXXXX
xxxxxxxxxx

PEOPLEADS WORKFORCE
XXXXXXXXXX
xxxxxxxxxx

PRESSUMES
XXXXXXXXXX
XXXXXXXXXX
xxxxxxxxxx

SHOWBYTES
XXXXXXXXXX
XXXXXXXXXX
XXXXXXXXXX
XXXXXXXXXX
XXXXXXXXXX
XXXXXXXXXX
XXXXXXXXXX

Tour Showtown World Wide Communities >>

Copyright 2003. Showtown® is a patent pending application and a registered trademark of Buddy King, Inc. dba "The Showtown Group."All Rights Reserved! Use of this website constitutes YOUR acceptance of Showtown Privacy Policy and Terms & Conditions.

FIG. 21f

| SHOWTOWN COMMUNITY RESOURCE LOCATOR | | | | SEARCH SHOWCHAT | |
|---|---|---|---|---|---|
| PEOPLE | PLACES | PROJECTS | THINGS | [_____] | GO |

| | SHOWTOWN'S | |
|---|---|---|
| SIGN IN | SHOWCHAT | ICON |
| | *"INDUSTRY POLLS, BB'S AND ENTERTAINMENT RESEARCH!"* | |

| RESEARCH LOCATOR | Music | Theater | Radio | Movies | Television | Multimedia | *The* Web | Other |
|---|---|---|---|---|---|---|---|---|

▷ MINI EPK POLLS

| | ICON | MR. SHOWTOWN WELCOMES EVERYONE TO SHOWCHAT. IF THERE'S A SUBJECT YOU WOULD LIKE TO DISCUSS, RESEARCH OR PONDER, WHETHER IT'S A PRODUCT, A SCHOOL, AN ENTERTAINMENT TOPIC, OR STORY CONCEPT, AND WHETHER IT'S FOR FUN OR PROFIT, MR. SHOWTOWN INVITES YOU TO CONTACT ONE OF OUR RESEARCH BOARDS. WE INVITE YOU TO USE OUR SERVICES FOR FUN OR PROFIT. CAN WE CHAT...? -THE EDITOR | WELCOME VISITOR WED 12-31-03 |
|---|---|---|---|

SHOWCHAT OVERVIEW
SHOWCHAT WEB TOUR
SHOWCHAT EDITOR
SCIN NEWSLETTER
SHOWTOWN SITE MAP

FEATURED STORY
XXXXXXXXXX
XXXXXXXXXX

TODAYS BIG CHAT
XXXXXXXXXX
XXXXXXXXXX

MESSAGE BOARDS
XXXXXXXXXX
XXXXXXXXXX

SHOWCHAT EXAMINES THIS WEEKS HOT TOPIC'S!

SHOWTOWN COMMUNITY
▷ HOME
▷ SHOWLINKS
▷
▷ SHOWIRE
▷ SHOWTRADE
▷ PEOPLEADS
▷ *SHOWCHAT*
▷ SCiN

THE SHOWCHAT RESEARCH CENTER

| WEB PRESS KIT | PROFESSIONAL | STUDENTS | CONSUMERS |
|---|---|---|---|
| XXXXXXXXXX | XXXXXXXXXX | XXXXXXXXXX | XXXXXXXXXX |

BANNER AD

Tour Showtown World Wide Communities >>

Copyright 2003. Showtown® is a patent pending application and a registered trademark of Buddy King, Inc. dba "The Showtown Group."All Rights Reserved! Use of this website constitutes YOUR acceptance of Showtown Privacy Policy and Terms & Conditions.

FIG. 21g

| ShowTown | | Africa  Pacific  Central America  Europe  N. America | S. Am |
|---|---|---|---|
| WORLD WIDE | colspan="3" | *Our Mission...To Inform, Promote, To Network And To Educate...* | |

ShowTown World Wide

THE SHOWTOWN GROUP

WORLD WIDE RESOURCES  *NETWORKING ENTERTAINMENT WORLD WIDE!*

▷ PEOPLE
▷ PLACES
▷ PROJECTS
▷ THINGS

WORLD WIDE ENTERTAINMENT

▷ PEOPLE
▷ PLACES
▷ PROJECTS
▷ THINGS

SEARCH SHOWTOWN WORLD WIDE

GO

SHOWTOWN WORLD WIDE HQ.
HOLLYWOOD CALIFORNIA USA

North America ★ Europe Asia Africa South America Austr.

Tour Showtown.COM>>

Copyright 2003. Showtown® is a patent pending application and a registered trademark of Buddy King, Inc. dba "The Showtown Group." All Rights Reserved! Use of this website constitutes YOUR acceptance of Showtown Privacy Policy and Terms & Conditions.

FIG. 21i

| SHOWTOWN COMMUNITY RESOURCE LOCATOR | SEARCH PEOPLEADS |
|---|---|
| PEOPLE \| PLACES \| PROJECTS \| THINGS | [_____] GO |

| SIGN IN | SHOWTOWN'S SHOWSCAPE ICON |
|---|---|
| | *THE ENTERTAINMENT AND IT SKILLS CLASSIFIEDS!* |

SHOWSCAPE SERVICES | Music | Theater | Radio | Movies | Television | Multimedia | *The* Web | Other

▷ ABOUT SHOWSCAPE
▷ SUBMIT A URL

SHOWSCAPE OVERVIEW

SHOWSCAPE WEB TOUR

SHOWSCAPE EDITOR

SCIN NEWSLETTER

SHOWTOWN SITE MAP

SHOWTOWN COMMUNITY

▷ HOME
▷ SHOWLINKS
▷ MEDIAWALK
▷ SHOWIRE
▷ SHOWTRADE
▷ PEOPLEADS
▷ SHOWCHAT
▷ SCiN

THE SHOWSCAPE GLOBAL SEARCH
COMMUNITY, WEB NETWORK, AND JOINT SEARCH:

[_____]

○ Showtown Community     *Choose:* [Showlinks ▽]

○ Showtown Web Network

◉ Showtown Community & Web Network (Joint) Search

[ SUBMIT ]

INFO: XXXXXXXXXXXXXXXXXXXXXXXXXXXXXXXXXXXX
XXXXXXXXXXXXXXXXXXXXXXXXXXXXXXXXXXXX
XXXXXXXXXXXXXXXXXXXXXXXXXXXXXXXXXXXX
XXXXXXXXXXXXXXXXXXXXXXXXXXXXXXXXXXXX
XXXXXXXXXXXXXXXXXXXXXXXXXXXXXXXXXXXX
XXXXXXXXXXXXXXXXXXXXXXXXXXXXXXXXXXXX
XXXXXXXXXXXXXXXXXXXXXXXXXXXXXXXXXXXX
XXXXXXXXXXXXXXXXXXXXXXXXXXXXXXXXXXXX
XXXXXXXXXXXXXXXXXXXXXXXXXXXXXXXXXXXX
XXXXXXXXXXXXXXXXXXXXXXXXXXXXXXXXXXXX
XXXXXXXXXXXXXXXXXXXXXXXXXXXXXXXXXXXX
XXXXXXXXXXXXXXXXXXXXXXXXXXXXXXXXXXXX
XXXXXXXXXXXXXXXXXXXXXXXXXXXXXXXXXXXX

Tour Showtown World Wide Communities >>

Copyright 2003. Showtown® is a patent pending application and a registered trademark of Buddy King, Inc. dba "The Showtown Group."All Rights Reserved! Use of this website constitutes YOUR acceptance of Showtown Privacy Policy and Terms & Conditions.

FIG. 21j

| THE SHOWTOWN COMMUNITY RESOURCE LOCATOR | SEARCH SHOWTOWN |
|---|---|
| [PEOPLE] [PLACES] [PROJECTS] [THINGS] | [_____](GO) |

THE MINI EPK
WED 12-31-03

[PROFESSIONAL/PEOPLE NAME]

CONTENT MODULES
- XXXXXXX
- XXXXXXX
- XXXXXXX
- XXXXXXX
- XXXXXXX
- XXXXXXX
- XXXXXXX

MEDIA INDUSTRIES
▷ MUSIC
▷ THEATER
▷ RADIO
▷ MOVIES
▷ TELEVISION
▷ MULTIMEDIA
▷ THE WEB
▷ OTHER

THIS PAGE SETS YOUR PREFERENCES FOR DISPLAY OF INFORMATION IN THE MINI EPK. NOTE: COOKIES MUST BE ENABLED BY YOUR BROWSER FOR THIS TO FUNCTION.

YOUR FEATURED INDIVIDUALS

INSTRUCTIONS: CLICK THE DROP DOWN BOX AND SELECT WHICH INDIVIDUALS YOU WOULD LIKE TO FEATURE IN THE CREDITS FOR EACH MEDIA CATEGORY.

— 156                      — 116

MUSIC: [PERFORMING ARTISTS ▽] (?)

THEATER: [DIRECTORS ▽] (?)

RADIO: [PRODUCERS ▽] (?)

MOVIES: [PRODUCERS ▽] (?)

TELEVISION: [PRODUCERS ▽] (?)

MULTIMEDIA: [DESIGNERS ▽] (?)

THE WEB: [DESIGNERS ▽] (?)

YOU CAN USE THESE PREFERENCES, OR YOU CAN RESET THEM BACK TO THEIR DEFAULT VALUES:

[ SUBMIT AND CONTINUE ]    [ RESET DEFAULT ]

---

TOUR SHOWTOWN.COM >>
Showscape | Mediawalk | Showire | Showlinks | Showtrade | Peopleads | Showchat Copyright 2003, Showtown Is Patent Pending And A Registered Trademark Of Buddy King Inc. All Rights Reserved. Use Of This Website Constitues Your Acceptance Of Showtown Privacy Policy And Terms & Conditions

HUMAN CREDIT RESOURCE NETWORKING METHOD

CROSS REFERENCE OF RELATED APPLICATIONS

This is a Continuation-In-Part application of a non-provisional application, application Ser. No. 10/355,343, filed Jan. 31, 2003, and a provisional application, application No. 60/493,651, filed Aug. 7, 2003. This CIP application claims priority benefit of the above mentioned non-provisional application Ser. No. 10/355,343 and provisional application 60/493,651.

BACKGROUND OF THE PRESENT INVENTION

1. Field of Invention

This invention relates in general to a computer-based database system, and more particularly to a Human Resource Networking System and Method Thereof, which is a computer-based data integration and management processing system and method thereof for Project workforce locating, identifying, and fulfilling. In addition, occupational reports generate Conjunctive Project Sentences of Credit Construct per the System's CCIV&V Method, that allows additional reports to be generated from the Conjunctive Project Sentence of Credit Construct that inform, promote, network and market a workforce's Talents, Skills, Performances, Products, and Services per our System's Credit Link Method.

2. Description of Related Arts

In the 1980's, government reports caught the applicant's attention with the pronouncement that entertainment professionals should anticipate a life expectancy second only to those mining for coal! While actuaries cite personal life styles, this invention references professional work styles as the major cause for the professional's shortened life expectancy. "You're only as good as your last Gig," is an industry axiom resulting from highly capricious industry Projects whose volatile work styles may last one hour, one month or one lifetime. A professional having their next performance lined up while still working is an exception rather than the rule.

No matter if one performs in front of or behind the camera, microphone, stage, screen, cage, whip or desk, the bulk of one's career is spent networking for that next gig which, in some instances, may never come. While staying employed on a regular basis can be enhanced with a good manager, developing personal networking skills is a workforce professional must. Full time employment in Project-related industries requires modes of continuous workforce readjustment, no matter the Industry, the Project, or Performance type. The challenge of being in the right place at the right time, fulfilling a present workforce commitment while not knowing when one's next job will occur, greatly contributes, I believe, to our Industry Workforce's shortened life expectancy.

This Project Workforce employment challenge is not unique to the entertainment industry, as it exists as an unsolved professional and human resource problem in all "Project-driven industries." Interestingly, to date there is no one method or system available for identifying, locating, and fulfilling a Project's workforce requirements that uses live qualified industry Project credits. There is no one method or system that also includes keeping verified industry skills and talents, correct work contact addresses and phone numbers, as well as one's records for work availability. The various systems that exist do so at the exclusion of others. While offering reduced services and reports that are neither relational nor dynamically assembled, they also do not offer one's efforts in assurance style credit reports that more or less follow generally accepted accounting principles (GAAP), which include Compilation, Review and (System) Certified as does this Method of the present invention.

In reality, existing conventional entertainment workforce systems are not open systems, but are closed systems. For example, www.thelink.com is an existing closed entertainment workforce system for union members only. Furthermore, it is not relational, it does not track industry Places and Things used in developing industry Projects, and it does not report audited industry credits as does our System's CCIV&V Method. In addition, its credits are not automatically generated with additional Credit Links as are the credits generated by the Method of the present invention.

However, there are new requirements for global products whose markets are constantly changing with the advent of newer technologies. We find talent moving about, changing addresses, phone numbers, managers and agents, as they search out production companies whose workforce requirements are adjusting to these changing markets.

In addition, entertainment companies, such as Universal Studios, are re-locating to facilities once thought too remote for production. It's only a matter of time before all facilities require a knowledgeable workforce equipped with the latest networking technologies required for tomorrow's worldwide just-in-time production requirements. The use of old-fashioned methods (printed publications and one's ability to professionally network) mostly determines how this closed workforce is staffed today. However competing in tomorrow's worldwide markets may be the reason the present closed systems disappear, as world areas experiencing recession market their services, products and workforce against those world areas that are prospering. This coming world marketplace will give rise to the network that allows those possessing in-demand skills, talents, products and services to market these skills, talents, products, and services to worldwide supply-and-demand buyers. At this time, no such human resource system or workforce method exists.

Today hundreds of resumes may be submitted for any one entertainment job on a given day, but how can Project Managers take the time to independently identify, verify and validate a resume's reported credits in light of today's quick-paced production needs when they are forced to economize by cutting manpower.

Conventional systems monitoring addresses, phones numbers, and points of contact for work are orientated towards doing business the old-fashioned manual way, which is networking by personal contacts and searching existing linear and non-linear systems such as printed directories. The LA 411, published by LA 411 Publishing company, is a non-interactive system whose published data cannot be updated as changes occur, but only on its annual publication. It also performs an incomplete fractionalized job, as it does not service all industries of entertainment, does not encompass all industry Professionals and Services, nor does it serve entertainment Consumers and Students of fine art, as does this invention.

While a few entertainment industry methods utilizing new technologies are beginning to emerge, as in the case of Pro Audio (www.proaudio.com), they are available only for a particular media category, and not all media categories as is this invention. In some cases, as with Pro Audio, they list only two of our invention's Elements. These services basically specialize in one form of media and do not offer a system designed to serve all entertainment industries. A human resource service for movies, such as Castnet, services actors only. In addition, Castnet does not offer independent identification, validation and verification of industry credits, does not track Projects, is non-relational, and uses traditional styled printed formats for its resumes. Additionally, its credits are not conjunctive, they are not independently identified, verified, and validated as in the present invention's CCIV&V Method, and they do not report Credit Constructs containing additional occupational reports as either Compilation, Review or (System) Certified, as does this System's Credit Links Method. Furthermore, some systems are designed for Consumers and not industry Professionals, whereas the present invention is equally for Consumers, Professionals and Students of fine arts.

Some methods use systems designed primarily for marketing entertainment products as in the case of www.imdb.com. While www.imdb.com provides information regarding movies, the information is not reported as a Project Workforce Networking System which is relational and whose Credit Data is constantly being uplifted automatically with live industry credit bytes. Existing systems for other entertainment industries, such as www.allmusic.com, are focused with a system unlike the present invention mentioned in this specification. U.S. Pat. No. 5,197,004 is not designed to work with a Relational Database, and therefore does not have rules like the present invention. Therefore the data is not updateable, and the system lacks a CCIV&V method and the ability to learn. Additionally, data on its resumes cannot be saved to build a human resource database. The human resource system U.S. Pat. No. 5,416,694 is not applicable in that the Elements are not similar. Additionally U.S. Pat. No. 5,671,409 is not applicable for several reasons, the least of which is that the Element data is not updateable with live data.

In summary, there does not exist today an entertainment Human Resource Networking System for a workforce specializing in Project-driven development. There does not exist a method for locating, identifying, and fulfilling production Project workforce requirements that uses this System's Credit Constructs, which are Independently Identified, Verified and Validated, more or less following generally accepted accounting principles (GAAP), and which offers Credit Links to added occupational reports defined by the System's Method to at least include Informational (Credit) Links, Instance (Credit) Links, Transactional (Credit) Links, and Access-to-Programming (Credit) Links. Until such tools are available, time-consuming individual research and personal networking skills will prevail, as well as the opportunity to exaggerate one's UNaudited industry credits as official industry credits and reference guidelines for Project employment.

Therefore, a longstanding need still exists for such a Method, and that need now becomes more acute in this new age of worldwide economies and information. The need still exists for a talent locator that locates talent and skills via Compiled, Reviewed and Certified Credit Constructs—a Credit Construct that further networks a talent's news releases, media reels, and e-storefront, that provides a talent with the ability to research and poll viewers, that readily provides an economic and convenient location for a worldwide presence that presents specific workforce skills, talents, products and services for a human resource industry, and which allows the talent to be in the right place at the right time to do the right thing.

SUMMARY OF THE PRESENT INVENTION

The main objective of the present invention is to provide a Human Resource Networking System and Method Thereof, which is a novel method establishing a business System for locating, identifying, fulfilling, and assisting in the search for industry career Project workers via the use of reports that inform, promote, network and market a career Project worker's Talents, Skills, Performances, Products, and Services.

Another objective of the present invention is the implementation of modern technology by using Internet technologies that allow accessibility by any employer and/or any person of skills and/or talent anywhere, which also includes business subsidiaries and managers located throughout the world, to the Networking System and Workforce Method of the present invention.

Another objective of the present invention is to provide a Human Resource Networking System and Method Thereof, which is a single industry System for industries of entertainment, the least of which is: Music, Theater, Radio, Movies, TV, Multimedia, the Web, and Other, which at least includes Fashion, Literature, and the Arts.

Another objective of the present invention is to provide a Human Resource Networking System and Method Thereof, which is a System addressing all industry employment types, which at least includes: free lance, independent, contract and employee.

Another objective of the present invention is to provide a Human Resource Networking System and Method Thereof, which is a System useful in Project-driven industries, and more specifically, Projects that exist in the entertainment industry for establishing specific Skills and Talents as practiced by industry people which can be matched with Project developing requirements in the production of Music, Theater, Radio, Movies, TV, Multimedia, the Web, and Other industries as related to entertainment, which at least includes Fashion, Literature, and the Arts.

Another objective of the present invention is to provide a Human Resource Networking System and Method Thereof, which is a System for all human resource industries with a secure mode of transmission, the least of which is a private e-mail and channel for networking negotiations.

Another objective of the present invention is to provide a Human Resource Networking System and Method Thereof, wherein the System is open to those having union and non-union relationships. The present invention is a tool to be used by all entertainment personnel including those in front of and behind the camera, microphone, stage, screen, cage, whip and/or desk. With the present invention, everyone is related and located by their industry credits according to the System's Industry Credit Inductive Lineage Construct Matrix Method, and their industry Credits are Identified, Verified and Validated according to our System's CCIV&V Method.

Another objective of the present invention is to provide a Human Resource Networking System and Method Thereof, which is a System possessing the ability to be operated by Professionals, Consumers and Students of fine art with little or no experience. However, for those HR specialists in head hunting and Project workforce networking fulfillment, this System offers a search system for the advanced, as well as the ultimate search screen for talent asking that most complicated and compound question. This makes it possible to search for industry personnel possessing the most unusual Talents from the most remote regions.

Another objective of the present invention is to provide a Human Resource Networking System and Method Thereof which allows a user to set a Pathway for the Method's search agent and which further allows for Self-Adjustments that control the periodic reporting based on user preferences.

Another objective of the present invention is to provide a Human Resource Networking System and Method Thereof which is a System possessing an Internal Joint Search that performs Combination Searches using a simultaneous Database Query and Web Search in order to provide search returns that display URL's related to Elements. Said search returns will rank results according to how closely they match what the user is looking for. In this manner, returned Elements that also have a returned URL will have a higher ranking on the search return than those Elements that don't, i.e. weighted returns.

Another objective of the present invention is to provide a Human Resource Networking System and Method Thereof, which is a System open to those having career management and to those not having career management representation. The present invention addresses an industry need for a one-source talent point of contact consisting of addresses and phone numbers with a listing of managers and agents, a listing that can be accessed by the talent enabling said talent to uplift their points of contact when needed.

Another objective of the present invention is to provide an industry with automatically generated Conjunctive Project Sentences of Credit Construct whose Credit Constructs have been audited, and whose assurance style reports, which more or less follow generally accepted accounting principles (GAAP), are classified as Compilation, Review and (System) Certified per the System's CCIV&V Method of the present invention. Compilation Credit Constructs may include automatically generated Credit Data input by a member or members other than the Press Kit owner that has not been Validated or Verified by the Press Kit Owner or Owner's representative. Review Credit Constructs may include Credit Data input by a member or members other than the Press Kit Owner that has been Reviewed and Validated by the Press Kit Owner or Owner's representative. (System) Certified Credit Constructs may consist of Credit Data input by a member or members other than the Press Kit Owner that has been Reviewed and Validated by the Press Kit Owner or Owner's representative, and Verified and Certified by a third party.

Another objective of the present invention is to provide automatically generated reports that contain Conjunctive-Project Sentences of Credit Construct extracted from the Method's Elements including People, Places, Projects and Things with respect to a Point in Time. In general, they report "Who (People) did What (People function) for Whom (Company owning or producing Project), Where (Places), Why (Projects) and How (Things used) in relation to When (Point In Time)."

Another objective of the present invention is to provide automatically generated ConjunctiveProject Sentences of Credit Construct as Compilation, Review, and (System) Certified by the System's CCIV&V Method that contain Credit Links including at least Instance [Credit] Links which at least link to Press Kit Reports, Informational [Credit] Links which at least link to Press Releases, Access-to-Programming [Credit] Links which at least link to Multimedia Reels, and Transactional [Credit] Links which at least link to a commerce site and a poll & research site.

Another objective of the present invention is to display ConjunctiveProject Sentences of Credit Construct in a Multiple Roles on a Single Project Chart when an Individual or Featured Individual has performed more than one Role on a Project and to further display Conjunctive Project Sentences of Credit Construct in a Multiple Roles on Various Projects Chart when the Individual or Featured Individual has performed more than one Role on more than one Project.

Another objective of the present invention is to provide web banner ads for informing, promoting, networking and marketing an Element's presence per the System's Method of the present invention. The Web Banner Ad can appear on web sites within the network as well as on web sites outside of the network and access content from within the System's Database of the present invention. The web InfoConsole media player, in addition to playing various modes of motion graphics, locates content related to the motion graphic per the Elements: People, Places, Projects and Things in relation to a Point in Time. Such a media player is an expansion of our Method's core System.

Another objective of the present invention is to provide a Human Resource Networking System and Method Thereof which identifies, locates, and fulfills worldwide Project development at an affordable cost, that will also include automatic uplifting of industry credits, and which contains the Conjunctive Project Sentence of Credit Construct.

Another objective of the present invention is to provide a Human Resource Networking System and Method Thereof, which is a system of flexibility that allows future growth for those career-minded Project developing personnel to expand the Method's core System of People, Places, Projects and Things for future Project workforce managing, e.g., when one desires to automatically monitor the Project work cycle productivity of an individual in another state or country connected only by the technologies of the Internet.

Still further objectives and advantages will become apparent from a consideration of the ensuing description and drawings. These and other objectives, features, and advantages of the present invention will become apparent from the following detailed description, the accompanying drawings, and the appended claims.

BRIEF DESCRIPTION OF THE DRAWINGS

FIG. 4b is a flow chart of the People Association Input Rules with appropriate text according to the above preferred embodiment of the present invention.

FIG. 9c is a diagrammatic legend display of the data life cycle template with appropriate text according to the above preferred embodiment of the present invention.

FIG. 10c is a diagram illustrating the intersecting of Credit Instances developed from the Industry Credit Inductive Lineage Construct Matrix with appropriate text according to the above preferred embodiment of the present invention.

FIG. 15 is a table diagram showing the query matrix rules used in combining Constructs used and to drill-down Constructs into a Search Return with appropriate text, that is a sub-drawing of the Report Writer, according to the above preferred embodiment of the present invention.

FIGS. 17a, 17b and 17c are diagrams showing the reporting modules of the Web Press Kit, including the Conjunctive Project Sentence of Credit Construct within a Featured Credits reporting module, according to the above preferred embodiment of the present invention.

FIG. 17f is a diagram illustrating an Additional Credits Page in the Press Kit Report according to the above preferred embodiment of the present invention.

FIG. 17g is a diagram illustrating an Auto Credits Report according to the above preferred embodiment of the present invention.

FIGS. 21a to 21j are schematic diagrams illustrating the homepages of various applications, including Showtown, Showscape, Mediawalk, Showchat, Showtrade, Showire, Peopleads, Showlinks, SCiN, and Showtown World Wide, according to the above preferred embodiment of the present invention.

FIG. 22a is a diagram illustrating the Browser Preference Page with parameters for adjusting Featured Individuals reported per Media Category according to the above preferred embodiment of the present invention.

DETAILED DESCRIPTION OF THE PREFERRED EMBODIMENT

Figure 1:
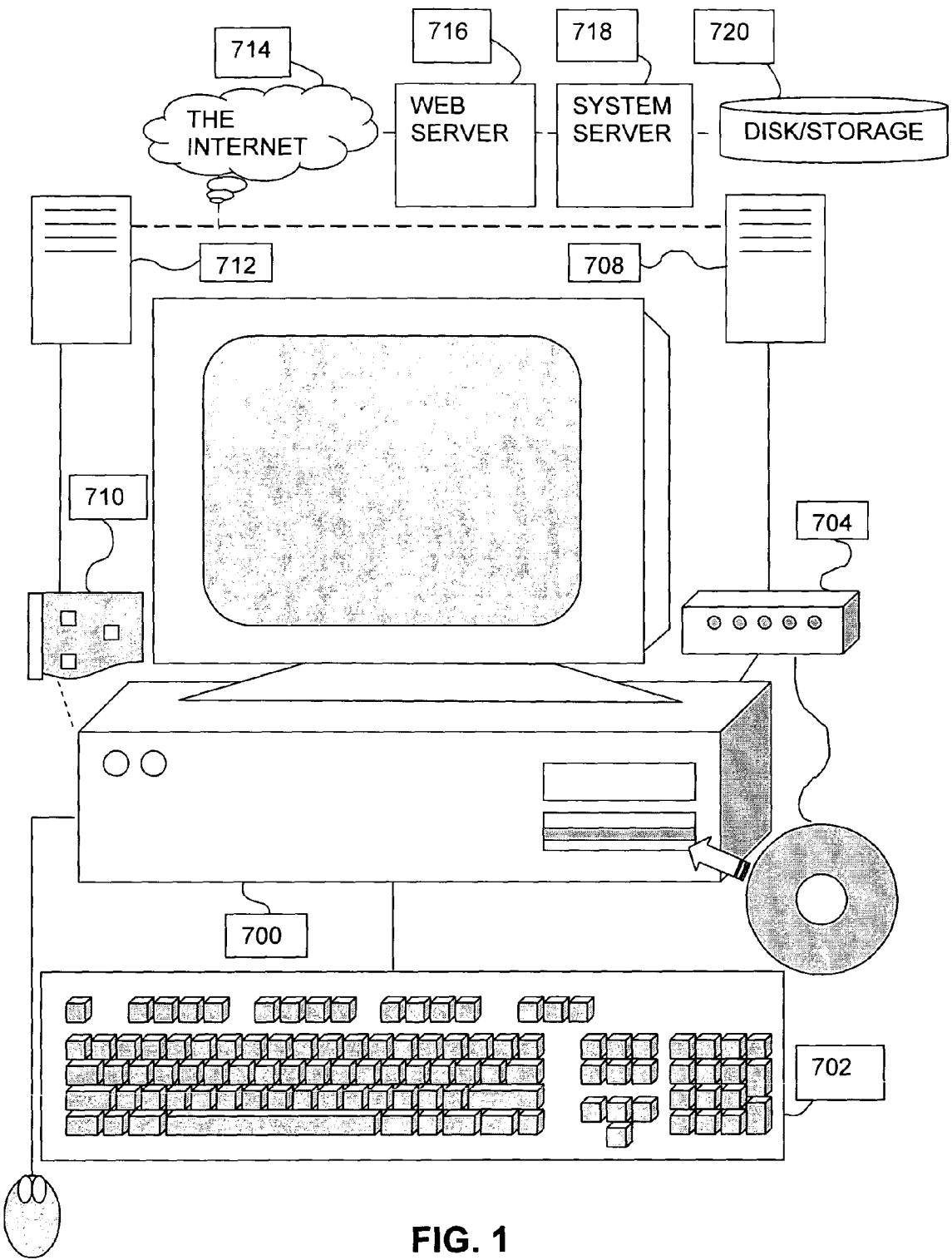
FIG. 1 is a diagram illustrating a client computer system of a user connecting to a server computer system via the Internet.

Referring to the drawings of the invention, a Human Resource Networking System and Method Thereof are illustrated. It is also understood that the components could be designed, arranged and developed in a myriad of configurations not displayed. It is also understood that the following detailed description of the present invention as referenced in the drawings is not intended to limit the scope of the present invention as claimed, but is only for illustration of the preferred embodiment of the present invention.

The present preferred embodiments of the invention will best be understood by reference to the drawings, wherein parts are designated by reference numerals throughout.

Referring to FIG. 1, a Client Computer System 700, comprising a Keyboard 702, a device that establishes a two-way communication through a network, such as a Modem 704 and/or a Network Adapter Card 710, may connect to a Web Server 716 for retrieving web pages via a communication network used for a client-server setup, such as the Internet, an Intranet, an Extranet Internet or a Local Area Network 714. The Web Server 716 is connected to a System Server 718 which is connected to a Storage Device 720 and delivers the information in Relational Databases 100 which contacts the System Server 718, wherein the Web Server 716 contacts the System Server 718 to retrieve the information from a Disk/Storage Device 720. The Disk/Storage Device 720 can be a hard drive or a networked storage device, in which the data in the Relational Databases 100 resides in the Disk/Storage Device 720.

Figure 2A:
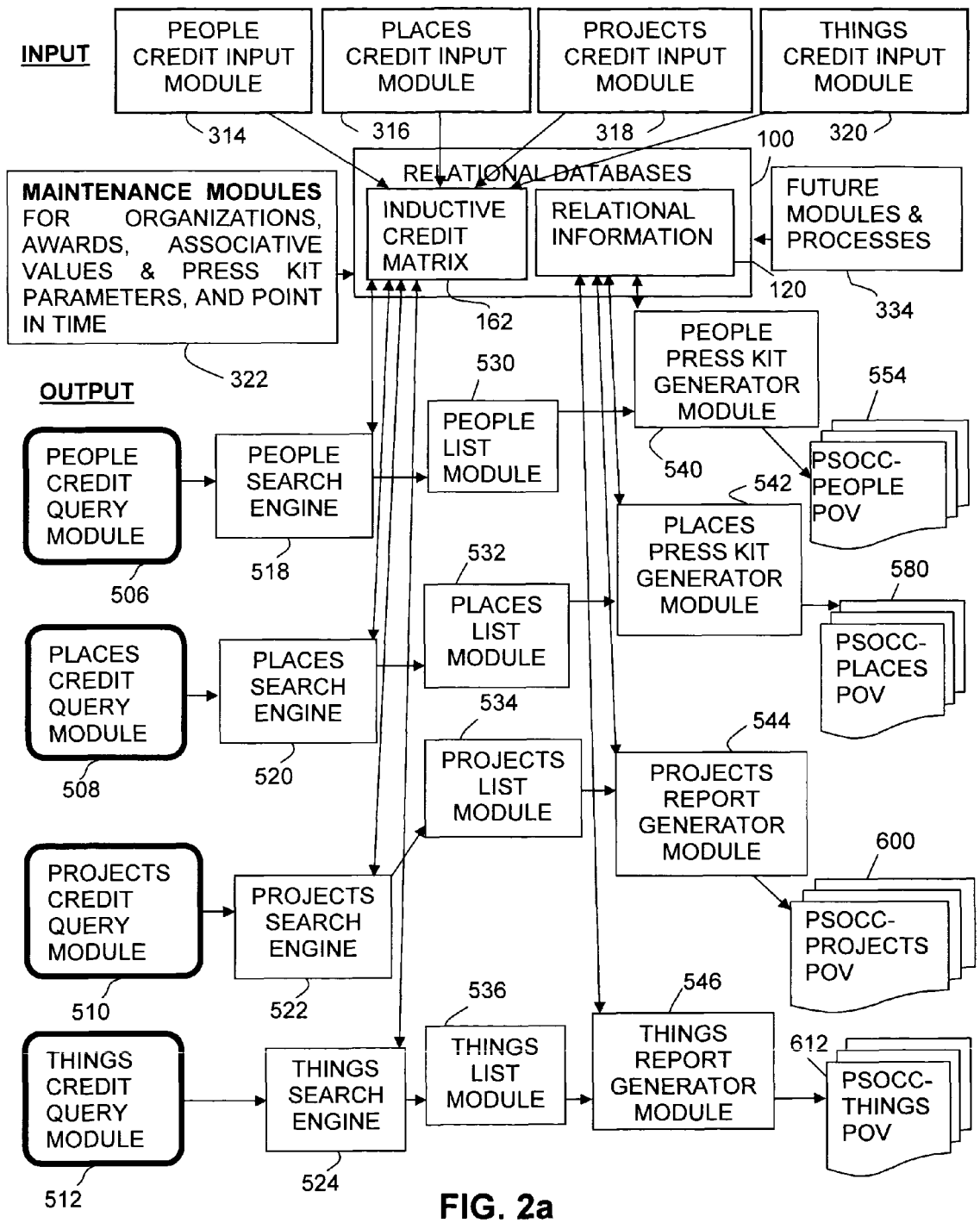
FIG. 2a is a block diagram illustrating schematic input modules of the four main Elements and the output modules of the Press Kit Reports according to a preferred embodiment of the present invention, which contains at least the Conjunctive Sentence of Credit Construct with appropriate text.

Referring to FIG. 2a, a People Credit Input Module 314, a Places Credit Input Module 316, a Projects Credit Input Module 318, and a Things Credit Input Module 320 are used by the Client Computer System 700 (as shown in FIG. 1) to perform Data Input 300 into a Relational Databases 100.

All the information is stored in the Relational Database 100 which contains a Relational Information 120 and an Industry Credit Inductive Lineage Construct Matrix 162, i.e., the Industry Credit Inductive Lineage Construct Matrix 162, as shown in FIG. 2a, for data storage and retreival.

The Data 800 is located in the Disk/Storage Device 720, and is accessed by the System Server 718 (as shown in FIG. 1). The Relational Databases 100 are divided into the Industry Credit Inductive Lineage Construct Matrix 162, which is located on the System Server 718, and the Relational Information 120.

The People Credit Input Module 314, which is used, for example by a data entry person, to input the Associative Information 121 from the People 202, is a programmed module that is used to Edit and Update the Industry Credit Inductive Lineage Construct Matrix 162 with Associative Information 121 from the People Relational or Associative Information Process 304.

The Places Credit Input Module 316, which is used, for example by a data entry person, to input the Associative Information 121 from the Places 204, is a programmed module used to Edit and Update the Industry Credit Inductive Lineage Construct Matrix 162 with Associative Information 121 from the Places Relational or Associative Information Process 306.

The Projects Credit Input Module 318, which is used, for example by a data entry person, to input the Associative Information 121 from the Projects 216, is a programmed module used to Edit and Update the Industry Credit Inductive Lineage Construct Matrix 162 with Associative Information 121 from the Projects Relational or Associative Information Process 308.

The Things Credit Input Module 320, which is used, for example by a data entry person, to input the Associative Information 121 from the Things 218, is a programmed module that is used to Edit and Update the Industry Credit Inductive Lineage Construct Matrix 162 with Associative Information 121 from the Things Relational or Associative Information Process 310.

A People Query Module 506, a Places Query Module 508, a Projects Query Module 510, and a Things Query Module 512 are used by the Client Computer System 700 (as shown in FIG. 1), to query the Relational Databases 100, through a People Search Engine 518, a Places Search Engine 520, a Projects Search Engine 522, and a Things Search Engine 524 respectively.

Figure 13:
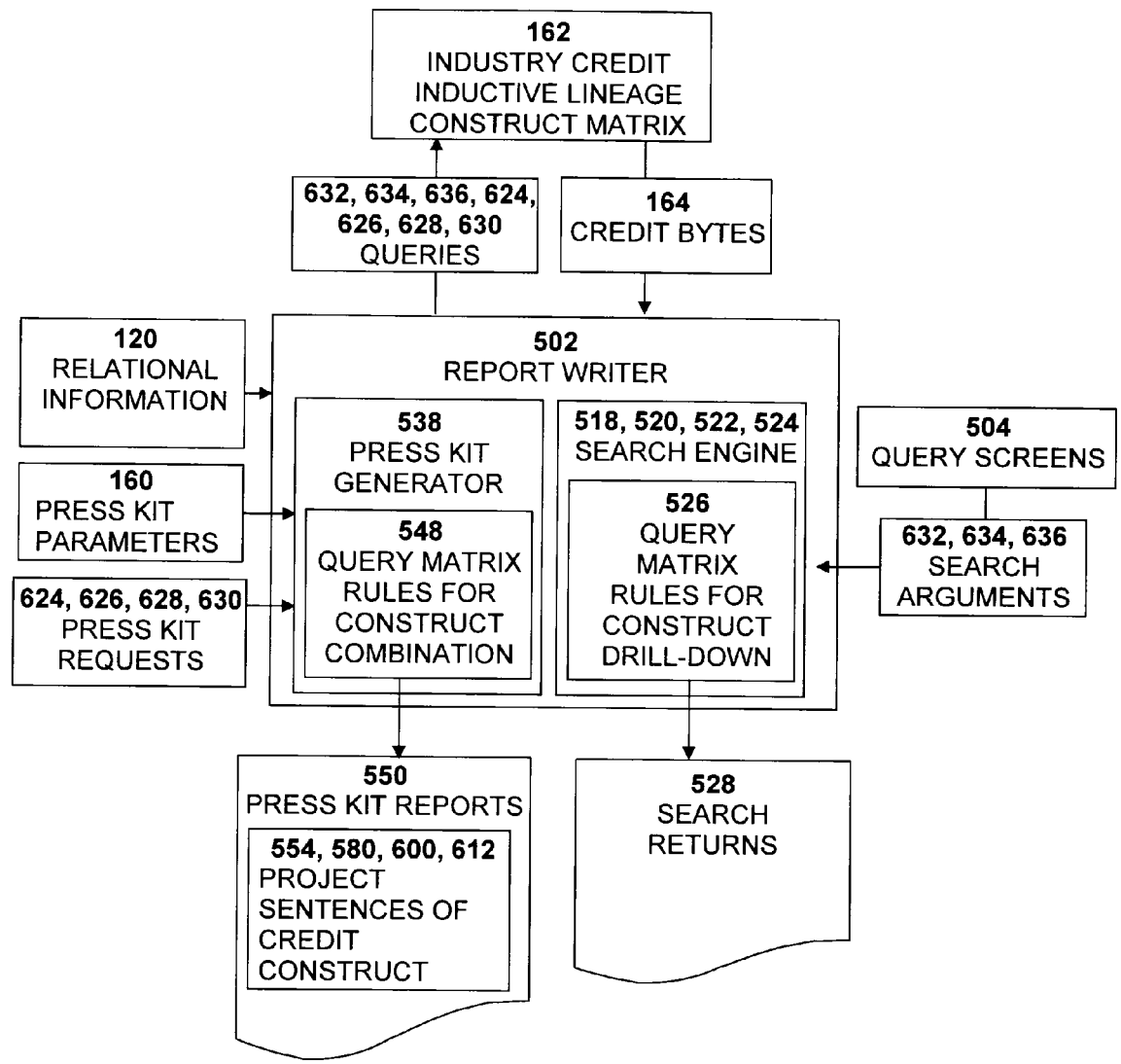
FIG. 13 is a diagram showing the Report Writer with its inputs and outputs according to the above preferred embodiment of the present invention.

The People Search Engine 518 queries the database and returns People Credit Bytes 166 which are Associations 176 of People 202 to Places 204, People 202 to Projects 216, People 202 to Things 218, and People 202 to People 202 extracted for a People 202 Search Return 528 that is a list of People 202 that meet a Query Matrix 514 criteria, as shown in FIG. 15, which is a combination of Credit Bytes 164 on the reporting function, or a combination of search arguments on the search function, wherein the Credit Bytes 164 are information that is output from the Industry Credit Inductive Lineage Construct Matrix 162, comprising Elements 201 and Associative Values 116. The Credit Bytes 164 are output from the Industry Credit Inductive Lineage Construct Matrix 162 and are used in the ConjunctiveProject Sentences of Credit Construct 551. The process occurs in a Report Writer 502, as shown in FIG. 9a and FIG. 13, which is a module that creates reports from the database, receives information from the Relational Databases 100, and produces Press Kit Reports 550 and Search Returns 528 (as shown in FIG. 13) in response to queries.

Figure 9A:
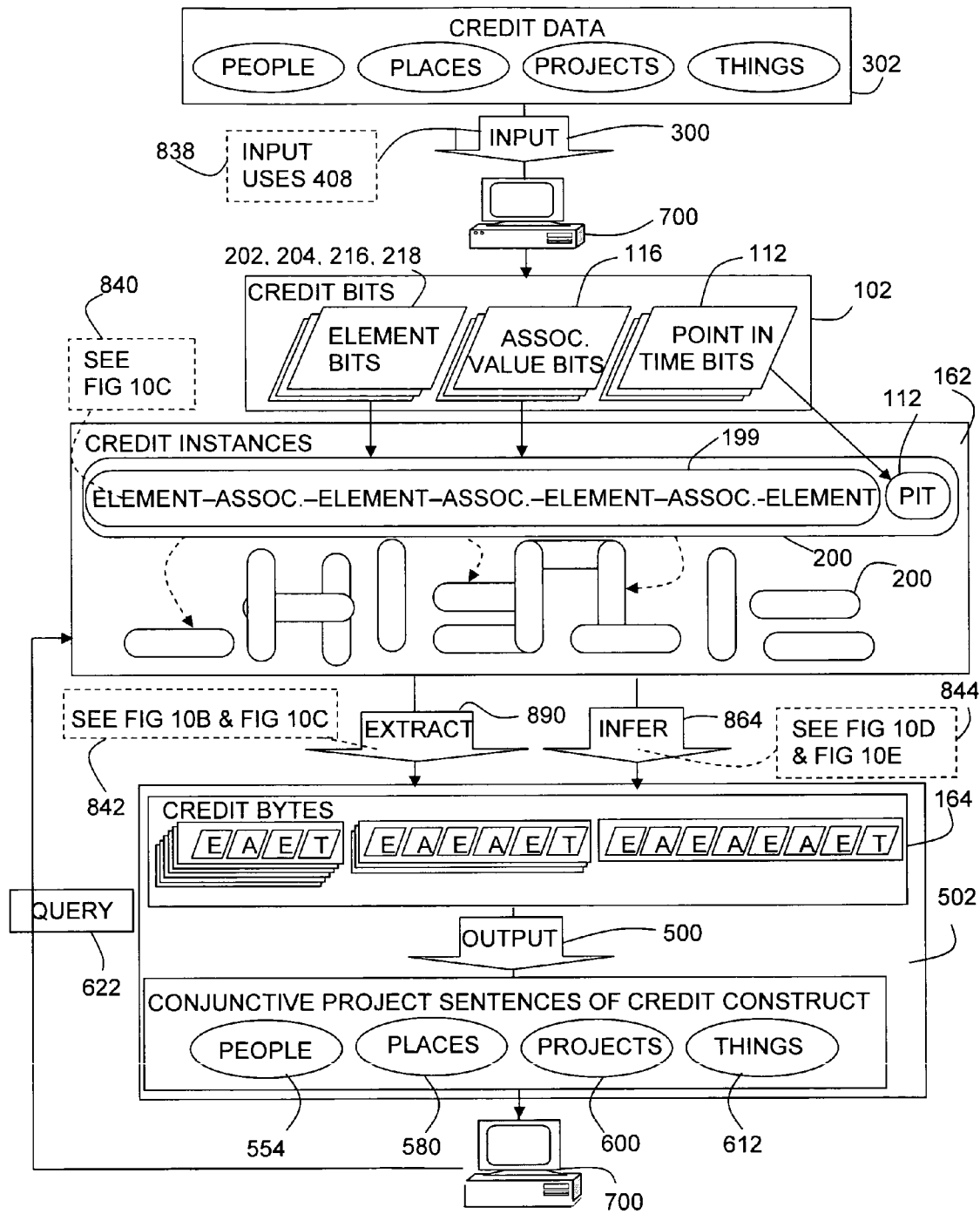
FIG. 9a is a flow chart illustrating the creation of Credit Bytes from the Method's Credit Bits as a result of the Method's Credit Instances according to the above preferred embodiment of the present invention.
Figure 9B:
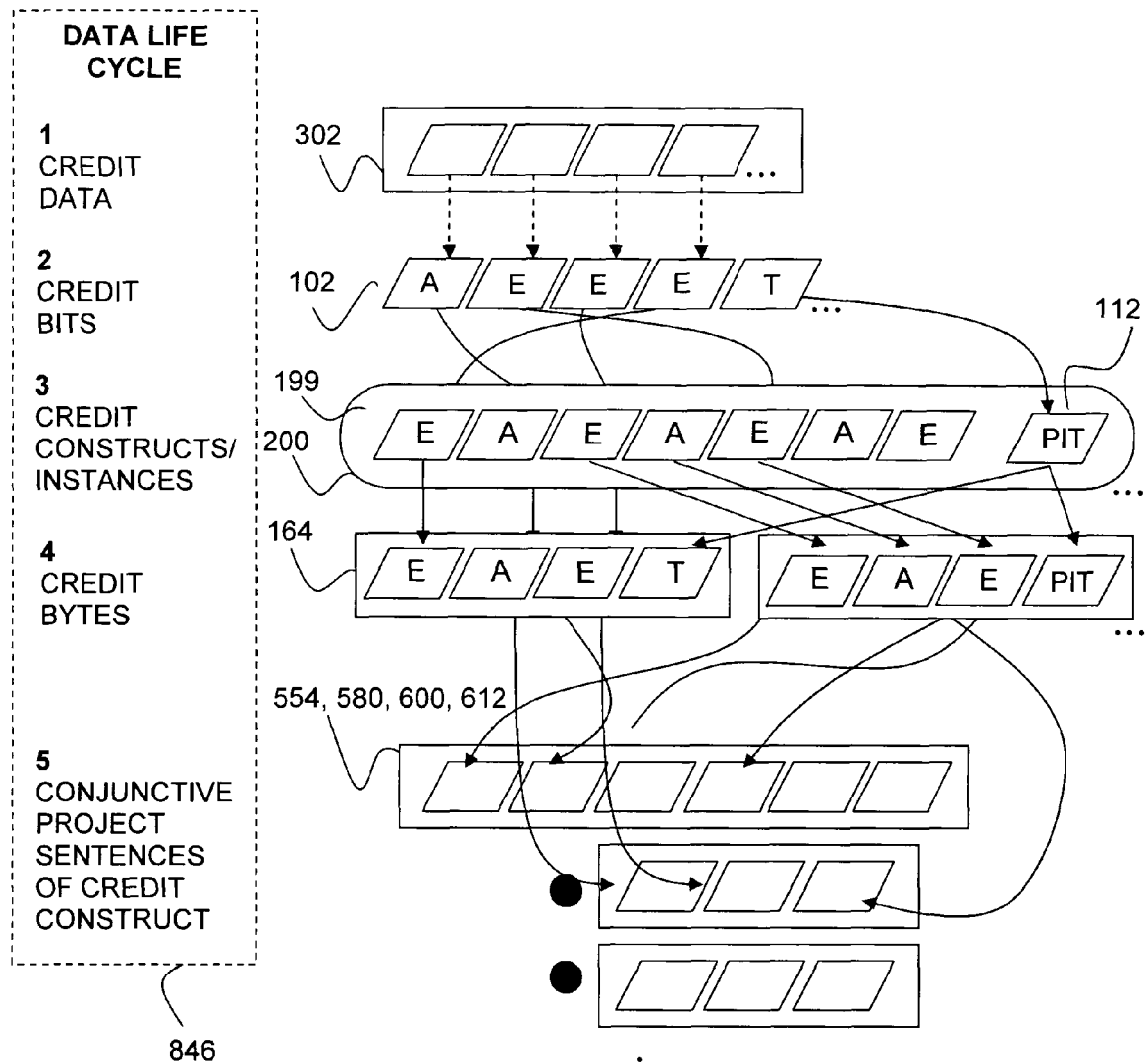
FIG. 9b is a diagrammatic template display of the data life cycle showing how the Method creates the Conjunctive Project Sentence of Credit Construct from Credit Data according to the above preferred embodiment of the present invention.

The Query Matrix 514 shows how the Credit Bytes 164 (as shown in FIGS. 9a and 9b) work and it shows how the search arguments work in performing the System's functions. This is the format of the information going in as a search or coming out from Credit Bytes 164. The Query Matrix 514 is constructed in the Report Writer 502.

The Places Search Engine 520 queries the Database and returns Places Credit Bytes 168 which are Associations 176 of Places 204 to People 202, Places 204 to Projects 216, Places 204 to Things 218, and Places 204 to Places 204 extracted for a Places 204 Search Return 528. The Projects Search Engine 522 queries the Database and returns Projects Credit Bytes 170 which are Associations 176 of Projects 216 to People 202, Projects 216 to Places 204, Projects 216 to Things 218, and Projects 216 to Projects 216 extracted for a Projects 216 Search Return 528. The Things Search Engine 524 queries the Database and returns Things Credit Bytes 172 which are Associations 176 of Things 218 to People 202, Things 218 to Places 204, Things 218 to Projects 216, and Things 218 to Things 218 extracted for a Things 218 Search Return 528, in which, Associations 176 are Elements 201 which are joined by Associative Values 116 to specify how two Elements 201 relate to each other.

The People Query Module 506, which is a module that allows a user Query 622 to find People 202, accepts user search criteria and passes the information to the People Search Engine 518. The Places Query Module 508, which is a module that allows a user Query 622 to find Places 204, accepts user search criteria and passes the information to the Places Search Engine 520. The Projects Query Module 510, which is a module that allows a user Query 622 to find Projects 216, accepts user search criteria and passes the information to the Projects Search Engine 522. The Things Query Module 512, which is a module that allows a user Query 622 to find Things 218, accepts user search criteria and passes the information to the Things Search Engine 524.

Referring to FIG. 2a and FIG. 13, a People List Module 530, a Places List Module 532, a Projects List Module 534, and a Things List Module 536 generate the Search Return 528, as shown in FIG. 13, which is a formatted list of Elements 201 along with the Relational Information 120 which is all information that does not relate to the Associations 176 of Elements 201. Relational Information 120 helps describe a single Element 201. All Relational Information 120 is stored in the Relational Database 100.

The Elements 201 displayed are only those that meet the Search Criteria. Elements 201 in the Search Return 528 are hyperlinked if the Element contains an active Press Kit Report 550. The Search Returns 528 are generated by the People, Places, Projects and Things Search Engines 518, 520, 522, 524. An Element in the Search Return 528 may link to a Press Kit Report 550.

The People List Module 530 is a programmed module that outputs the Search Return 528 featuring a list of People 202 with hyperlinks to People Press Kits 552 if those Press Kit Reports 550 are active and receives a list of People 202 from the People Search Engine 518 and formats the Search Return 528.

The Places List Module 532 is a programmed module that outputs Search Return 528 featuring a list of Places 204 with hyperlinks to Places Press Kits 578 if those Press Kit Reports 550 are active and receives a list of Places 204 from the Places Search Engine 520 and formats the Search Return 528.

The Projects List Module 534 is a programmed module that outputs Search Return 528 featuring a list of Projects 216 with hyperlinks to Projects Press Kits 590 if those Press Kit Reports 550 are active and receives a list of Projects 216 from the Projects Search Engine 522 and formats the Search Return 528.

The Things List Module 536 is a programmed module that outputs Search Return 528 featuring a list of Things 218 with hyperlinks to Things Press Kits 610 if those Press Kit Reports 550 are active and receives a list of Things 218 from the Things Search Engine 524 and formats the Search Return 528.

In which, as shown in FIG. 2a and FIG. 13, the People, Places, Projects, and Things Press Kits 552, 578, 590, 610 are respectively generated in a People Press Kit Generator Module 540, a Places Press Kit Generator Module 542, a Projects Press Kit Generator Module 544, and a Things Press Kit Generator Module 546 which are used in the Report Writer 502. In other words, the Press Kit Generator Modules 540, 542, 544, 546, which return records that meet the selection criteria in a document, are modules that create the Press Kit Reports 550 in response to Press Kit Requests 624, 626, 628, 630, using the Press Kit Parameters 160, the Relational Information 120, and the Industry Credit Inductive Lineage Construct Matrix 162 for its information. In which, the Press Kit Parameters 160 is a table of information that instructs the Press Kit Generator Modules 540, 542, 544, 546 on how to format and what information to display in a particular Element's Press Kit Report 550. Parameters include: relational include, relational exclude, personal include, personal exclude, links active/inactive, employee active/inactive/suspend.

As shown in FIG. 2a, Conjunctive Project Sentences of Credit Construct from a People Point of View (PSOCC-People POV) 554, Conjunctive Project Sentences of Credit Construct from a Places Point of View (PSOCC-Places POV) 580, Conjunctive Project Sentences of Credit Construct from a Projects Point of View (PSOCC-Projects POV) 600, and Conjunctive Project Sentences of Credit Construct from a Things Point of View (PSOCC-Things POV) 612 are reported on the Client Computer System 700, and are generated by the People Press Kit Generator Module 540, the Places Press Kit Generator Module 542, the Projects Press Kit Generator Module 544, and the Things Press Kit Generator Module 546, respectively. Future Modules and Processes 334 may input and report the Data 800 in different fashions and for different intended use.

The Conjunctive Project Sentence of Credit Construct 551 for People 202 reports information from the Credit Bytes 164 and from the Relational Information 120 from a People Point of View 554 and displays in the Credits Modules 556, 918 with hyperlinks to the Press Kit Reports 550 of Elements 201 within the sentence. The Conjunctive Project Sentence of Credit Construct 551 for Places 204 reports information from the Credit Bytes 164 and from the Relational Information 120 from a Places Point of View 580 and displays in the Credits Modules 582, 584, 586, 588, 918 with hyperlinks to the Press Kit Reports 550 of Elements 201 within the sentence. The Conjunctive Project Sentence of Credit Construct 551 for Projects 216 reports information from the Credit Bytes 164 and from the Relational Information 120 from a Projects Point of View 600 and displays in the Credits Module 602, 604, 606, 608, 918 with hyperlinks to the Press Kit Reports 550 of Elements 201 within the sentence. The Conjunctive Project Sentence of Credit Construct 551 for Things 218 reports information from the Credit Bytes 164 and from the Relational Information 120 from a Things Point of View 612 and displays in the Credits Module 614, 616, 618, 620, 918 with hyperlinks to the Press Kit Reports 550 of Elements 201 within the sentence.

The People Search Engine 518 accepts criteria from the People Query Module 506 and passes the results to the People List Module 530. The Places Search Engine 520 accepts criteria from the Places Query Module 508 and passes the results to the Places List Module 532. The Projects Search Engine 522 accepts criteria from the Projects Query Module 510 and passes the results to the Projects List Module 534. The Things Search Engine 524 accepts criteria from the Things Query Module 512 and passes the results to the Things List Module 536.

Figure 2B:
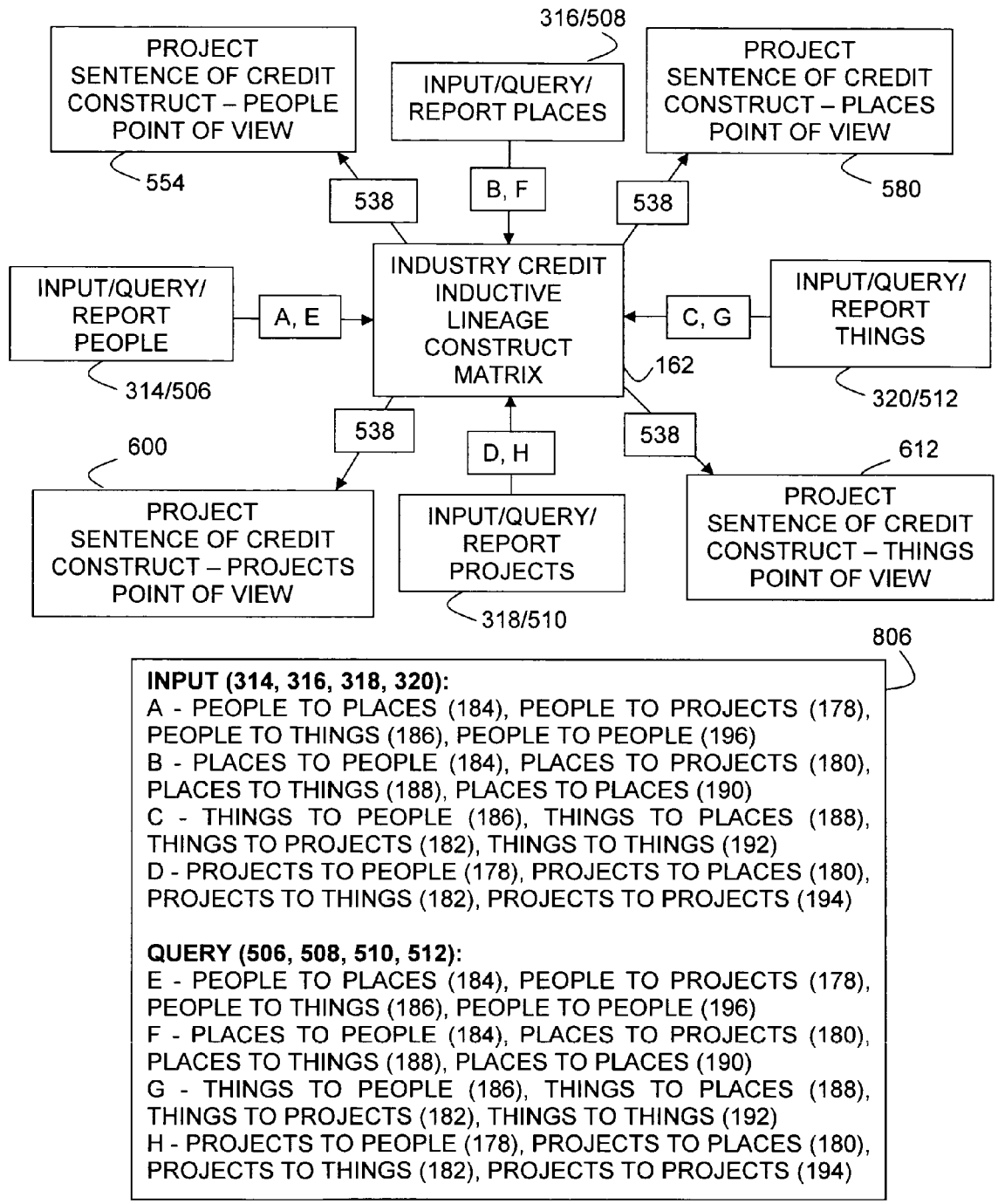
FIG. 2b is a flow chart illustrating the inputting and reporting of a ConjunctiveProject Sentence of Credit Construct via the Industry Credit Inductive Lineage Construct Matrix according to the above preferred embodiment of the present invention.

Referring now to FIG. 2b, the People Credit Input Module 314, the Places Credit Input Module 316, the Projects Credit Input Module 318, and the Things Credit Input Module 320 will input into the Industry Credit Inductive Lineage Construct Matrix 162. The People Query Module 506, the Places Query Module 508, the Projects Query Module 510, and the Things Query Module 512 will enter queries that result in the reporting of Conjunctive Project Sentences of Credit Construct from the People Point of View 554, Conjunctive Project Sentences of Credit Construct from the Places Point of View 580, Conjunctive Project Sentences of Credit Construct from the Projects Point of View 600, and Conjunctive Project Sentences of Credit Construct from the Things Point of View 612.

Figure 2C:
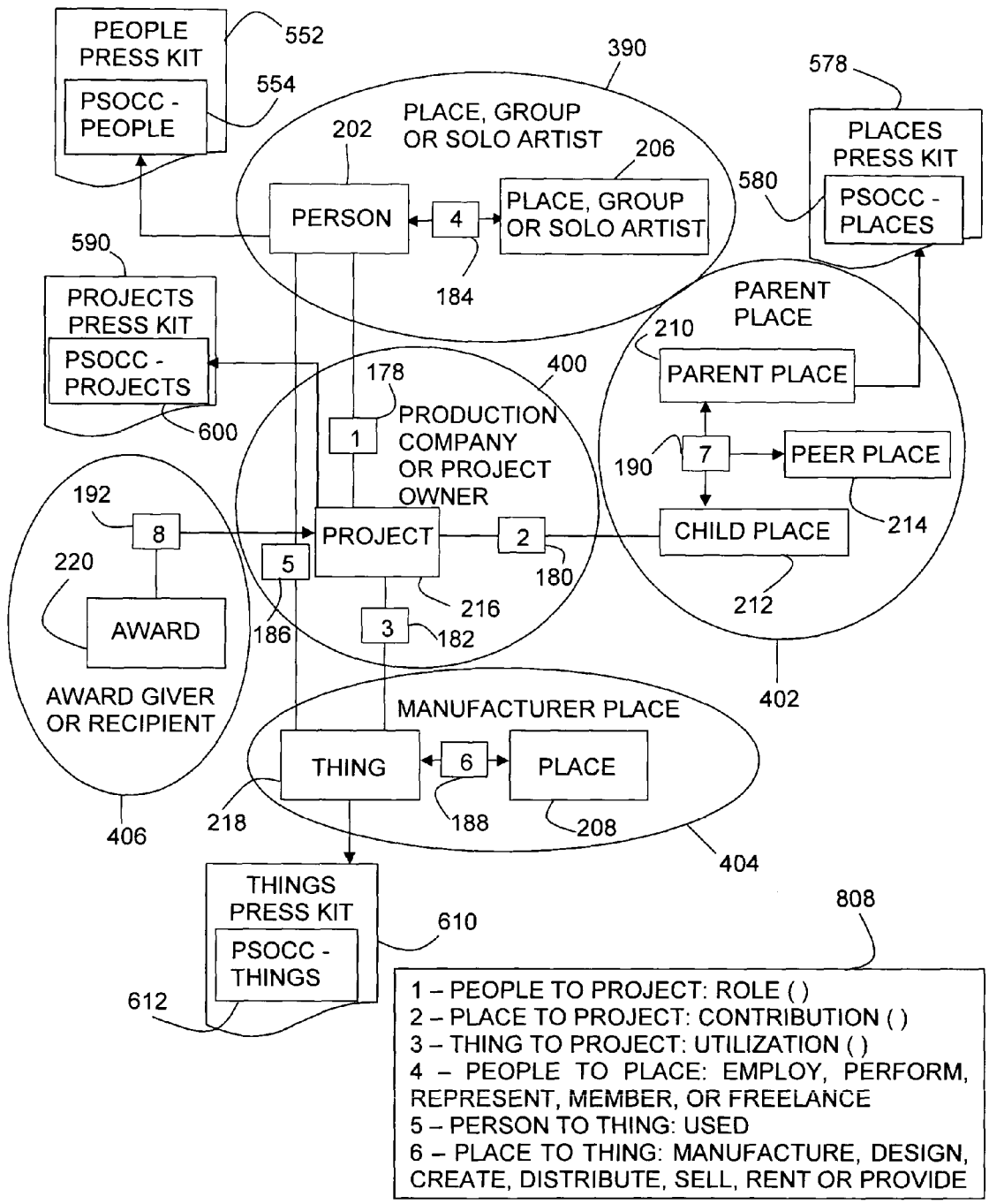
FIG. 2c is a flow chart overview of the above preferred embodiment of the present invention.
Figure 4A:
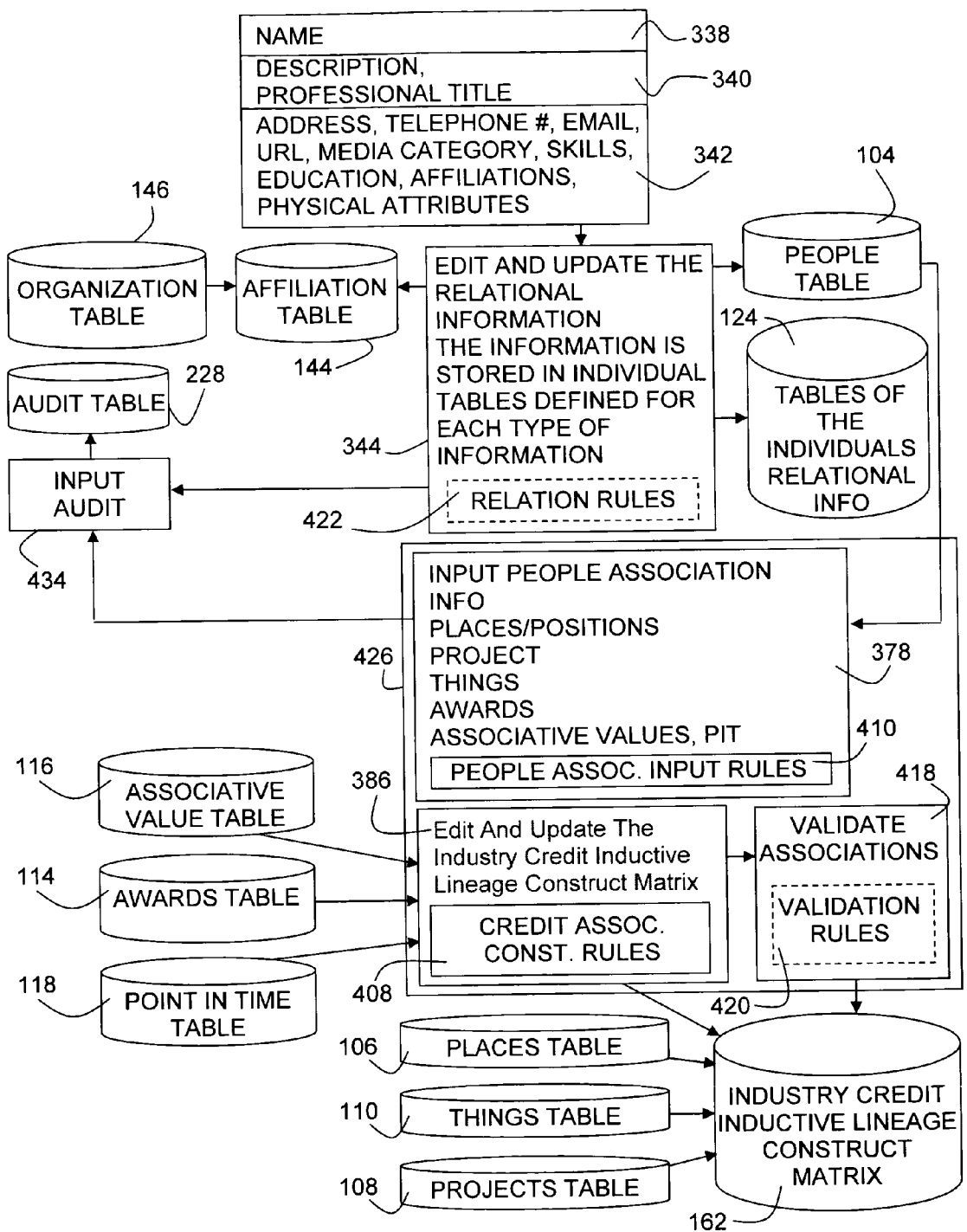
FIG. 4a is a diagram of the Method's People information input process according to the above preferred embodiment of the present invention.
Figure 5A:
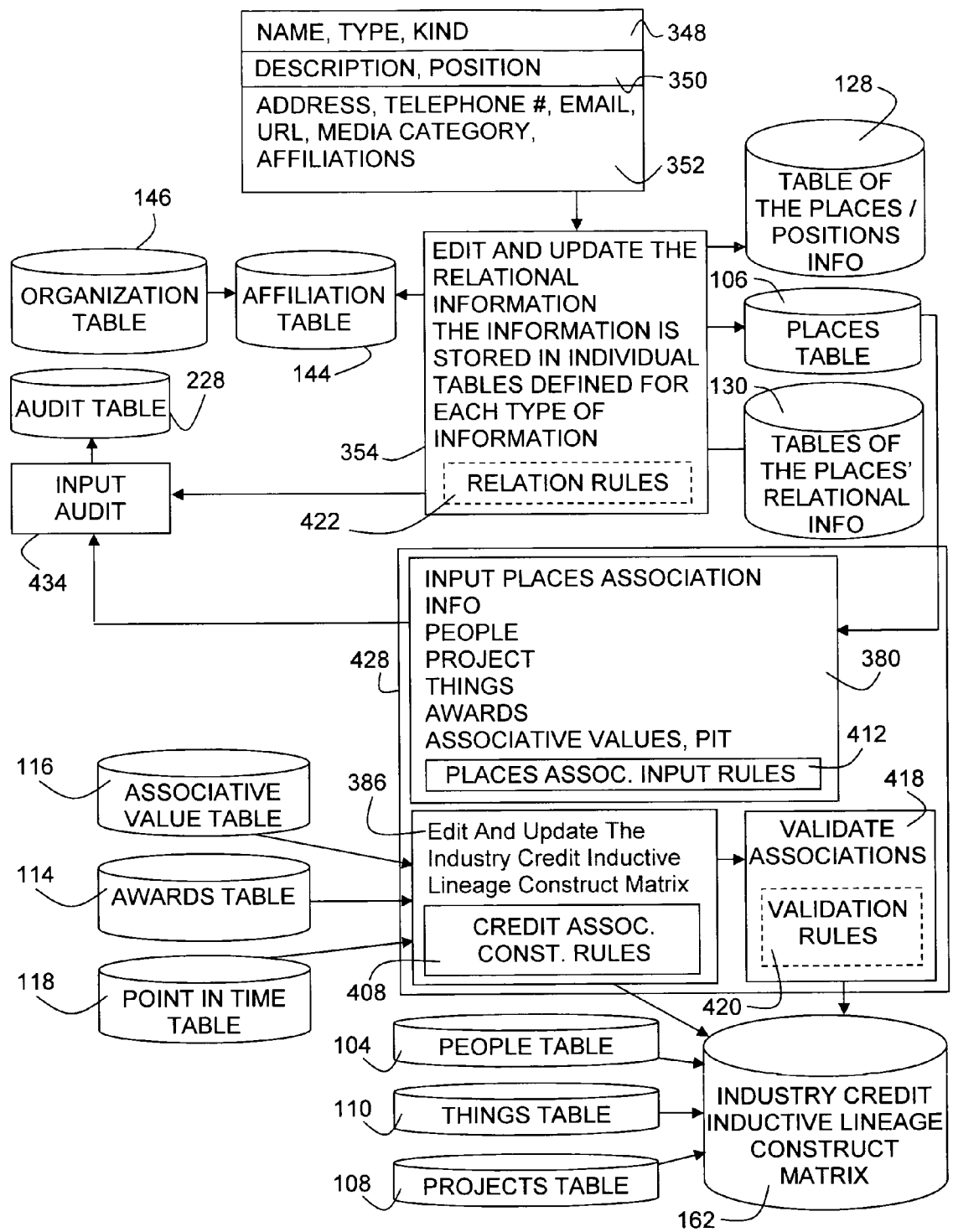
FIG. 5a is a diagram of the Method's Places information input process according to the above preferred embodiment of the present invention.

Referring now to FIG. 2c, a People Press Kit 552, containing Conjunctive Project Sentences of Credit Construct from the People Point of View 554, is outputted from the People Press Kit Generator Module 540 in the Report Writer 502 in response to a People Press Kit Request 624 for a person or People 202, where People 202 are associated to a Place, Group, or Solo Artist 206 by a People to Places Associative Value 184, whose Association Validation Rules 420 (as shown in FIG. 4a and FIG. 5a) are delegated to the Place, Group, or Solo Artist Ring of Authority 390. People 202 are associated to People 202 by a People 202 to People 202 Associative Value 196, whose Association Validation Rules 420 are delegated to the Mutual Parent/Child People Ring of Authority 398. It is readily understood that Rings of Authority 390, 398, 400, 402, 404 are necessary to delineate control of information to facilitate validated and verified information as reported.

A Places Press Kit 578, containing Conjunctive Project Sentences of Credit Construct from the Places Point of View 580, is outputted from the Places Press Kit Generator Module 542 in the Report Writer 502 in response to a Places Press Kit Request 626 and reports for a given Parent Place 210. A Child Place 212 and a Peer Place 214 are associated to the Parent Place 210 by a Places to Places Associative Value (Structure Value) 190, whose Association Validation Rules 420 are delegated to the Parent Place Ring of Authority 402.

A Projects Press Kit 590, containing Conjunctive Project Sentences of Credit Construct from the Projects Point of View 600, is outputted from the Projects Press Kit Generator Module 544 in the Report Writer 502 in response to a Projects Press Kit Request 628 for Projects 216 and reports for a given Project 216. A Project 216 is associated to People 202 by a People to Projects Associative Value (Role Value) 178, whose Association Validation Rules 420 are delegated to the Production Company or Project Owner Ring of Authority 400. Projects 216 are associated to a Child Place 212 by a Places to Projects Associative Value (Contribution Value) 180, whose Association Validation Rules 420 are delegated to the Production Company or Project Owner Ring of Authority 400. A Project 216 is associated to a Thing 218 by a Things to Projects Associative Value (Utilization Value) 182, whose Association Validation Rules 420 are delegated to the Production Company or Project Owner Ring of Authority 400.

A Things Press Kit 610, containing Conjunctive Project Sentences of Credit Construct from the Things Point of View 612, is outputted from the Things Press Kit Generator Module 546 in the Report Writer 502 in response to a Things Press Kit Request 630 and reports for Things 218. Things 218 are associated to Places 204 by a Places to Things Associative Value 188, whose Association Validation Rules 420 are delegated to the Manufacturer Place Ring of Authority 404. People 202 are associated to Things 218 by a People to Things Associative Value 186, whose Association Validation Rules 420 are delegated to the Production Company or Project Owner Ring of Authority 400. Things 218 are associated to Things 218 by a Things 218 to Things 218 Associative Value 192, whose Associative Validation Rules 420 are delegated the Manufacturer Place Ring of Authority 404.

Figure 2D:
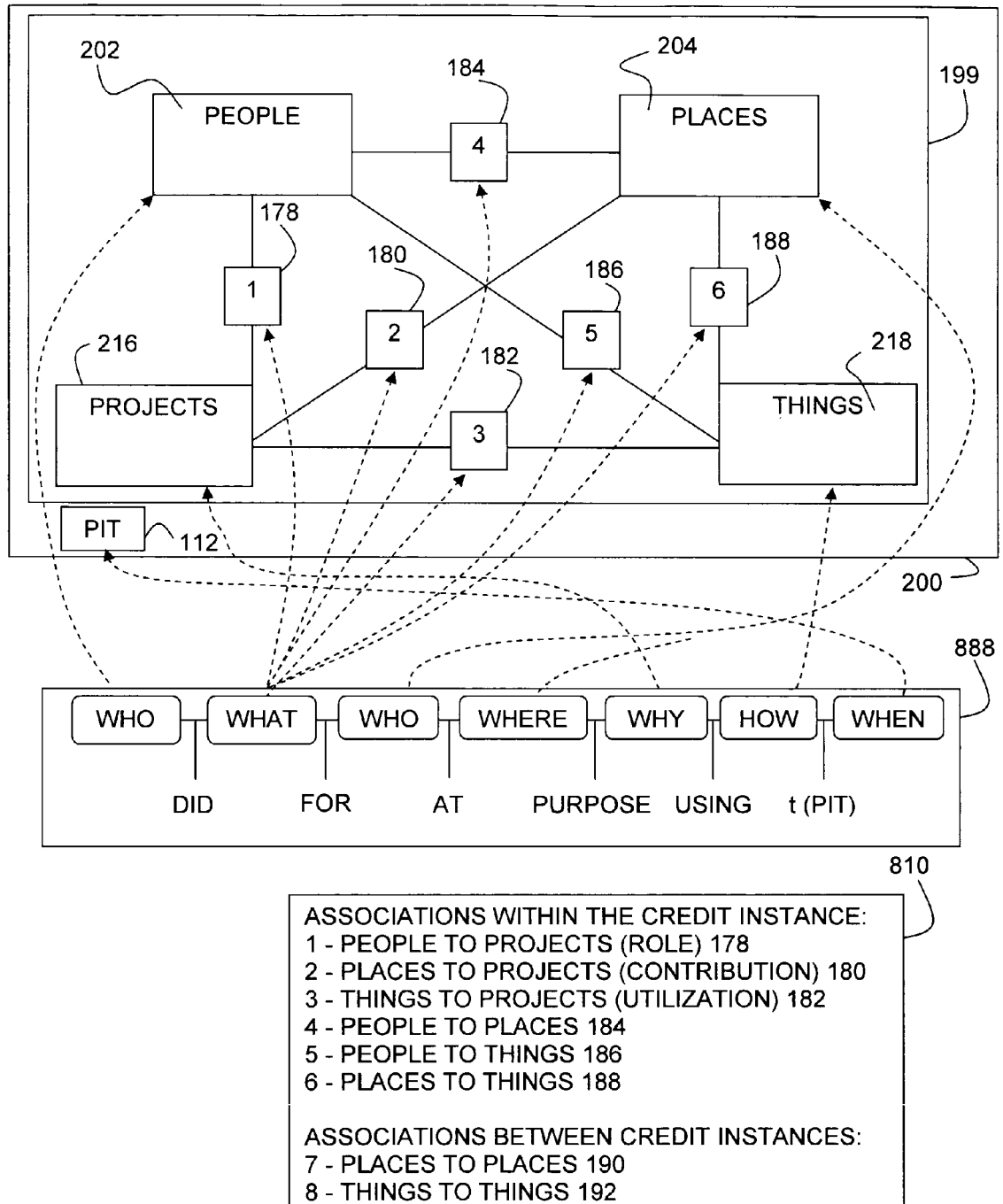
FIG. 2d is a diagram illustrating the Credit Instance and Credit Construct of the Industry Credit Inductive Lineage Construct Matrix according to the above preferred embodiment of the present invention.

Referring to FIG. 2c and FIG. 2d, industry Awards 220 are associated to a Credit Construct 199 which is an Association between the four Elements 201 People 202, Places 204, Projects 216, and Things 218 joined by the Associative Values 116 of People to Projects Associative Value (Role Value) 178, Places to Projects Associative Value (Contribution Value) 180, and Things to Projects Associative Value (Utilization Value) 182.

Figure 3A:
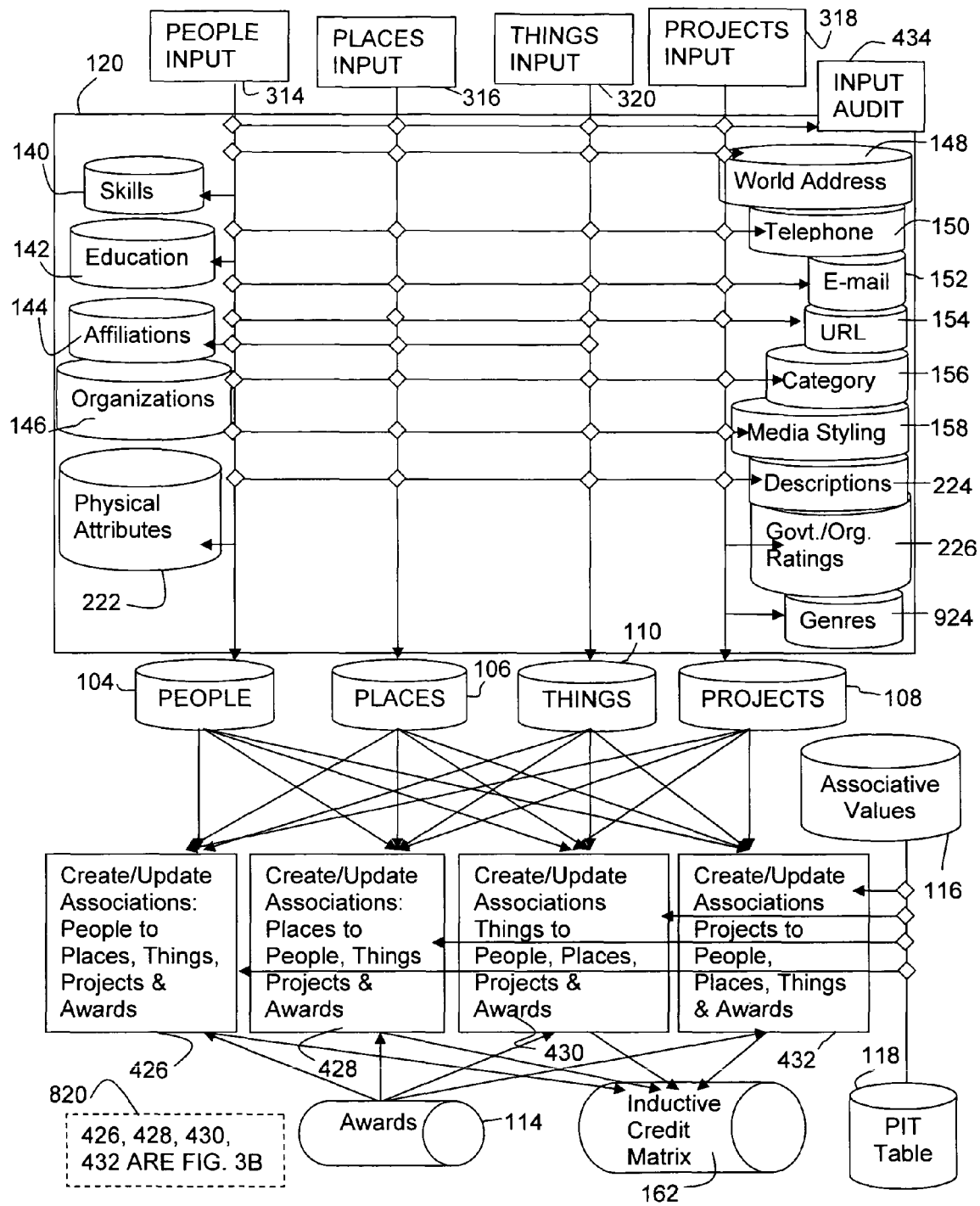
FIG. 3a is a diagram of the four main Elements' relational and associative input overview with appropriate text according to the above preferred embodiment of the present invention.

These Awards 220 are taken from the Awards Table 114, as shown in FIG. 3a. Awards 220 are associated to the Credit Construct 199. The Awards to Recipient Associative Value 198 determines who is the recipient of the Awards 220, either the People 202, Places 204, Projects 216, or Things 218. In other words, Awards 220 are associated to Projects 216, People 202, or a Child Place 212, or Things 218, by the Awards to Recipient Associative Value 198, whose Association Validation Rules 420 are delegated to the Award Giver or Recipient Ring of Authority 406.

The People 202, Places 204, Projects 216, and Things 218 are four Elements 201 identified by an ID 101 within the Relational Database 100. People 202 perform a service or function that contributes to the development or production of a product or Projects 216, wherein People 202 Elements 201 are used in the Credit Construct 199. They are also defined in a People Information Table 104 and a People Relational Information Table 124, as shown in FIG. 2e.

Figure 2E:
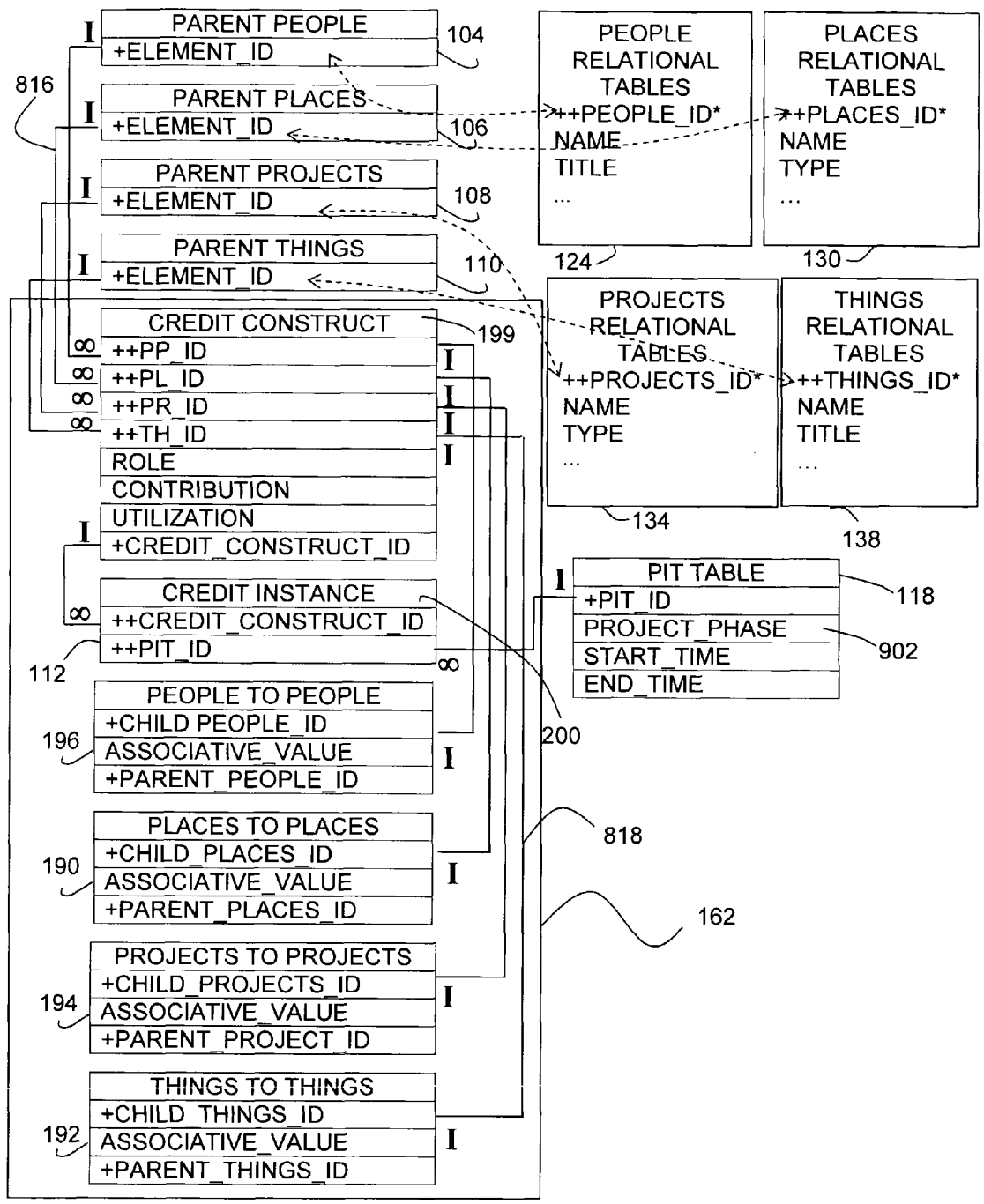
FIG. 2e is a diagram showing the Element and Industry Credit Inductive Lineage Construct Matrix tables for the Conjunctive Project Sentence of Credit Construct according to the above preferred embodiment of the present invention.

Referring to FIG. 2e and FIG. 4a, the People Information Table 104 is a database table for storing the basic information about the People 202. The People Information Table 104 stores the People 202 ID 101, first name, last name, nickname (aka), professional title, and description. The Validate Associations 418 process uses this information to help identify the Elements 201. Some or all of this information may be reported in the Press Kit Reports 550.

Figure 3B:
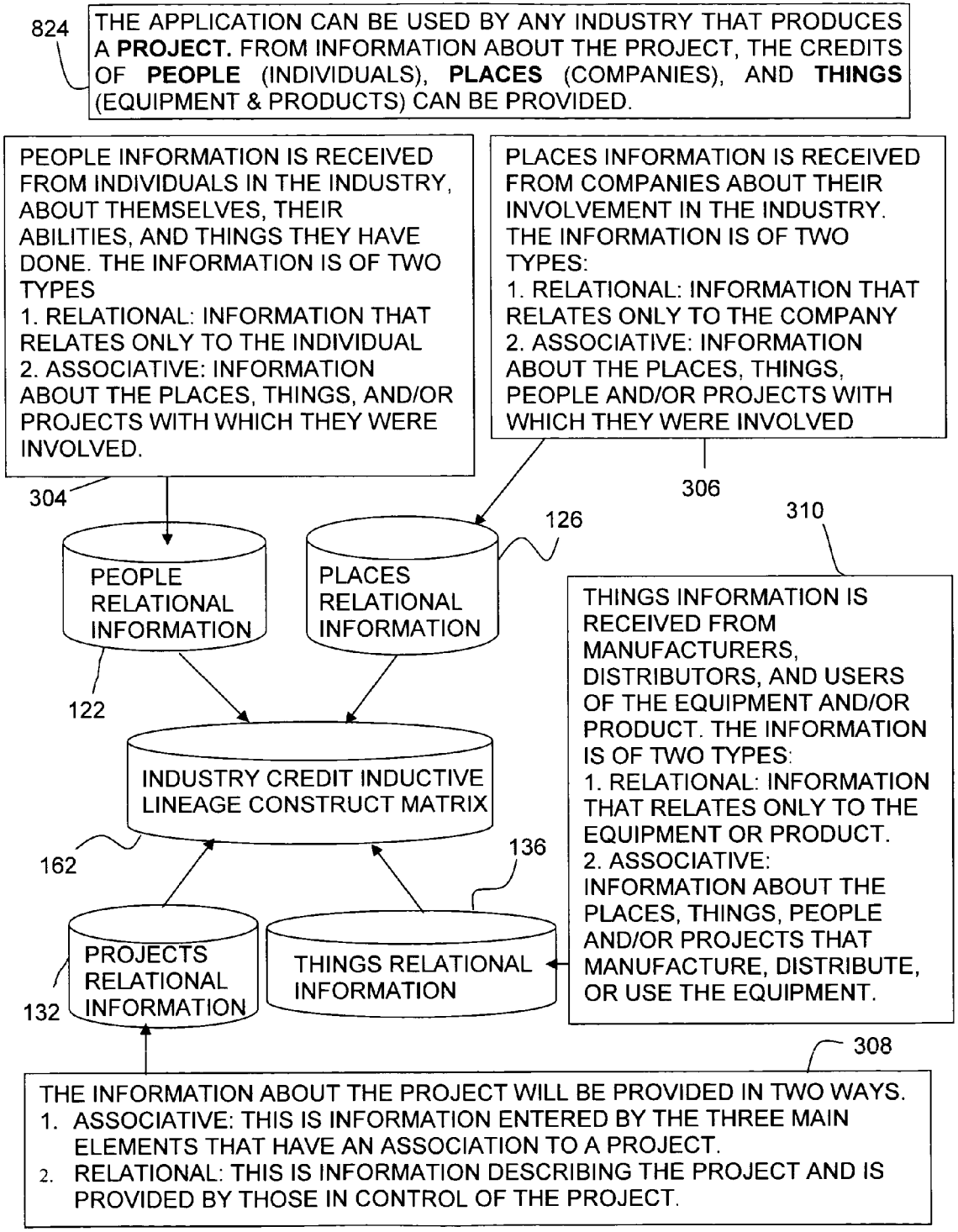
FIG. 3b is a schematic diagram illustrating the relational and associative information inputting process of the Method's four main Elements which consist of People, Places, Projects and Things with appropriate text according to the above preferred embodiment of the present invention.

Referring to FIG. 2e and FIG. 3b, the People Relational Information Table 124 is a database table that holds and stores a People Relational Information 122 which is Relational Information 120 about the People 202. The Validate Associations 418 process uses this information to help identify the People 202. Some or all of this information may be reported in the Press Kit Reports 550.

Referring to FIG. 2d, FIG. 2e and FIG. 3a, the Places 204 is one of the four Elements 201, identified by an ID 101 within the Relational Database 100. The Places 204 are where a service or function was performed that contributed to the development or production of a Projects 216, product or service. Places Elements 206, as shown in FIG. 8b, are used in the Credit Construct 199. They are also defined in the Places Information Table 106 and Places Relational Information Table 130.

Referring to FIG. 5a and FIG. 8b, the Places 204 Elements 201, where the Place is either a Place (PL), a Group (GA), or a Solo Artist (SA) 206, as defined by the Places 204 kind field in a Places Information Table 106 which is a Relational Database 100 table that contains the information about Places 204, may be associated as Parent Places 210 Elements 201 to a child People 202 Element 201 with Associative Values 116 "employ," "perform," "represent," "member," and "freelance."

Places 204 are the physical locations where work was done. Places Information Table 106 is used for storing the basic information about the Places 204 such as the Places 204 ID 101, Places Name 236, Places 204 type, Places 204 kind (e.g., entertainment company, facility, manufacturer, services, group artist, or solo artist), Places 204 description, and places positions. The Validate Associations 418 process uses this information to help identify the Elements 201. Some or all of this information may be reported in the Press Kit Report 550.

The Places Information Table 106 contains a Manufacturer Place 208, a Parent Place 210, a Child Place 212, and a Peer Place 214. The Manufacturer Place 208 is a Places 204 Element 201 where the Place Kind field is set with a value, and may be associated to a Things 218 using a Places to Things Associative Value 188 within a table in the Industry Credit Inductive Lineage Construct Matrix 162.

The Parent Place 210 is a Places 204 that is in the parent position in an Association 176 between two Places 204. The parent position is determined by the selected value for a Places to Places Associative Value (Structure Value) 190. A Parent Place 210 is associated to a Child Place 212 using the Places to Places Associative Value (Structure Value) 190 within the table in the Industry Credit Inductive Lineage Construct Matrix 162.

The Child Place 212 is a Places 204 that is in the child position in an Association 176 between two Places 204. The child position is determined by the selected value for the Places to Places Associative Value (Structure Value) 190. The Parent Place 210 has an Association 176 to a Child Place 212 using the Places to Places Associative Value (Structure Value) 190 within the table in the Industry Credit Inductive Lineage Construct Matrix 162.

The Peer Place 214 is a Places 204 that has a peer Association 176 with another Place 204. Two Places 204 have a peer Association 176 when they both have an Association 176 as childs to the same Parent Place 210. The Peer Place 214 may appear in the Press Kit Reports 550.

A Places Relational Information Table 130, as shown in FIGS. 2e, 3b and 5a, is a database table that holds and stores the Places Relational Information 126 which is Relational Information 120 about the Places 204. The Validate Associations 418 process uses this information to help identify the Places 204. Some or all of this information may be reported in the Press Kit Report 550.

Figure 6A:
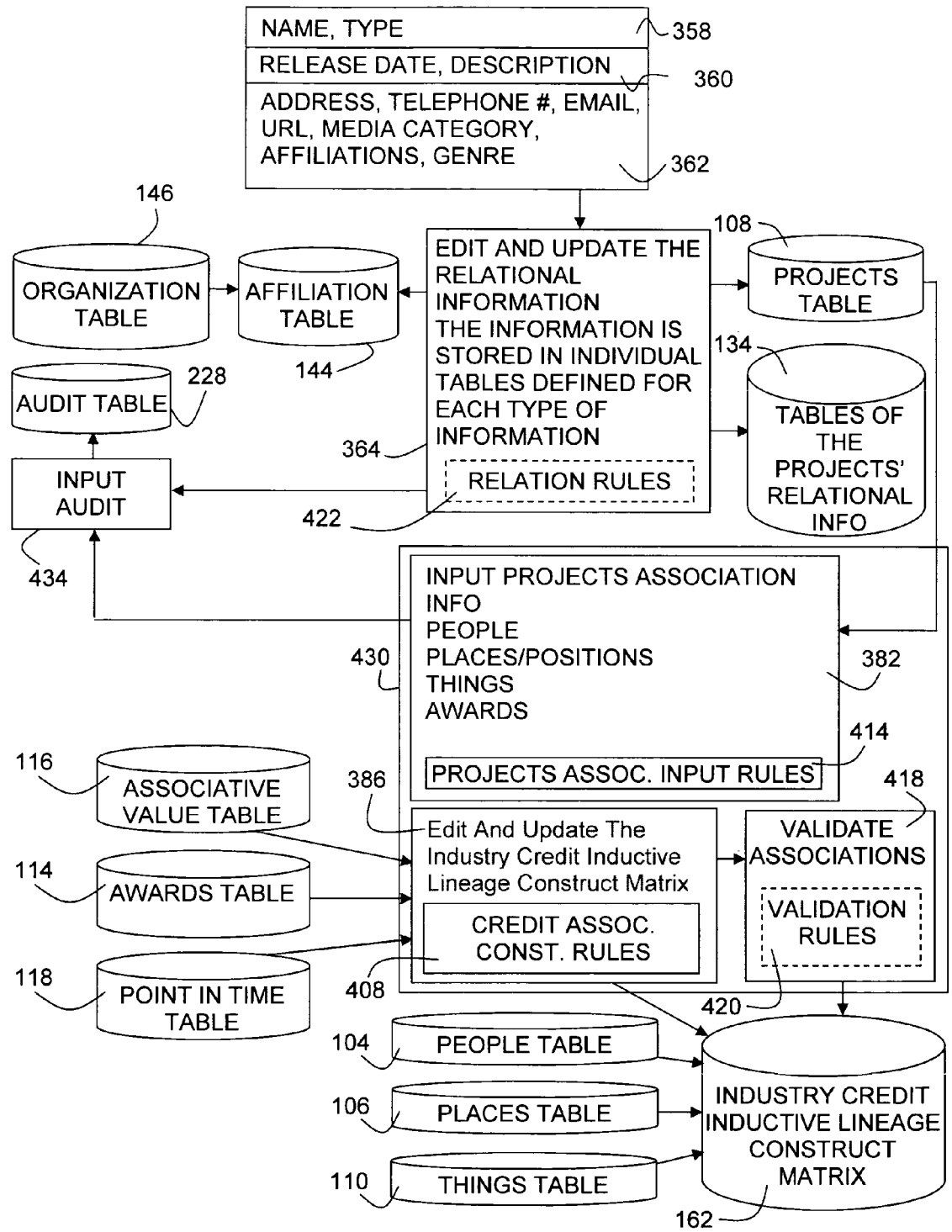
FIG. 6a is a diagram of the Method's Projects information input process according to the above preferred embodiment of the present invention.
Figure 10A:
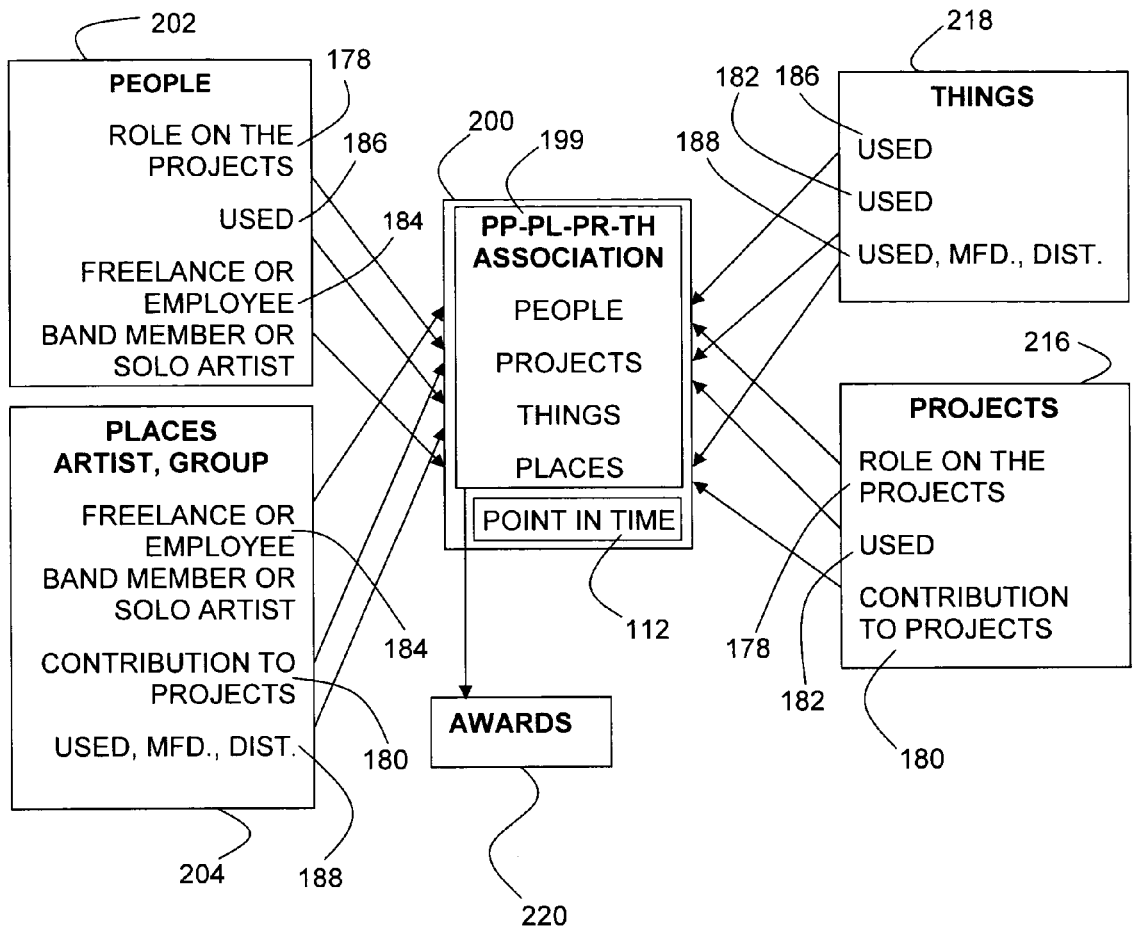
FIG. 10a is a diagram illustrating the main Elements, associative values and the industry Awards according to the above preferred embodiment of the present invention.

Referring to FIG. 10a, the Projects 216 is one of the four Elements 201 and Projects 216 Elements 201 are used in the Credit Construct 199 and defined in a Projects Information Table 108 and a Projects Relational Information Table 134, as shown in FIG. 6a. The Projects Information Table 108 is a database table that contains the information about the Projects 216. Projects 216 are the result of the work that was done.

The Projects Information Table 108 stores the Projects 216 ID 101, Projects Name 238, Projects 216 type, Projects 216 Publication Date 930, and Projects 216 description It is for storing the basic information about the Projects 216. The Validate Associations 418 process uses this information to help identify the Element 201. Some or all of this information may be reported in the Press Kit Report 550.

The Projects Relational Information Table 134, as shown in FIGS. 2a, 3b and 6a, is a database table that holds and stores Projects Relational Information 132 which is Relational Information 120 about the Projects 216. The Validate Associations 418 process uses this information to help identify the Projects 216. Some or all of this information may be reported in the Press Kit Report 550.

Figure 7A:
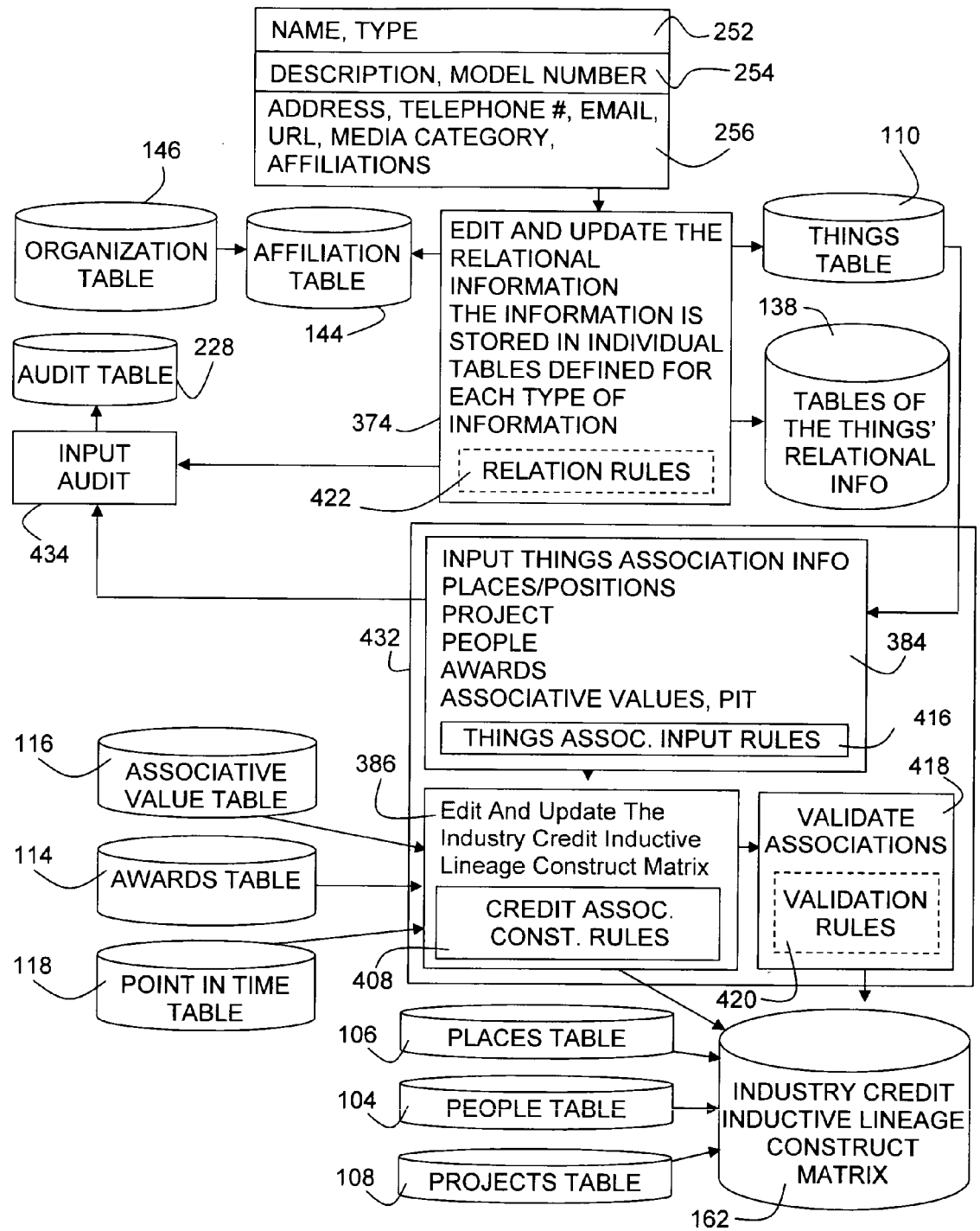
FIG. 7a is a diagram of the Method's Things information input process according to the above preferred embodiment of the present invention.

Referring to FIG. 10a, the Things 218 is one of the four Elements 201 and Things 218 Elements 201 are used in the Credit Construct 199 and defined in a Things Information Table 110 and a Things Relational Information Table 138, as shown in FIG. 7a.

The Things Information Table 110, as shown in FIGS. 2e, 3a and 7a, is a database table that contains the information about the Things 218. Things 218 are tools used in production. Things Information Table 110 stores the basic information about the Things 218: Things Name 240, Things 218 type, and Things 218 description. The Validate Associations 418 process uses this information to help identify the Element 201. Some or all of this information may be reported in the Press Kit Report 550

The Things Relational Information Table 138, as shown in FIGS. 2e, 3b and 7a, is a database table that holds and stores the Things Relational Information 136 which is Relational Information 120 about the Things 218. The Validate Associations 418 process uses this information to help identify the Things 218. Some or all of this information may be reported in the Press Kit Report 550.

Referring to FIG. 2d, a Credit Instance 200 may comprise the People 202, Places 204, Projects 216 and Things 218 associated by different Associative Values 116 including the People to Projects Associative Value (Role Value) 178, the Places to Projects Associative Value (Contribution Value) 180, and the Things to Projects Associative Value (Utilization Value) 182 in relation to a Point In Time 112. Credit Instance 200 to Credit Instance 200 Associations 176 include People to Places Associative Value 184, People to Things 186 Associative Value, and Places to Things Associative Value 188. Lineage Associations 864, are achieved through the Association 176 of a Credit Construct 199 to another Credit Construct 199, comprising Places to Places Associative Value (Structure Value) 190, Things to Things Associative Value (Integration Value) 192, Projects to Projects Associative Value (Usage Value) 194, and People to People Associative Value (Organization Value) 196, as shown in FIG. 2e.

The Credit Instance 200 is a Credit Construct 199 with the Point In Time (PIT) 112. The Credit Instance 200 delineates when a Credit Construct 199 occurs. This allows Inferences 842 to be made when Credit Constructs 199 overlap at the same Point In Time 112 (intersect). The Point In Time 112 that is used is dependent on the embodiment's rules defining a Point In Time 112. In other words, a Credit Bit 102 that associates a Credit Construct 199 to a Point In Time (PIT) 112 thus creates a Credit Instance 200. The Point In Time 112 defines when the effort happened and determines when constructs intersect so that Inferences 842 can be made. The Credit Bits 102, which are Elements 201, Associative Values 116, and Point in Time 112, are components that go into making ConjunctiveProject Sentences of Credit Construct 551. The Credit Bits 102 are composed of the values extracted from the Credit Data 302.

As shown in FIG. 3a, the Associative Values 116 are Relational Database 100 fields that describe the Association 176 between two Elements 201 (People 202, Places 204, Projects 216, Things 218). In other words, the Associative Values 116 are Associative Values 116 used to join People 202 to Projects 216 (Role Value), Places 204 to Projects 216 (Contribution Value), and Things 218 to Projects 216 (Utilization Value) in the Credit Construct 199. Construct-to-Construct associations use Associative Values 116 for People 202 to People 202 (Organization Value), People 202 to Places 204, People 202 to Things 218, Places 204 to Things 218, Things 218 to Things 218 (Integration Value), Places 204 to Places 204 (Structure Value), and Projects 216 to Projects 216 (Usage Value).

As shown in FIG. 2d, the People to Projects Associative Value (Role Value) 178 is an Associative Value 116 that joins People 202 to Projects 216. The Role Value 178 is what the People 202 did on the Projects 216. The Role Value 178 is used in the Association 176 of People 202 to Projects 216 within the Credit Construct 199. It uses a list of updatable values from the Associative Value Table 117. The existence of this Association 176 between two Elements 201 may cause a hyperlink in the Conjunctive Project Sentences of Credit Construct 551 to appear in the Elements' 201 Press Kit Reports 550.

The Places to Projects Associative Value (Contribution Value) 180 is an Associative Value 116 that joins Places 204 to Projects 216. The Contribution Value 180 is what the Places 204 did on the Projects 216. The Contribution Value 180 is used in the Association 176 of Places 204 to Projects 216 within the Credit Construct 199. It also uses a list of updatable values from the Associative Value Table 117. The existence of this Association 176 between two Elements 201 may cause a hyperlink in the ConjunctiveProject Sentences of Credit Construct 551 to appear in the Elements' 201 Press Kit Reports 550.

The Things to Projects Associative Value (Utilization Value) 182 is an Associative Value 116 that joins Things 218 to Projects 216. The Utilization Value 182 is used in the Association 176 of Things 218 to Projects 216 within the Credit Construct 199. It also uses a list of updatable values from the Associative Value Table 117. Again, the existence of this Association 176 between two Elements 201 may cause a hyperlink in the ConjunctiveProject Sentences of Credit Construct 551 to appear in the Elements' 201 Press Kit Reports 550.

A People to Places Associative Value 184 is an Associative Value 116 that joins People 202 to Places 204. It uses a fixed list of values, which may include "employ," "perform," "represent," "member," and "freelance." This is used in the Association 176 of People 202 to Places 204 between Credit Constructs 199. It uses a list of updatable values from the Associative Value Table 117. Again, the existence of this Association 176 between two Elements 201 may cause a hyperlink in the ConjunctiveProject Sentences of Credit Construct 551 to appear in the Elements' 201 Press Kit Reports 550.

A People to Things Associative Value 186 is an Associative Value 116 that joins People 202 to Things 218. It uses a fixed list of values, which may include "used." This is used in the Association 176 of People 202 to Things 218 between Credit Constructs 199. It also uses a list of updatable values from the Associative Value Table 117. Again, the existence of this Association 176 between two Elements 201 may cause a hyperlink in the ConjunctiveProject Sentences of Credit Construct 551 to appear in the Elements' 201 Press Kit Reports 550.

A Places to Things Associative Value 188 is an Associative Value 116 that joins Places 204 to Things 218. It uses a fixed list of values, which may include "manufacture," "design," "create," "distribute," "sell," "rent' and "provide." This is used in the Association 176 of Places 204 to Things 218 between Credit Constructs 199. Also, it uses a list of updatable values from the Associative Value Table 117. Again, the existence of this Association 176 between two Elements 201 may cause a hyperlink in the Conjunctive Project Sentences of Credit Construct 551 to appear in the Elements' 201 Press Kit Reports 550.

Referring to FIG. 2e, a Places to Places Associative Value (Structure Value) 190 is an Associative Value 116 that joins Places 204 to Places 204. It uses a fixed list of values, which may include "facility," "subsidiary," "division," or "partner." The Structure Value 190 is used in the association of Places 204 to Places 204 between Credit Constructs 199. Also, it uses a list of updatable values from the Associative Value Table 117. Again, the existence of this Association 176 between two Elements 201 may cause a hyperlink in the Conjunctive Project Sentences of Credit Construct 551 to appear in the Elements' 201 Press Kit Reports 550.

A Things to Things Associative Value (Integration Value) 192 is an Associative Value 116 that joins Things 218 to Things 218. The Integration Value 192 uses a fixed list of values, which may include "component." This is used in the Association 176 of Things 218 to Things 218 between Credit Constructs 199. Again, it uses a list of updatable values from the Associative Value Table 117. Again, the existence of this Association 176 between two Elements 201 may cause a hyperlink in the Conjunctive Project Sentences of Credit Construct 551 to appear in the Elements' 201 Press Kit Reports 550.

A Projects to Projects Associative Value (Usage Value) 194 is an Associative Value 116 that joins Projects 216 to Projects 216. The Usage Value 194 uses a fixed list of Values, which may include "component." This is used in the Association 176 of Projects 216 to Projects 216 between Credit Constructs 199. Also, it uses a list of updatable values from the Associative Value Table 117 and the existence of this Association 176 between two Elements 201 may cause a hyperlink in the Conjunctive Project Sentences of Credit Construct 551 to appear in the Elements' 201 Press Kit Reports 550.

A People to People Associative Value (Organization Value) 196 is an Associative Value 116 that joins People 202 to People 202. The Organization Value 196 uses a fixed list of values, which may include "colleague". This is used in the association of People 202 to People 202 between Credit Constructs 199. Also, it uses a list of updatable values from the Associative Value Table 117 and the existence of this Association 176 may cause a hyperlink in the Conjunctive Project Sentences of Credit Construct 551 to appear in the Elements 201 Press Kit Report 550.

An Awards to Recipient Associative Value 198 is an Associative Value 116 that specifies People 202, Places 204, Projects 216, or Things 218 as an Awards 220 recipient. This is used in the Association 176 of Awards 220 to the Credit Construct 199 in order to define which Element 201 in the Credit Construct 199 received the Award 220.

Referring to FIG. 2e, The People Information Table 104, the Places Information Table 106, the Projects Information Table 108, and the Things Information Table 110 are related to the Credit Construct 199 via a One to Many Relationship 816 which is used in the Industry Credit Inductive Lineage Construct Matrix 162. The People to People Associative Value (Organization Value) 196, the Places to Places Associative Value (Structure Value) 190, the Projects to Projects Associative Value (Usage Value) 194, and the Things to Things Associative Value (Integration Value) 192 have a One to One Relationship 818 used in the Industry Credit Inductive Lineage Construct Matrix 162 with the Credit Construct 199. The Places Information Table 106, the Projects Information Table 108, and the Things Information Table 110 are linked to the People Relational Information Table 124, the Places Relational Information Table 130, the Projects Relational Information Table 134, and the Things Relational Information Table 138, respectively. The Credit Construct 199 is related to the Credit Instance 200 by the One to Many Relationship 816. The Point in Time 112 within the Credit Instance 200 comes from the Point in Time Table 118 which is a table that stores the Points In Time 112 (e.g., Concept Development, Pre-Production, Production, Post-Production, Manufacturing/Distribution/Promotion), and Phase Start Time 904 and Phase End Time 906. An ID 101 in the Point in Time Table 118 is tied to the Credit Construct 199 which hence forms the Credit Instance 200.

Referring to FIG. 3a, the Relational Information 120 is input by the People Credit Input Module 314, the Places Credit Input Module 316, the Things Credit Input Module 320, and the Projects Credit Input Module 318. The Relational Information 120 may include World Address 148, Telephone 150, E-mail 152, URL 154, Media Category 156, MediaStyling 158, Skills 140, Education 142, Physical Attributes 222, Description Fields 224, Government/Organizational Ratings 226, and Affiliations 144 which are related to Organizations 146.

The Skills & Talents 140, which is a table of information about skills and talents, including a skill/talent field and a skill/talent description field, may be related to People 202 to describe what tasks they are capable of performing, to the extent that it will help them be chosen for upcoming Projects 216.

The Education 142, which is a table of information about education and training, including degrees and certifications including the fields: institution name, degree/certification name, education description, and year received, may be related to People 202 to describe what their educational and training background is, to the extent that it will help them be chosen for upcoming Projects 216.

The Affiliations 144 is a table containing information that relates People 202 and Places 204 to Organizations 146. It's for showing what Organizations 146 People 202 and Places 204 are members of This information may be reported in Press Kit Reports 550 for People 202 and Places 204. This information is helpful in promoting the People 202 and the Places 204 for use in upcoming Projects 216 because the Organizations 146 that they are a member of may help them get work.

The Organizations 146, which is a table containing information about organizations, relates to the People 202 and the Places 204 through the Affiliations 144 in order to show what Organizations 146 they are a member of.

The World Addresses 148, which is a table of information containing addresses, is related to People 202, Places 204, Projects 216 and Things 218 to report where a People 202, Places 204, Projects 216, or Things 218 reside or may be contacted in the Press Kit Reports 550 via postal mail.

The Telephone 150, which is a table of information containing telephone numbers, is related to People 202, Places 204, Projects 216 and/or Things 218, to show how somebody may contact them by using a Telephone 150. This information is reported in Press Kit Reports 550.

The Email 152, which is a table of information containing email addresses, is related to People 202, Places 204, Projects 216 and/or Things 218, to show how somebody may contact them by using Email 152. This information is reported in Press Kit Reports 550.

The URL 154 is a table of information containing URL's which are universal resource locator addresses. The URL 154 is used for retrieving web pages through the Internet 714, as well as FTP sites and gopher sites. A URL 154 is related to People 202, Places 204, Projects 216 and Things 218 to display in Press Kit Reports 550 the address of their web site, or other sites.

The Media Category 156 is a table of information containing the media categories Music 954, Theater 956, Radio 958, Movies 960, Television 962, Multimedia 964, the Web 966, and Other 968, as shown in FIG. 17f. The table also contains the ID's 101 of the Elements 201 that are related to each Media Category 156. It shows what Media Category 156 an Element 201 belongs to, to the extent that it helps define the type of industry work they have done and will be doing. This information may be reported in the Press Kit Reports 550.

The MediaStyling 158 is the information reported in the Press Kit Report's 550 MediaStyling Module 566 to describe how a person likes to perform their work. This information is helpful in promotion.

The Physical Attributes 222, which is Data 800 stored that holds the physical attributes (e.g. eye color, hair color, height, etc.), are related to Elements 201, often People 202. Physical Attributes 222 are used in the practice of casting.

The Description Fields 224 are blocks of text that give the Press Kit Owner 908 additional creative space to present themselves. It is used in various modules of the Press Kit Report 550. May also be searched by the Search Engine 518, 520, 522, 524.

The Ratings 226 is an independent system applied to Projects 216 that provides information about the content and/or appropriateness of the content to a prospective consumer. The Ratings 226 are related to Projects 216 and appear in the Conjunctive Project Sentences of Credit Construct 551 in a pop-up display.

As shown in FIG. 3a, the People Information Table 104, the Places Information Table 106, the Things Information Table 110, and the Projects Information Table 108 are associated to the Awards Table 114, and the People 202, Places 204, Projects 216, and Things 218 are used in the Industry Credit Inductive Lineage Construct Matrix 162, joined by Associative Values 116. All input goes to the Input Audit 434 process which tracks all changes to the Relational Databases 100. Data 800 for Media Category 156 may be Music 954, Theater 956, Radio 958, Movies 960, Television 962, Multimedia 964, the Web 966, and Other 968.

Figure 3C:
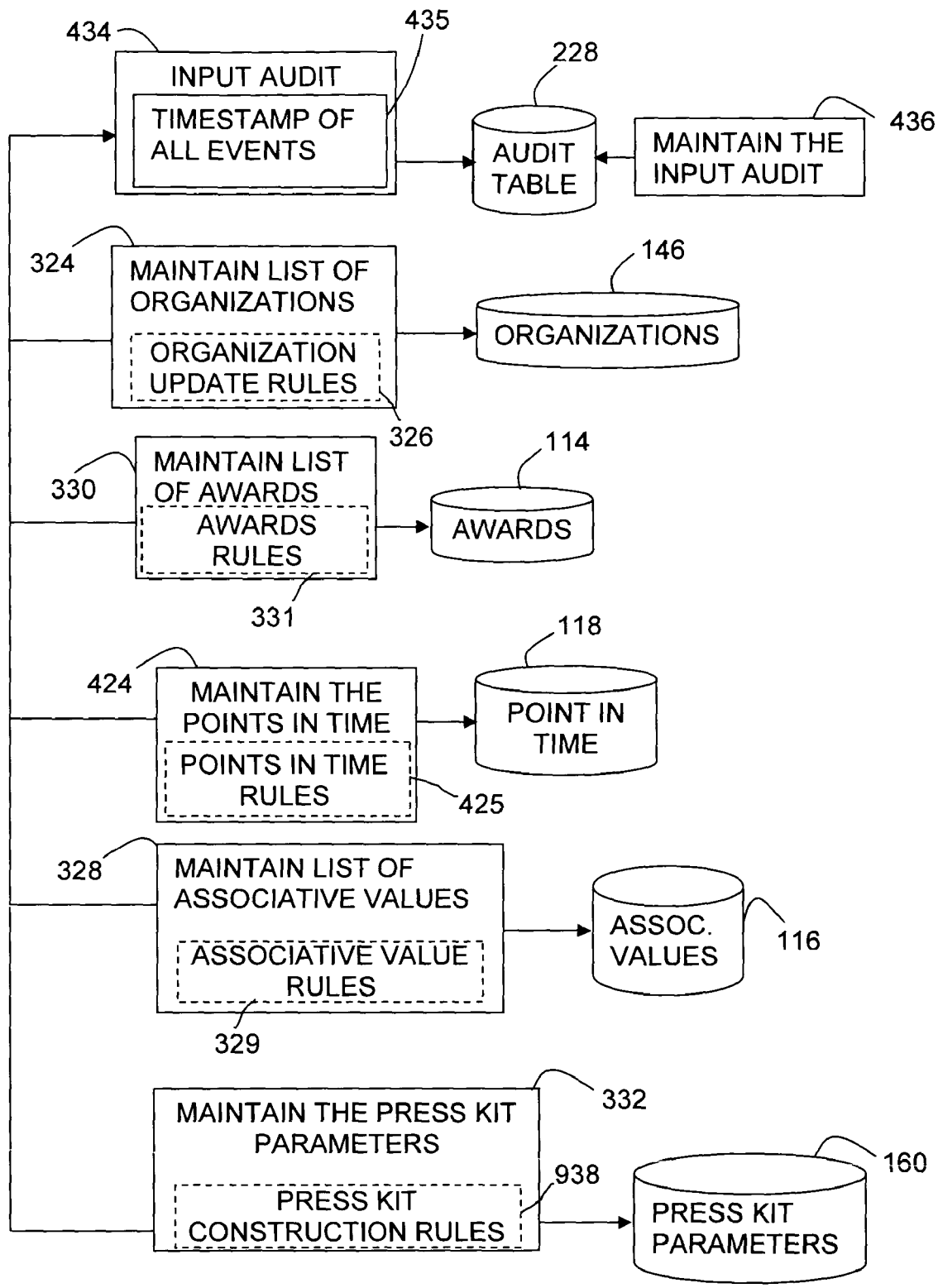
FIG. 3C is a diagram illustrating a maintain list of organizations process according to the above preferred embodiment of the present invention.

In which, an Input Audit 434 is a process for recording input and maintenance actions by the input and maintenance processes. As shown in FIG. 3c, an Audit Table 228 is a table that holds information that tracks the input and maintenance actions that have occurred throughout the life of the system. It is used by the Input Audit 434.

Referring to FIG. 3b, the information is provided for input in either of two ways: a People Relational or Associative Information Process 304, a Places Relational or Associative Information Process 306, a Projects Relational or Associative Information Process 308, and a Things Relational or Associative Information Process 310. If the information is relational, it is input into the People Relational Information Tables 124, the Places Relational Information Tables 130, the Projects Relational Information Tables 134, and the Things Relational Information Tables 138. If the information is associative, it is input into the Industry Credit Inductive Lineage Construct Matrix 162.

The People Relational or Associative Information Process 304 is a process that receives Associative (Credit Data 302) and People Relational Information 122 from the People 202. The People Relational or Associative Information Process 304 accepts information from People 202 outside the system and passes it to the Data Input 300 process where the information is input as Relational Information 120 or Associations 176 of People 202, Places 204, Projects 216, and Things 218.

The Places Relational or Associative Information Process 306 is a process that receives Associative (Credit Data 302) and Places Relational Information 126 from the Places 204. The Places Relational or Associative Information Process 306 accepts information from Places 204 outside the system and passes it to the Data Input 300 process where the information is input as Relational Information 120 or Associations 176 of People 202, Places 204, Projects 216, and Things 218.

The Projects Relational or Associative Information Process 308 is a process that receives Associative (Credit Data 302) and Projects Relational Information 132 from the Projects 216. The Projects Relational or Associative Information Process 308 accepts information from Projects 216 outside the system and passes it to the Data Input 300 process where the information is input as Relational Information 120 or Associations 176 of People 202, Places 204, Projects 216, and Things 218.

The Things Relational or Associative Information Process 310 is a process that receives Associative (Credit Data 302) and Things Relational Information 136 from the Things 218. The Things Relational or Associative Information Process 310 accepts information from Things 218 outside the system and passes it to the Data Input 300 process where the information is input as Relational Information 120 or Associations 176 of People 202, Places 204, Projects 216, and Things 218.

Referring to FIG. 3c, the Maintain List of Organizations Process 324 maintains the Organizations 146 according to the Organization Update Rules 326, the Maintain List of Associative Values Process 328 maintains the Associative Values 116 according to the Associative Value Rules 329, and the Maintain List of Awards Process 330 maintains the list of Awards Table 114 according to the Awards Rules 331.

The Maintain The Points in Time Process 424 maintains the Point in Time Table 118 by updating Point In Time Table 118 whenever there is a change to the Point In Time Table 118 according to the Point in Time Rules 425. The Input Audit 434 is a process for recording input and maintenance actions by means of the input and maintenance processes so as to keep track of all changes to the Relational Databases 100 and performs a Timestamp of All Events 435, that is to attach the current time for any input or maintenance action where time is retrieved from the server by an Input Audit 434. The Input Audit 434 updates the Input Audit Table 228. A Maintain the Input Audit Process 436 maintains the Input Audit Table 228.

A Maintain the Press Kit Parameters Process 332, which maintains the Press Kit Parameters 160 according to Press Kit Construction Rules 938, is a process for changing the Press Kit Parameters 160 for a particular Element's 201 Press Kit Report 550 in order to implement users' preferences for the display of information in their Press Kit Reports 550. This is used to change the Press Kit Parameters 160 for a particular Element's 201 Press Kit Report 550, as part of the Data Input 300 process or in response to user request. Any aspect of a Press Kit Report 550, as shown in FIG. 13, can be customized using the Press Kit Parameters 160, wherein the Press Kit Report 550 is press kit/resume/fact sheet created dynamically. It will display all information that is a direct relation to the main Element 201 (People 202, Places 204, Things 218 or Projects 216). All associated Elements 201 are also reported with their Relational Information 120 in the respective ConjunctiveProject Sentence of Credit Construct 551. The Press Kit Report 550 is outputted from the Press Kit Generator 538 in the Report Writer 502 in response to Press Kit Requests 624, 626, 628, 630.

Figure 3D:
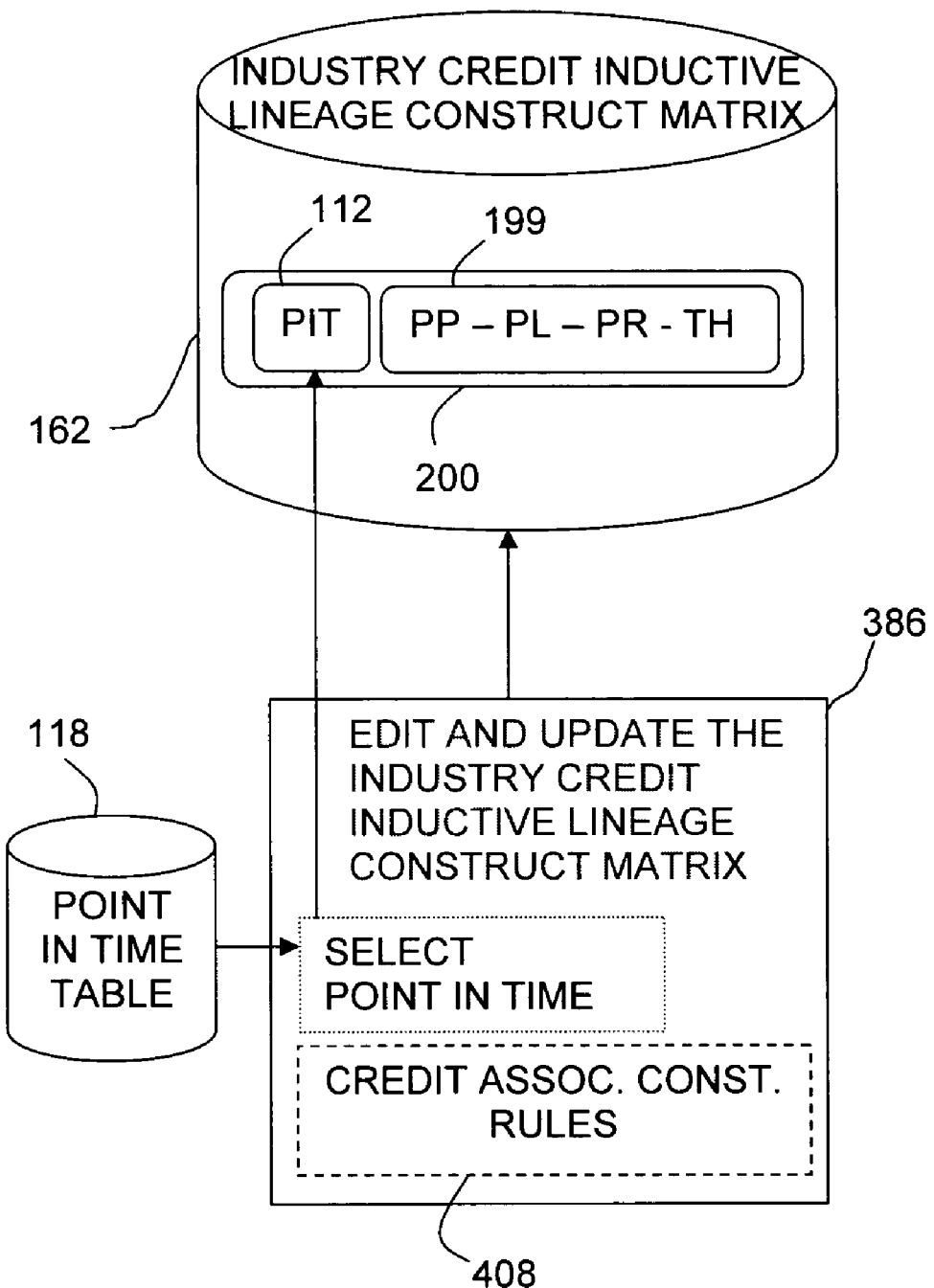
FIG. 3D is a diagram illustrating an edit and update the industry credit inductive lineage construct matrix process according to the above preferred embodiment of the present invention.

Referring to FIG. 3d, an Edit and Update the Industry Credit Inductive Lineage Construct Matrix Process 386, which is a process for editing and updating the information in the Industry Credit Inductive Lineage Construct Matrix 162, selects the Point In Time 112 from the Point In Time Table 118. This Edit and Update the Industry Credit Inductive Lineage Construct Matrix Process 386 accepts the Associations 176 from the Input Association Information Process 376 and writes to the Industry Credit Inductive Lineage Construct Matrix 162 as well as using the Validate Associations 418 process. The Point in Time 112 is tied to the Credit Construct 199 which forms the Credit Instance 200 in the Industry Credit Inductive Lineage Construct Matrix 162.

Figure 10B:
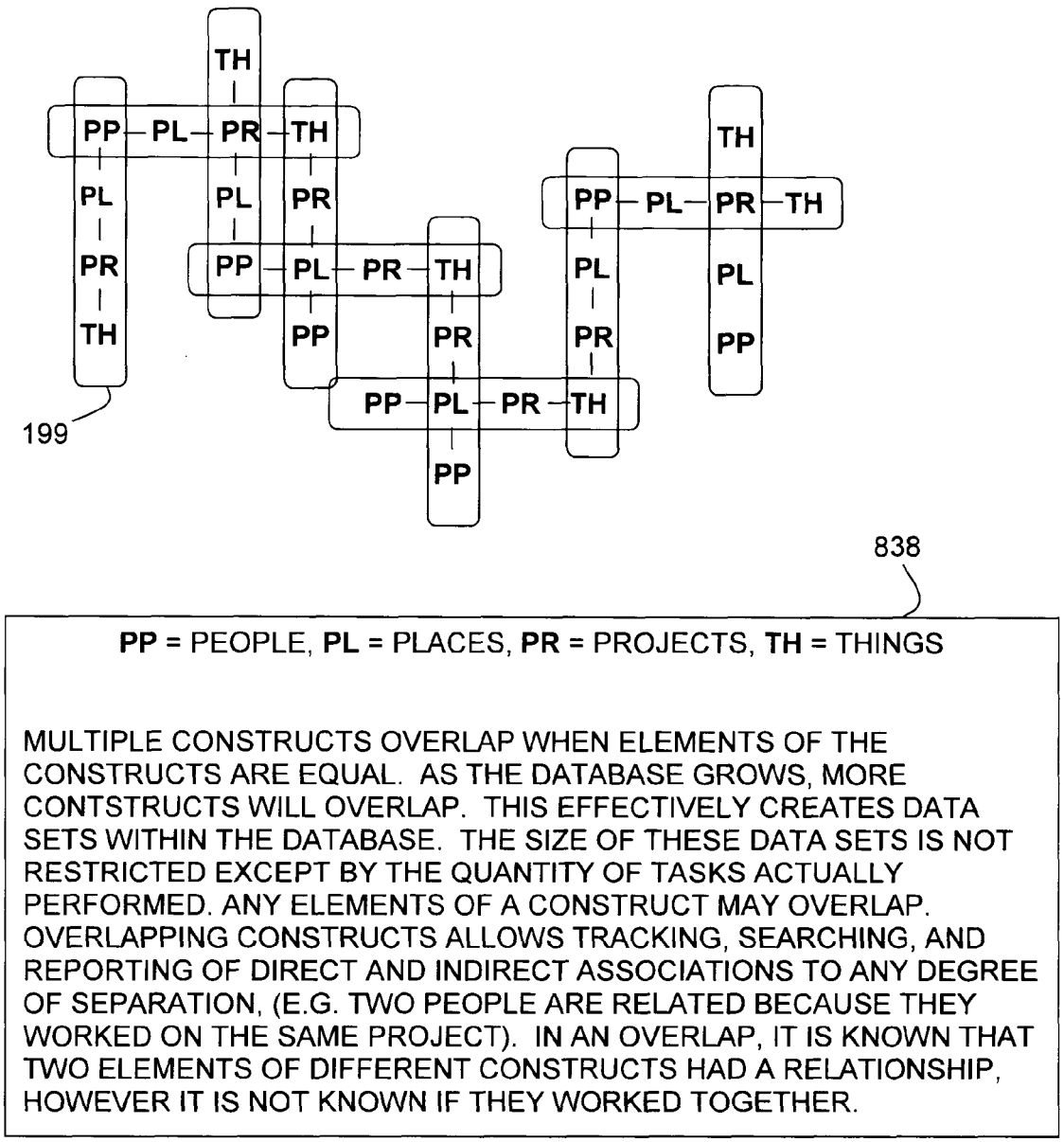
FIG. 10b is a diagram illustrating the overlapping of Credit Instances developed from the Industry Credit Inductive Lineage Construct Matrix with appropriate text according to the above preferred embodiment of the present invention.

Referring to FIG. 4a, FIG. 5a, FIG. 6a, and FIG. 7a, the Associative Value Table 117 and the People to People Associative Value (Organization Value) 196, the Places to Places Associative Value (Structure Value) 190, the Projects to Projects Associative Value (Usage Value) 194, and the Things to Things Associative Value (Integration Value) 192, as shown in FIG. 2e, are implemented using a Specific Program 910 for creating Lineage Association 864 in the input process. Said tables are not part of the normal Data Input 300 procedure, but are used to create Associations 176 between the People 202, Places 204, Projects 216, and Things 218 by the Construct to Construct Association Method 862 (as shown in FIG. 10*e*).

Tracking the Affiliations 144 that are related to an Element 201 is accomplished through the Organization Table 146. Maintaining a list of valid values is accomplished through the Associative Value Table 117 and the Awards Table 114. The Data 800 (as shown in FIG. 9*c*) in the Associative Value Table 116 is used in the Industry Credit Inductive Lineage Construct Matrix 162. Predefining Data 800 that can be used to classify People 202, Places 204, Projects 216, and Things 218 is also accomplished through the Associative Value Table 117. Predefining what Awards 220 can be related to the People 202, Places 204, Projects 216, and Things 218 is accomplished through the Awards 220 (as shown in FIG. 10*a*).

The Tables for Lineage Association 864 are for the People to People Associative Value (Organization Value) 196, Places to Places Associative Value (Structure Value) 190, Projects to Projects Associative Value (Usage Value) 194, and Things to Things Associative Value (Integration Value) 192. Inputting the ID 101 of two People 202, Places 204, Projects 216, or Things 218 and the Associative Values 116 sets the Lineage Association 864 which describes the hierarchy of how the two Elements 201 are associated.

The Validate Association Process 418, which is used with the Association Validation Rules 420 for determining how the Associations 176 are to be validated, makes changes to the Industry Credit Inductive Lineage Construct Matrix 162. The Associations 176 are validated for correctness relative to the industry's view of how the information should report and any changes to the Credit Matrix 162 are validated using the Association Validation Rules 420 and the Rings of Authority 390, 400, 402, 404, 406.

An Edit and Update People Relational Information Process 344, an Edit and Update Places Relational Information Process 354, an Edit and Update Projects Relational Information Process 364, and an Edit and Update Things Relational Information Process 374 use the Relation Rules 422 when updating the Relational Information 120, as shown in FIGS. 4*a*, 5*a*, 6*a*, and 7*a*, wherein the Relation Rules 422 are adapted for inputting Relational Information 120 and used in the Input People Process FIG. 4*a*, Input Places Process FIG. 5*a*, Input Projects Process FIG. 6*a*, and Input Things Process FIG. 7*a* to determine what values of information will be allowed in the Relational Database 100.

As shown in FIG. 5*a*, the Edit and Update the Industry Credit Inductive Lineage Construct Matrix Process 386 uses the Credit Association Construction Rules 408 for inputting the Associations 176 that are involved in creating the Credit Construct 199 which ends up as the respective Conjunctive-Project Sentences of Credit Construct 551. As shown in FIG. 4*a*, the Edit and Update People Relational Information Process 344 converts the People Relational Information 122 into the People Information Table 104 and the People Relational Information Tables 124. The information is stored in individual tables defined for each type of information (i.e., Skills 140, Education 142, Affiliations 144, etc.) This process accepts the People Name 234, People 202 description, and People 202 relations and writes to the People Information Table 104 and the People Relational Information Tables 124.

As shown in FIG. 5*a*, the Edit and Update Places Relational Information Process 354 converts the Places Relational Information 126 into the Places Information Table 106 and the Places Relational Information Tables 130. The information is stored in individual tables defined for each type of information (i.e., Affiliations 144, etc.) This process accepts the Places Name 236, Places 204 type, Places 204 kind, Places 204 description, and places relations and writes to the Places Information Table 106 and the Places Relational Information Tables 130.

As shown in FIG. 6*a*, the Edit and Update Projects Relational Information Process 364 converts the Projects Relational Information 132 into the Projects Information Table 108 and the Projects Relational Information Tables 134. The information is stored in individual tables defined for each type of information (i.e., Affiliations 144, etc.). This process accepts the Projects Name 238, Projects 216 type, Projects 216 kind, Projects 216 description, and Projects 216 relations and writes to the Projects Information Table 108 and the Projects Relational Information Tables 134.

As shown in FIG. 7*a*, the Edit and Update Things Relational Information Process 374 converts the Things Relational Information 136 into the Things Information Table 110 and the Things Relational Information Tables 138. The information is stored in individual tables defined for each type of information (i.e., Affiliations 144, etc.). This process accepts the Things Name 240, Things 218 type, Things 218 kind, Things 218 description, and Things 218 relations and writes to the Things Information Table 110 and the Things Relational Information Tables 138.

As shown in FIGS. 2*a*, 4*a*, 4*b* and 8*b*, the People Credit Input Module 314 first requires the Edit and Update of the People Relational Information 344 which takes the Input People Name Process 338, Input People Description Process 340, and Input People Relations Process 342, and updates the People Information Table 104, the People Relational Information Table 124, the Affiliation Table 144 and the Organization Table 146. The People Credit Input Module 314 then performs the Input People Associations Process 378 which is used with the People Association Input Rules 410, wherein the Input People Associations Process 378 updates People 202 to Places 204, People 202 to Things 218, People 202 to Projects 216, and Awards 220 Associations 176 using Associative Values 184, 186, 178, 198 to create Credit Constructs 199. This process follows the inputting of Relational Information 120 and inputs into the Industry Credit Inductive Lineage Construct Matrix 162. The People Association Input Rules 410, for inputting Associations 176 that involve People 202 to People 202 Associations 176 and People 202 to Places 204 Associations 176 which are achieved by the Construct to Construct Association Method 862, are part of the Input Process. Places 204 may also include Solo Artists and Group Artists 826.

As shown in FIGS. 2*a*, 5*a*, 5*b* and 8*b*, the Places Credit Input Module 316 first requires the Edit and Update of the Places Relational Information Process 354 which takes the Input Places Name, Input Type and Kind Process 348, Input Places Description Process 350, and Input Places Relations Process 352, and updates the Places/Positions Information Tables 128, Places Information Table 106, Places Relational Information Table 130, Affiliation Table 144 and Organization Table 146. The Places Credit Input Module 316 then performs the Input Places Associations Process 380 which is used with the Places Association Input Rules 412, wherein the Input Places Associations Process 380 updates Places 204 to People 202, Projects 216, Things 218, and Awards 220 Associations 176 using Associative Values 184, 180, 188, 198 to create the respective Credit Constructs 199. This process follows the inputting of Relational Information 120 and inputs into the Industry Credit Inductive Lineage Construct Matrix 162. The Places Association Input Rules 412 are adapted for inputting Associations 176 that involve Places 204 to Places 204 Associations 176 which are achieved by the Construct to Construct Association Method 862. Places 204 may also include Joint Ventures 213. These rules are part of the Data Input 300 process.

As shown in FIGS. 2*a*, 6*a*, 6*b* and 8*b*, the Projects Credit Input Module 318 first requires the Edit and Update of the Projects Relational Information Process 364 which takes the Input Projects Name and Type Process 358, Input Publication Date 930 Process, Input Projects Description Process 360, and Input Project Relations Process 362, and updates the Projects Information Table 108, Projects Relational Information Table 134, Affiliation Table 144 and Organization Table 146. If a Work In Progress 950 is input for the Publication Date 930, which is the date that a Projects 216 has been published and a field within the Conjunctive Project Sentence of Credit Construct 551, then the Projects 216 is a Not Yet Released Project 952, as shown in FIG. 17*f*. The Projects Credit Input Module 318 then performs the Input Projects Associations Process 382 which is used with the Projects Association Input Rules 414, wherein the Input Projects Associations Process 382 updates Projects 216 to People 202, Places 204, Things 218, and Awards 220 Associations 176 using Associative Values 178, 180, 182, 198 to create the respective Credit Constructs 199. This process follows the inputting of Relational Information 120 and inputs into the Industry Credit Inductive Lineage Construct Matrix 162. The Projects Association Input Rules 414 are used for inputting Associations 176 that involve Places 204 to Projects 216 Associations 176 and Projects 216 to Projects 216 Associations 176 which are achieved by the Construct to Construct Association Method 862. Projects 216 may also include Projects Theme 242 and these rules are part of the Data Input 300 process.

As shown in FIGS. 2*a*, 7*a*, 7*b* and 8*b*, the Things Credit Input Module 320 first requires the Edit and Update of the Things Relational Information Process 374 which takes the Input Things Name and Type Process 368, Input Things Description Process 370, and Input Things Relations Process 372, and updates the Things Information Table 110, Things Relational Information Table 138, Affiliation Table 144 and Organization Table 146. The Things Credit Input Module 320 then performs the Input Things Associations Process 384 which is used with the Things Association Input Rules 416, wherein the Input Things Associations Process 384 updates Things 218 to People 202, Places 204, Projects 216, and Awards 200 using Associative Values 186, 188, 182, 198 to create the respective Credit Constructs 199. This process follows the inputting of Relational Information 120 and inputs into the Industry Credit Inductive Lineage Construct Matrix 162. The Things Association Input Rules 416, which are part of the Data Input 300 process, are used for inputting Associations 176 that involve Places 204 to Things 218 Associations 176 and Things 218 to Things 218 Associations 176 which are achieved by the Construct to Construct Association Method 862.

Referring to FIGS. 4*a* to 7*b*, the Input People Association Process 378 uses the People Information Table 104; the Input Places Associations Process 380 uses the Places Information Table 106; the Input Projects Associations Process 382 uses the Projects Information Table 108; the Input Things Associations Process 384 uses the Things Information Table 110. The Associations 176 to the Awards Table 114 are made by the Edit and Update the Industry Credit Inductive Lineage Construct Matrix Process 386 which updates the Industry Credit Inductive Lineage Construct Matrix 162. The Edit and Update the Industry Credit Inductive Lineage Construct Matrix Process 386 builds the Associations 176 for the Credit Construct 199 by using Associative Value Table 117. The Edit and Update the Industry Credit Inductive Lineage Construct Matrix Process 386 also selects the Point In Time 112 from the Point in Time Table 118 to build the Credit Instances 200 in the Industry Credit Inductive Lineage Construct Matrix 162. The Input People Associations Process 378, the Input Places Associations Process 380, the Input Projects Associations Process 382, and the Input Things Associations Process 384 are validated according to the Association Validation Rules 420. The Association Validation Rules 420 which determine how the Associations 176 are to be validated are part of the Validate Associations 418 process to determine what values of information will be allowed in the Relational Database 100.

As shown in FIG. 4*b*, the People Association Input Rules 410 include the Place, Group, or Solo Artist 206 as the parent, associated to one or many People 202 as the child, by the People to Places Associative Value 184, or the People to People Associative Value (Organization Value) 196. People Association Input Scenarios 824 describe how the People Association Input Rules 410 are able to build useful Credit Constructs 199 and how the People 202 are accepted into the System.

Figure 5B:
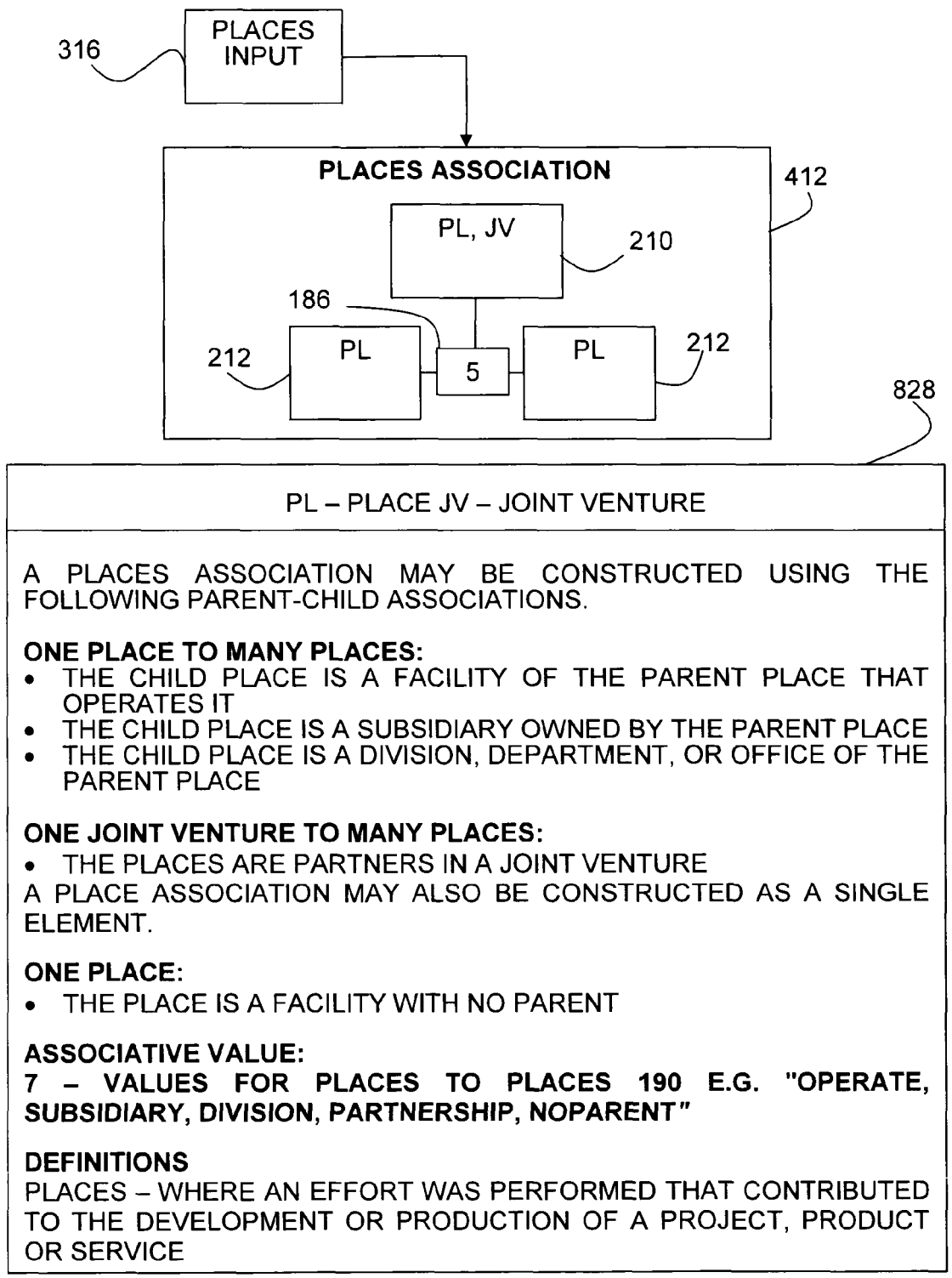
FIG. 5b is a flow chart of the Places Association Input Rules with appropriate text according to the above preferred embodiment of the present invention.

As shown in FIG. 5*b*, the Places Association Input Rules 412 include the Parent Place 210 or a Joint Venture 213, associated to one or many Child Places 212, by the Places to Places Associative Value (Structure Value) 190. Places Association Input Scenarios 826 describe how the Places Association Input Rules 412 are able to build useful Credit Constructs 199 and how the Places 204 are accepted into the System.

Figure 6B:
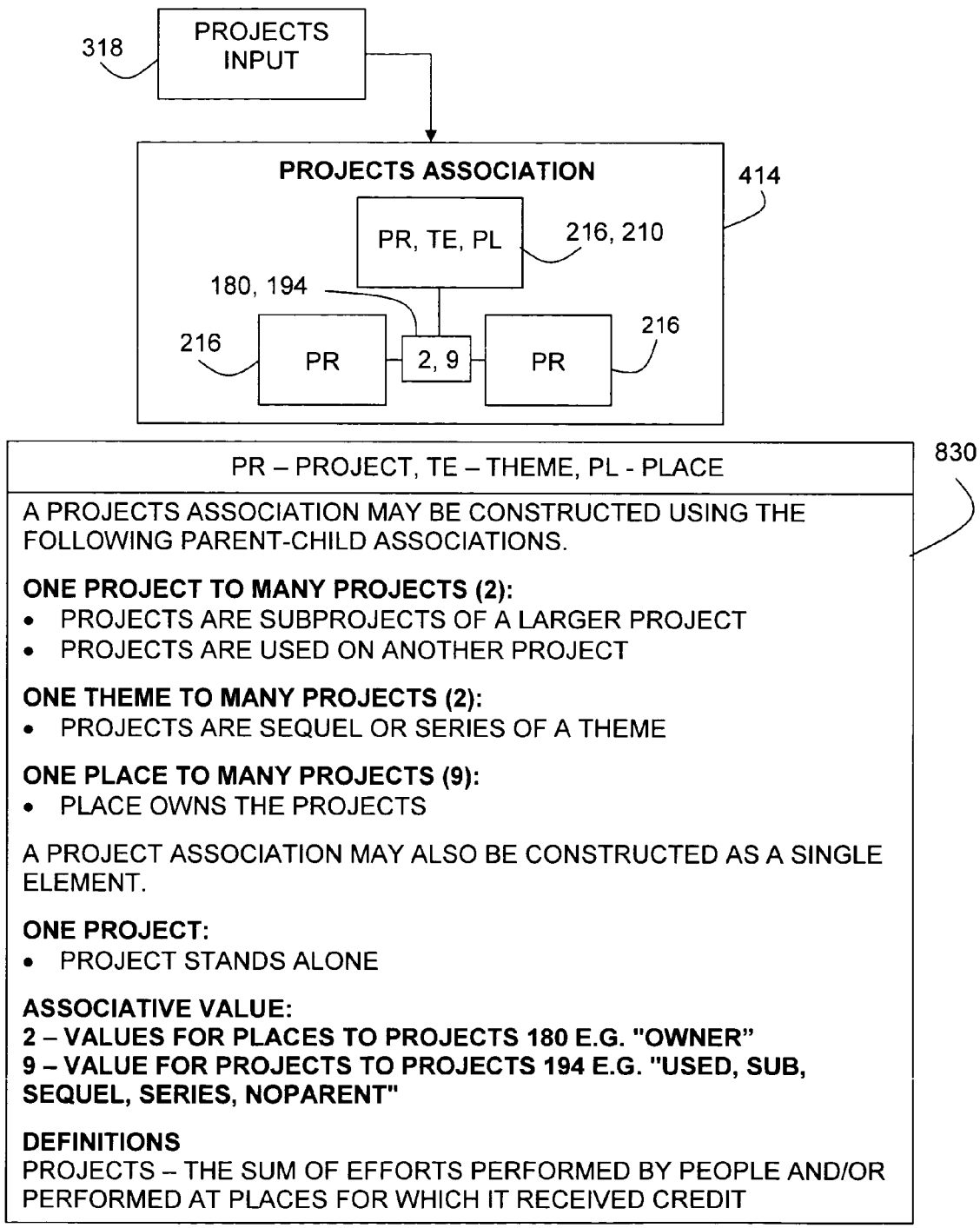
FIG. 6b is a flow chart of the Projects Association Input Rules with appropriate text.

As shown in FIG. 6*b*, the Projects Association Input Rules 414 include the Projects 216 or Project's Theme 242, or the Parent Place 210, associated to one or many child Projects 216, by the Projects to Projects Associative Value (Usage Value) 194 or the Places to Projects Associative Value (Contribution Value) 180. Projects Association Input Scenarios 828 describe how the Projects Association Input Rules 414 are able to build useful Credit Constructs 199 and how the Projects 216 are accepted into the System.

Figure 7B:
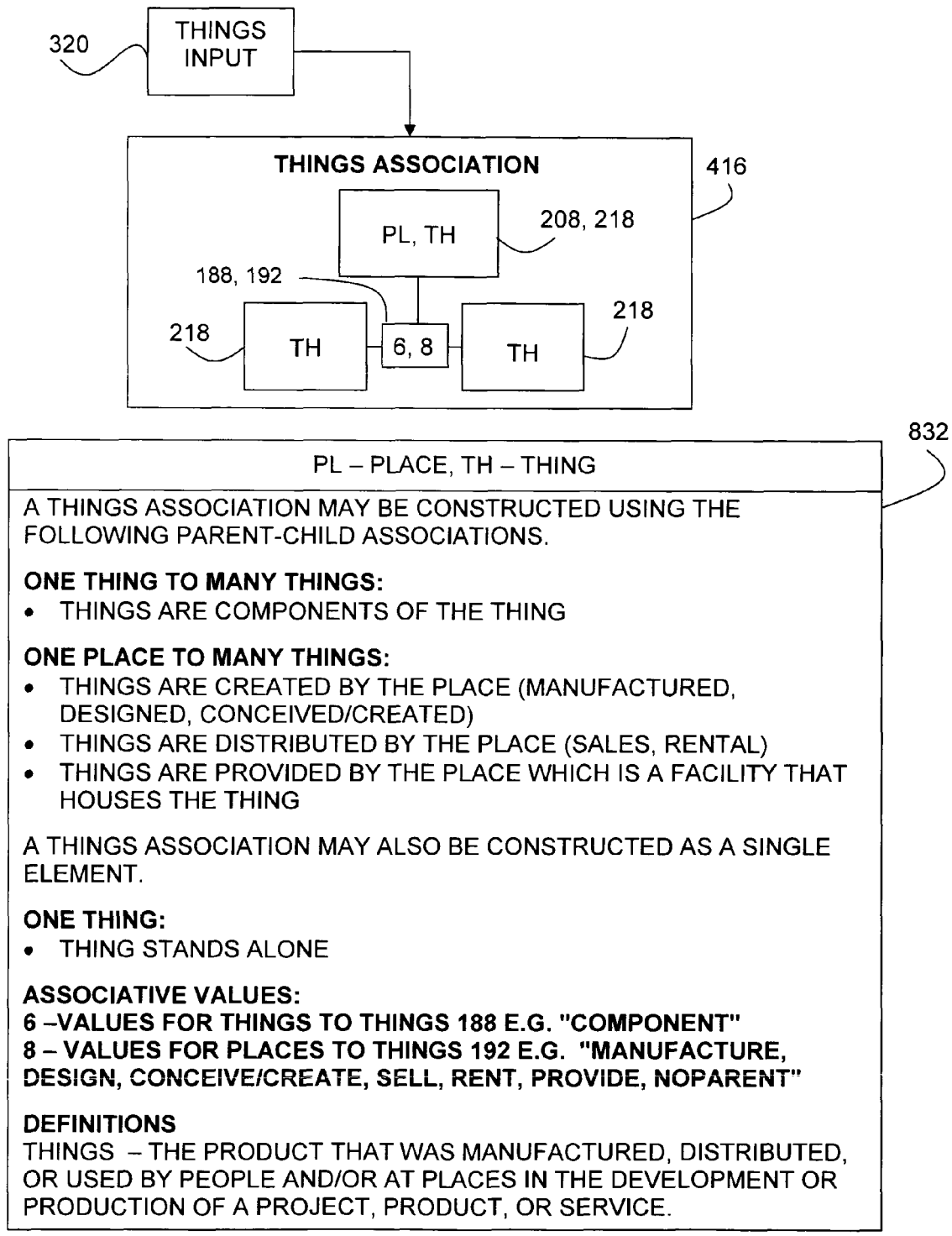
FIG. 7b is a flow chart of the Things Association Input Rules with appropriate text according to the above preferred embodiment of the present invention.

As shown in FIG. 7*b*, the Things Association Input Rules 416 include the Manufacturer Place 208 or the Things 218 associated to one or many child Things 218 by the Places to Things Associative Value 188 or the Things to Things Associative Value (Integration Value) 192, respectively. Things Association Input Scenarios 830 describe how the Things Association Input Rules 416 are able to build useful Credit Constructs 199 and how the Things 218 are accepted into the System.

As shown in FIG. 4*a*, a Create/Update People Associations Process 426 updates the Industry Credit Inductive Lineage Construct Matrix 162 with the Associative Information 121 about People 202. As shown in FIG. 5*a*, a Create/Update Places Associations Process 428 updates the Industry Credit Inductive Lineage Construct Matrix 162 with the Associative Information 121 about Places 204. As shown in FIG. 6*a*, a Create/Update Projects Associations Process 430 updates the Industry Credit Inductive Lineage Construct Matrix 162 with the Associative Information 121 about Projects 216. As shown in FIG. 7*a*, a Create/Update Things Associations Process 432 updates the Industry Credit Inductive Lineage Construct Matrix 162 with the Associative Information 121 about Things 218.

Figure 8A:
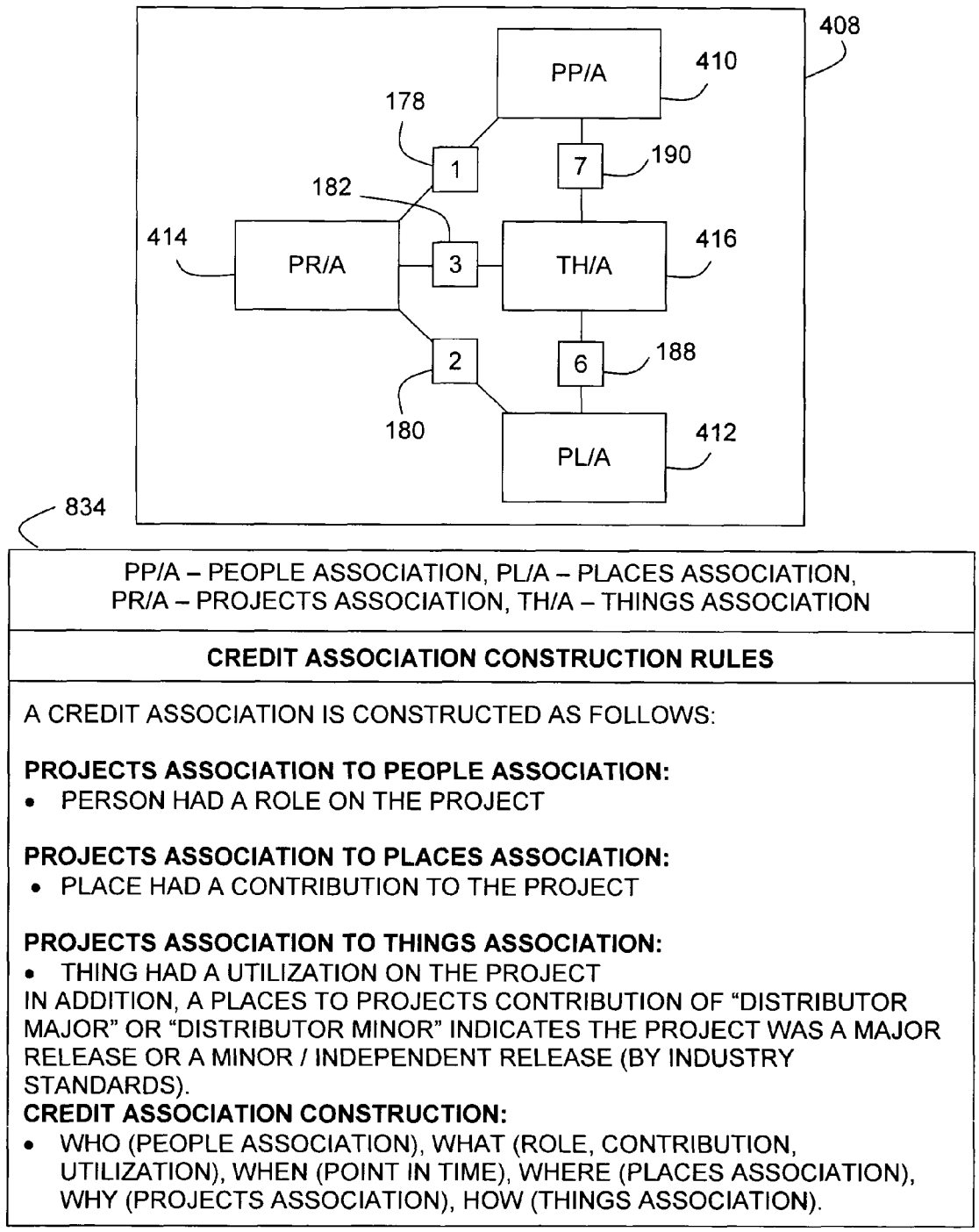
FIG. 8a is a diagram of the Credit Association Construction Rules with appropriate text according to the above preferred embodiment of the present invention.
Figure 8B:
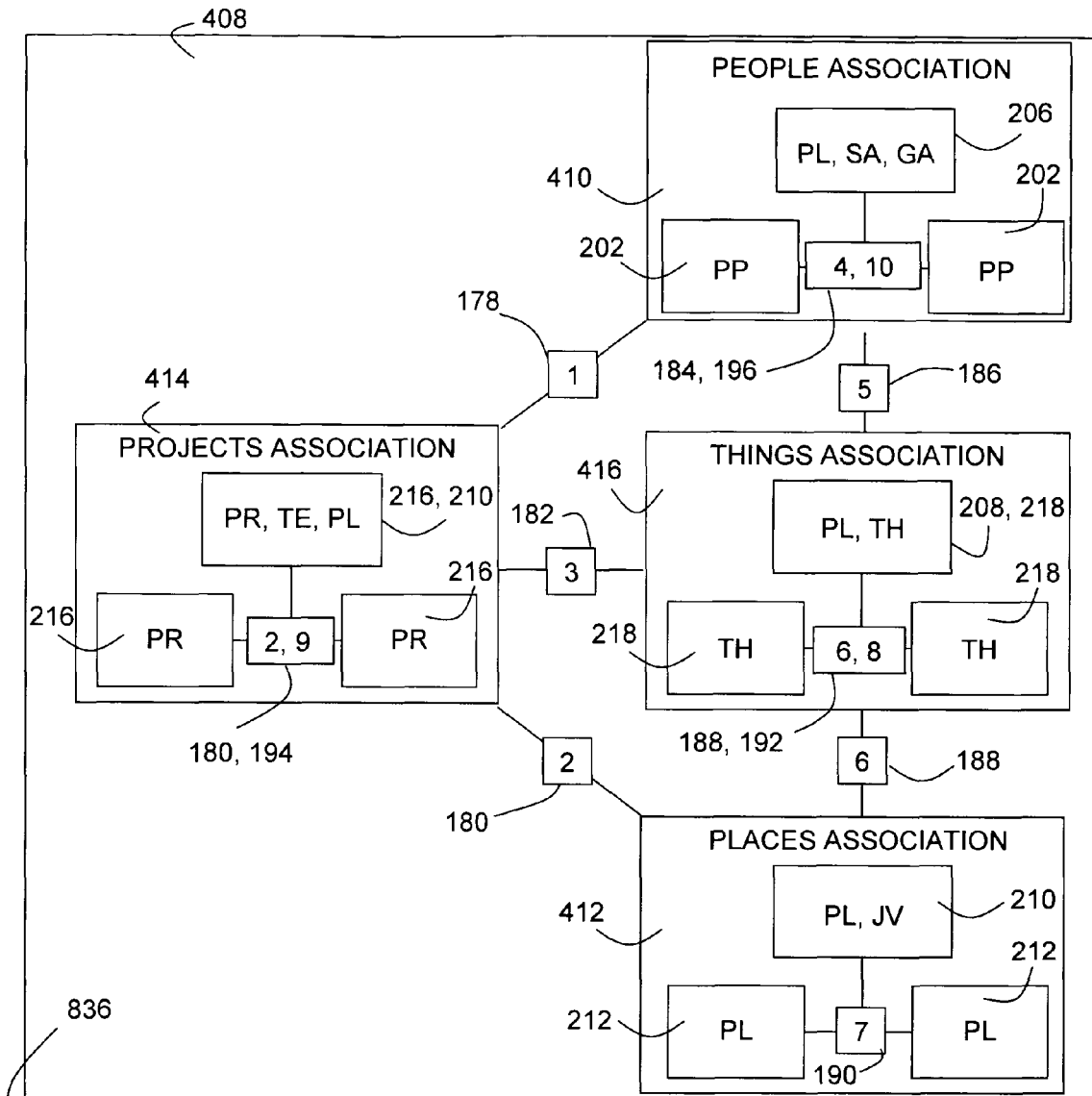
FIG. 8b is a flow chart of the Credit Association Details with appropriate text according to the above preferred embodiment of the present invention.

As shown in FIG. 8*a* and FIG. 8*b*, the Credit Association Construction Rules 408 include the People Association Input Rules 410, the Places Association Input Rules 412, the Projects Association Input Rules 414, and the Things Association Input Rules 416, joined by the People to Projects Associative Value (Role Value) 178, the Places to Projects Associative Value (Contribution Value) 180, the Things to Projects Associative Value (Utilization Value) 182, the People to Things Associative Value 186, and the Places to Things Associative Value 188. The Credit Association Construction Rules 408 describe how the People 202, Places 204, Projects 216, and Things 218 are input together into the Industry Credit Inductive Lineage Construct Matrix 162. Distributor Major 230 or Distributor Minor 232 may be used as the Places to Projects Associative Value (Contribution Value) 180 to denote that the Project 216 was published by the Place 204 via major or minor/independent distribution.

People 202 information is inputted by an Input People Process FIG. 4a that accepts People Relational Information 122 and Associative Information 121, and Inputs Data 800 into the Relational Databases 100.

As shown in FIG. 4a, the People Name 234 information is inputted by an Input People Name Process 338 that inputs the People Name 234 into the People Information Table 104 via the Edit and Update People Relational Information Process 344. An Input People Description Process 340 inputs the People 202 description from the People 202 information into the People Information Table 104 via the Edit and Update People Relational Information Process 344. An Input People Relations Process 342 inputs People Relational Information 122, including World Address 148, Telephone 150, Email 152, URL 154, Media Category 156, Skills 140, Education 142, Affiliations 144 for People 202, into the People Relational Information Tables 124 via the Edit and Update People Relational Information Process 344.

Places 204 information is inputted through an Input Places Process FIG. 5a that accepts Places Relational Information 126 and Associative Information 121, and Inputs Data 800 into the Relational Databases 100.

As shown in FIG. 5a, an Input Places Name, Type, and Kind Process 348 is used for inputting the Places Name 236, type, and kind information into the Places Information Table 106 via the Edit and Update Places Relational Information Process 354. An Input Places Description Process 350 is an input process for inputting the Places 204 description into the Places Information Table 106 and the Places/Position Information 128 into the Places Relational Information Tables 130 via the Edit and Update Places Relational Information Process 354.

An Input Places Relations Process 352 is an input process for inputting the Places Relational Information 126, including the Address 148, Telephone 150, Email 152, URL 154, Media Category 156, and Affiliations 144 for Places 204, into the Places Relational Information Tables 130 via the Edit and Update Places Relational Information Process 354.

Projects 216 information is inputted through an Input Projects Process FIG. 6a that accepts Projects Relational Information 132 and Associative Information 121, and Inputs Data 800 into the Relational Databases 100.

As shown in FIG. 6a, an Input Projects Name and Type Process 358 is an input process for inputting the Projects Name 238 and type information into the Projects Information Table 108 via the Edit and Update Projects Relational Information Table Process 364. An Input Projects Description Process 360 is an input process for inputting the Projects 216 Publication Date 930 and Projects 216 description information into the Projects Information Table 108 via the Edit and Update Projects Relational Information Process 364. An Input Projects Relations Process 362 is an input process for inputting the Projects Relational Information 132, including Address 148, Telephone 150, Email 152, URL 154, Media Category 156, Project Genres 244, and Affiliations 144 for Projects 216, into the Projects Relational Information Tables 134 via the Edit and Update Projects Relational Information Process 364.

Things 218 information is inputted through an Input Things Process FIG. 7a that accepts Things Relational Information 136 and Associative Information 121, and Inputs Data 800 into the Relational Databases 100.

As shown in FIG. 6a, an Input Things Name and Things Type Process 368 is an input process for inputting the Things Name 240 and Things 218 type information into the Things Information Table 110 via the Edit and Update Things Relational Information Process 374. An Input Things Description and Model Number Process 370 is an input process for inputting the Things 218 description information into the Things Information Table 110 via the Edit and Update Things Relational Information Process 374.

An Input Things Relations Process 372 is an input process for inputting Things Relational Information 136, including the World Address 148, Telephone 150, Email 152, URL 154, Media Category 156, and Affiliations 144, into the Things Relational Information Tables 138 via the Edit and Update Things Relational Info Process 374.

All Relational Information 120 and Associations 176 are inputted via Input Screens 312. An Input Association Information Process 376 inputs the Associations 176 for People 202, Places 204, Projects 216, and Things 218, from People 202 Associative Information 121, Places 204 Associative Information 121, Projects 216 Associative Information 121, or Things 218 Associative Information 121. This Process Inputs the Associations 176 for People 202, Places 204, Projects 216, and Things 218, whether in the Input People Process FIG. 4a, the Input Places Process FIG. 5a, the Input Projects Process FIG. 6a, or the Input Things Process FIG. 7a. It uses Associative Values 116 from the Associative Value Table 117 and passes the information to the Edit and Update the Industry Credit Inductive Lineage Construct Matrix Process 386.

Referring to FIG. 9a, FIG. 9b, and FIG. 9c, the Credit Bits 102 are extracted from Credit Data 302 which include any information about industry credits, in any form—whether from a resume, a data collection form, a magazine article, verbal, CD jacket, etc, such as crime data, industrial, business or sales data.

The Credit Bits 102 are the People 202, Places 204, Projects 216, and Things 218, the Associative Values 116, and the Point In Time 112. The Credit Bits 102 are arranged to form the Credit Constructs 199, which when joined with a Point In Time 112 become the Credit Instance 200, according to the People Association Input Rules 410, the Places Association Input Rules 412, the Projects Association Input Rules 414, the Things Association Input Rules 416, and the Credit Association Construction Rules 408, as shown in FIGS. 8a and 8b. Each Credit Instance 200 includes the four Elements (People 202, Places 204, Projects 216, Things 218); the Associative Values 116 of People to Projects (Role Value) 178, Places to Projects (Contribution Value) 180, and Things to Projects (Utilization Value) 182, in relation to a Point In Time 112.

Null values for the Credit Bits 102 in the Credit Instance 200 are allowed. The Credit Bytes 164 may have two People 202, Places 204, Projects 216, and/or Things 218, and an Associative Value 116. The Credit Bytes 164 may also have three People 202, Places 204, Projects 216, and/or Things 218, and two Associative Values 116. Likewise, Credit Bytes 164 may also have one of each People 202, Places 204, Projects 216, Things 218 and three Associative Values 116.

Awards Credit Bytes 174 are Associations 176 of Awards 200 to People 202, Awards 200 to Places 204, Awards 200 to Projects 216, and Awards 200 to Things 218.

Figure 10D:
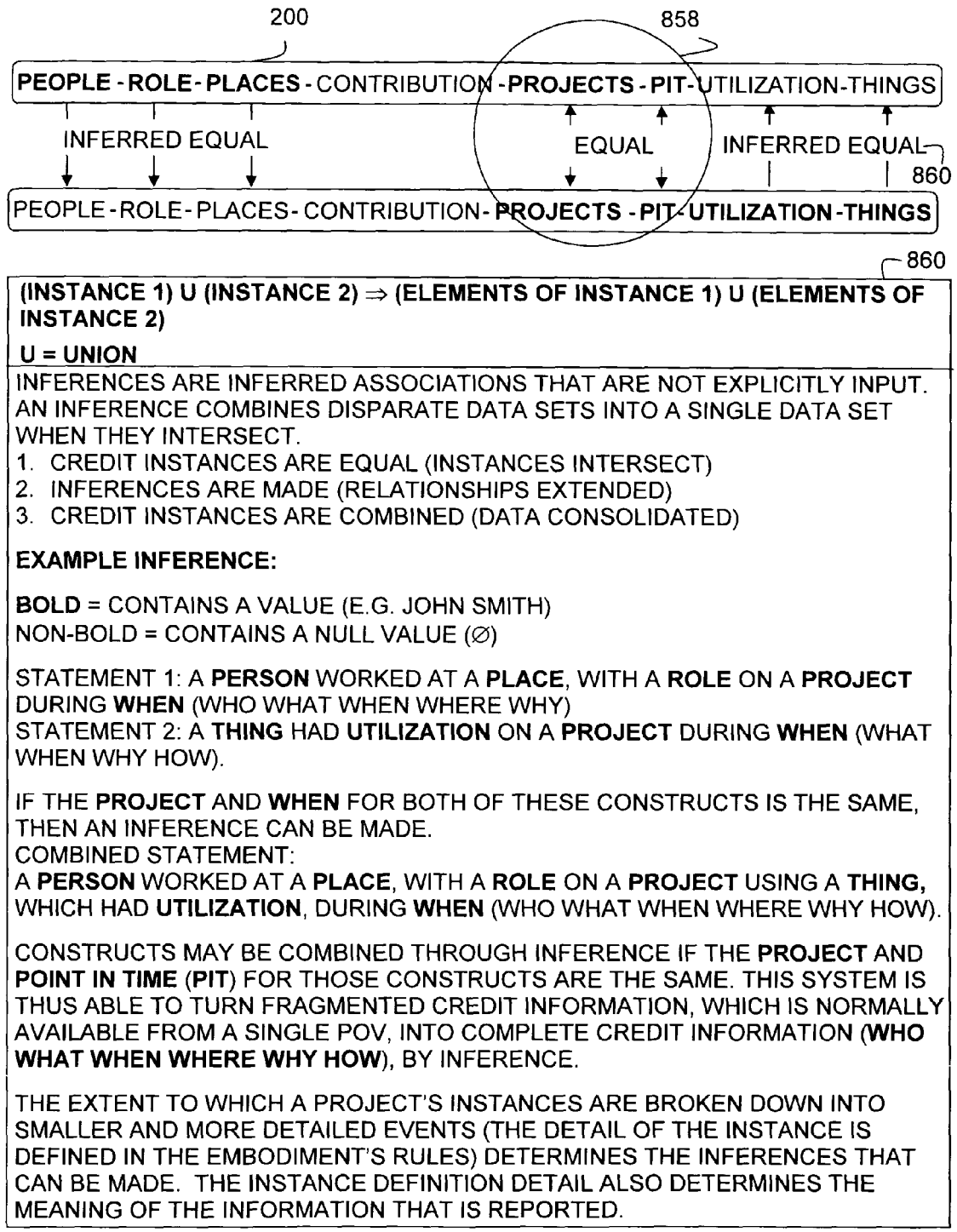
FIG. 10d is a diagram illustrating the inferences developed from the intersecting Credit Constructs of the Industry Credit Inductive Lineage Construct Matrix with appropriate text according to the above preferred embodiment of the present invention.
Figure 10E:
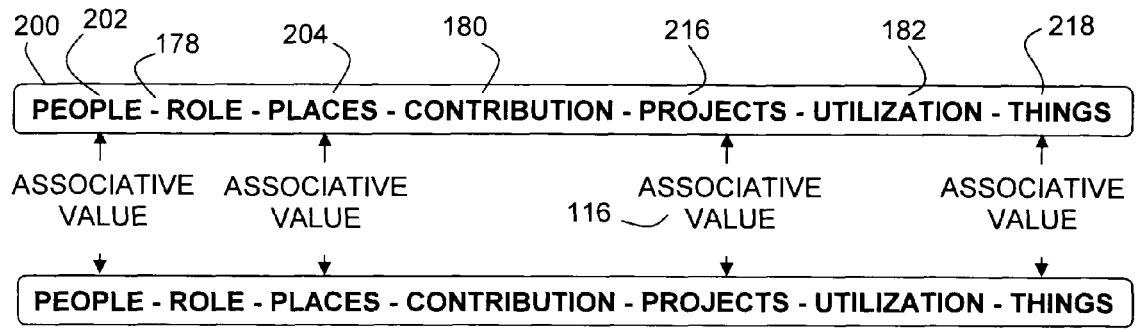
FIG. 10e is a diagram illustrating the association of Credit Instances [Constructs] with Associative Values of the Industry Credit Inductive Lineage Construct Matrix with appropriate text according to the above preferred embodiment of the present invention.

The Credit Bytes 164 reflect a single Point of View (POV) 850 (as shown in FIG. 10d) as they are Output 500 in response to a Query 622 (as shown in FIG. 9a) which is a request for information from a Relational Database 100 Query 622 and is used to instruct the Industry Credit Inductive Lineage Construct Matrix 162 as to what information is required for Output 500 into the Report Writer 502.

As shown in FIG. 9b, the Credit Bytes 164 are extracted from the Credit Instances 200 to form the Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612. When a plurality of Credit Instances 200 intersect to form Intersecting Instance 839, as shown in block 840 in FIG. 9a and FIG. 10c, the Credit Bytes 164 that do not exist in the Industry Credit Inductive Lineage Construct Matrix 162 can be inferred to form Inferences 842, as shown in FIG. 9a, FIG. 10b and FIG. 10c.

As shown in FIG. 10a, one Credit Construct 199 is made up of the Associations 176 of the Elements 201 People 202, Places 204, Projects 216, and Things 218. The Associations 176 include the People to Projects Associative Value (Role Value) 178; the Places to Projects Associative Value (Contribution Value) 180, the Things to Projects Associative Value (Utilization Value) 182, the People to Places Associative Value 184, the People to Things Associative Value 186, and the Places to Things Associative Value 188. The Credit Construct 199 with the Point in Time 112 is the Credit Instance 200. The Credit Construct 199 may be associated to the Awards 220.

Referring to FIG. 10b, the Credit Constructs 199 overlap, referencing Box 838 in FIG. 10b, when the People 202, Places 204, Projects 216, or Things 218 are Equal 858. A multitude of overlapping 838 is possible.

Referring to FIG. 10c, when the People 202, Places 204, Projects 216, or Things 218, and the Point In Time 112 are Equal 858, the Credit Instances 200 intersect, as illustrated in block 839.

Referring to FIGS. 9a and 10d, the Inferences 842 can be made when the Credit Instances 200 intersect (840). The Inferences 842 that can be made are dependent on the embodiment and Data 800 allowed for the Point In Time 112. Inferences 842 combine values from separate Credit Instances 200 in the outputted Credit Bytes 164. The Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612 are thus able to report information from the Industry Credit Inductive Lineage Construct Matrix 162 that was not input by any single user from any single Point of View (POV) 850.

Figure 12:
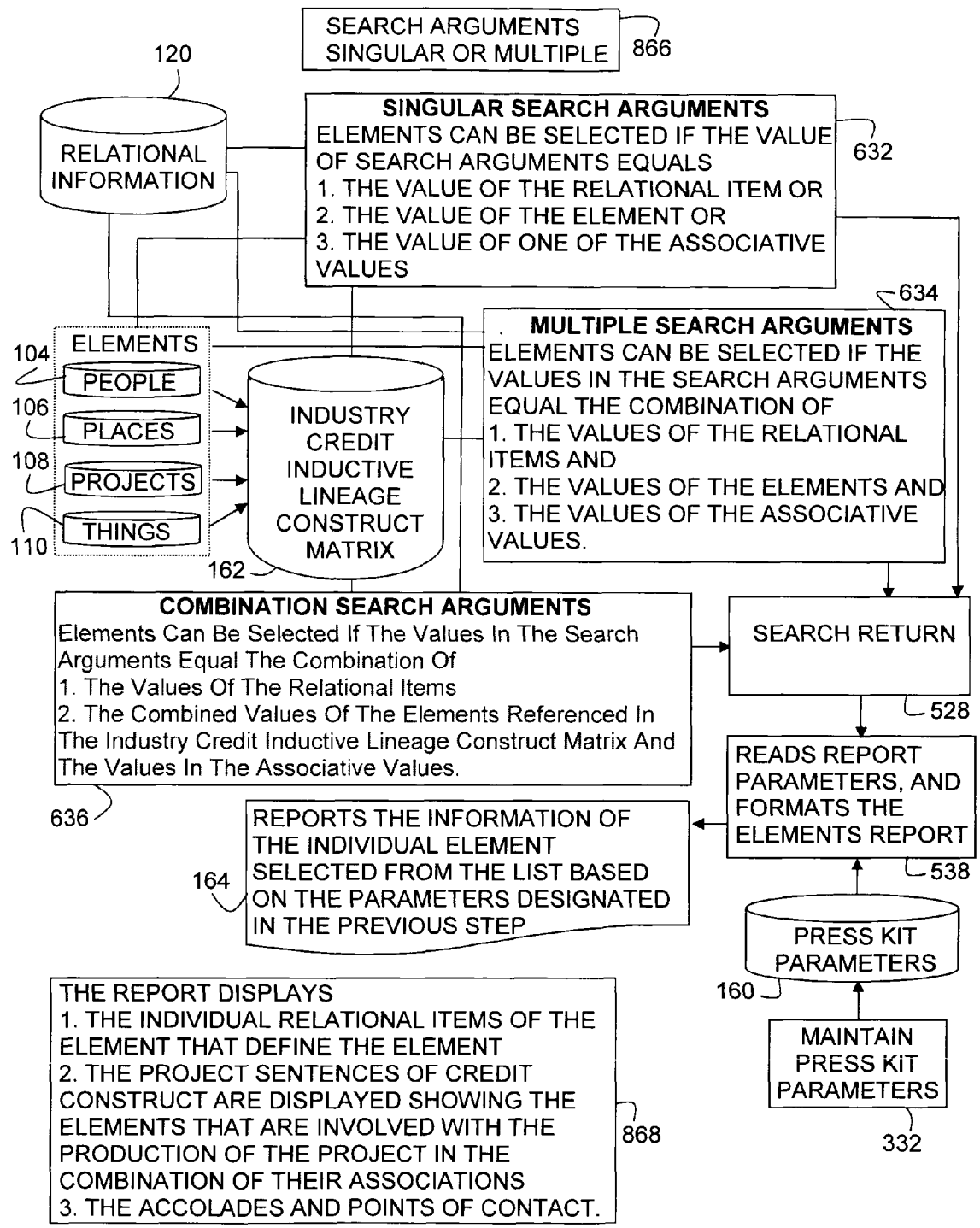
FIG. 12 is schematic flow chart indicating the Search, Selection and Reporting Process with appropriate text according to the above preferred embodiment of the present invention.

Referring to FIGS. 9a and 10e, the People 202, Places 204, Projects 216, or Things 218 of different Credit Instances 200 can be associated to each other through the Associative Values 116 as a Lineage Association 864 (as shown in FIG. 12) of the People to People Associative Value (Organization Value) 196, the Places to Places Associative Value (Structure Value) 190, the Projects to Projects Associative Value (Usage Value) 194, and the Things to Things Associative Value (Integration Value) 192, and as a Lineage Association 864 of the People to Places Associative Value 184 and Places to Things Associative Value 188. Lineage Associations 864 are achieved by associating one of the Credit Instances 200 to another Credit Instance 200. In the case of the Lineage Association 864, during Data Input 300 the chosen Associative Value 116 will indicate which People 202, Places 204, Projects 216, or Things 218 is the parent and which People 202, Places 204, Projects 216, or Things 218 is the child as described in Description Box 866 as shown in FIG. 12. In which the Data Input 300 is a process for Data 800 entering the Relational Database 100, wherein the Credit Data 302 is collected from outside the System.

Figure 11:
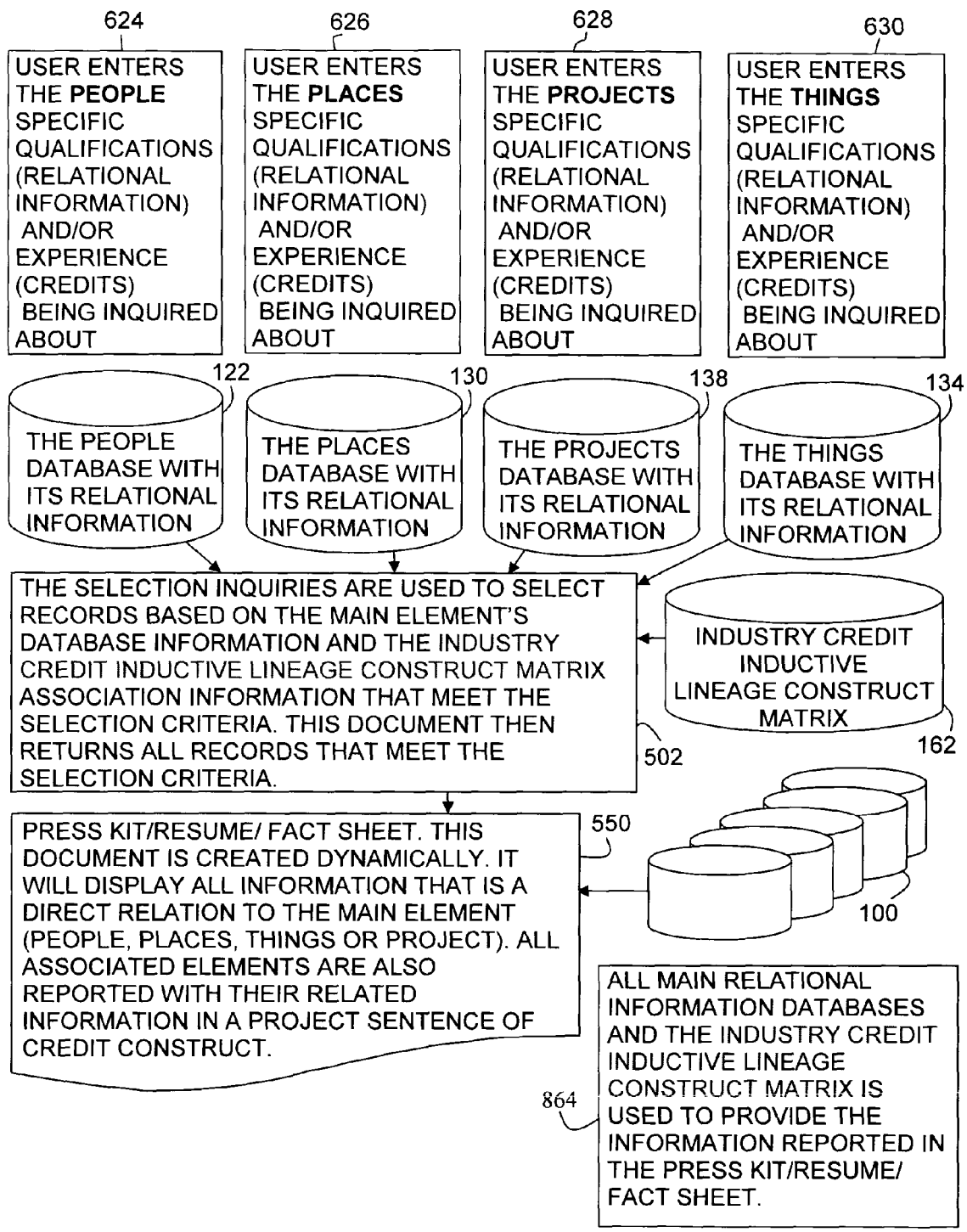
FIG. 11 is a block diagram showing the overview of the reporting capabilities according to the above preferred embodiment of the present invention.
Figure 16A:
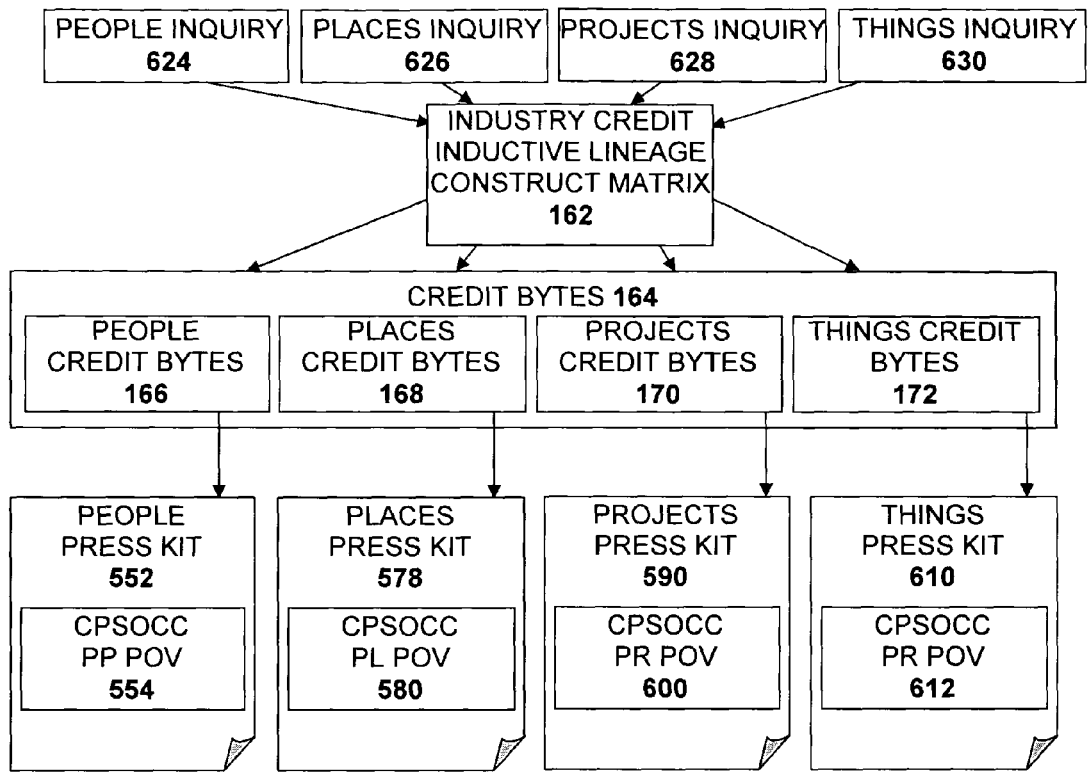
FIG. 16a is block diagram illustrating a Conjunctive Sentence of Credit Construct template legend reporting Who did What for Whom, Where, Why and How in relation to When with appropriate text according to the above preferred embodiment of the present invention.

Referring to FIG. 11, People Inquiries 638, Places Inquiries 640, Projects Inquiries 642, and Things Inquiries 644 result in a Record Selection 502 that reports the Press Kit Report 550 according to the Point of View (POV) 850 (as shown in FIG. 16a) of the Inquiry 844 (as shown in FIG. 9a) requesting Data 800 (as shown in FIG. 9c) from the Relational Databases 100 which includes the Industry Credit Inductive Lineage Construct Matrix 162 and the People Relational Information 122, the Places Relational Information 130, the Things Relational Information 136, and the Projects Relational Information 132.

The People Inquiry 638 is an inquiry initiated by the user who enters the People Specific Qualifications, wherein any request for information about People 202 from the Relational Databases 100. The Places Inquiry 640 is an inquiry initiated by the user who enters the Places Specific Qualifications, wherein any request for information about Places 204 from the Relational Databases 100. The Projects Inquiry 642 is an inquiry initiated by the user who enters the Projects Specific Qualifications, wherein any request for information about Projects 216 from the Relational Databases 100. The Things Inquiry 644 is an inquiry initiated by the user who enters the Things Specific Qualification, wherein any request for information about Things 218 from the Relational Databases 100.

Referring to FIG. 12, information inquiring about People 202, Places 204, Projects 216, or Things 218 and their Relations is provided for input into the System by the People Query Module 506, the Places Query Module 508, the Projects Query Module 510, the Things Query Module 512, and the Singular Search Arguments 632. The Singular Search Arguments 632 produce the Search Return 528, as a combined People List Module 530, Places List Module 532, Projects List Module 534, and Things List Module 536. The Singular Search Arguments 632 will enter where values are entered for a Relational Information 120 item, an Element 201, or one of the Associative Values 116 and be used to Query 622 the Industry Credit Inductive Lineage Construct Matrix 162, the Relational Information 120, the People Information Table 104, the Places Information Table 106, the Projects Information Table 108, and the Things Information Table 110. The result is a List of the Selected Elements (Search Return 528).

Referring to FIG. 12, Multiple Search Arguments 634 are search arguments entered where values are entered for Relational Information 120 items and the Elements 201 and the Associative Values 116 and Combination Search Arguments 636 are search arguments where the values entered are the Relational Informatiom Items, the combined values of the Elements 201 referenced in the Industry Credit Inductive Lineage Contruct Matrix 162 and the values in the Associative Values 116. The Multiple Search Arguments 634 and the Combination Search Arguments 636 are used to Query 622 the Industry Credit Inductive Lineage Construct Matrix 162, the Relational Information 120, the People Information Table 104, the Places Information Table 106, the Projects Information Table 108, and the Things Information Table 110. The result is a List of the Selected Elements (Search Return 528).

Referring to FIG. 12, inquiries using the People Query Module 506 (as shown in FIG. 2b) are the Multiple Search Arguments 634 and the Combination Search Arguments 636 that use the People Search Engine 518 to produce the People List Module 530. Referring to FIGS. 2a and 12, inquiries using the Places Query Module 508 are the Multiple Search Arguments 634 and the Combination Search Arguments 636 that use the Places Search Engine 520 to produce the Places List Module 532. Inquiries using the Projects Query Module 510 are the Multiple Search Arguments 634 and the Combination Search Arguments 636 that use the Projects Search Engine 522 to produce the Projects List Module 534. Inquiries using the Things Query Module 512 are the Multiple Search Arguments 634 and the Combination Search Arguments 636 that use the Things Search Engine 524 to produce the Things List Module 536. The People List Module 530, the Singular Search Arguments 632, the Projects List Module 534, and the Things List Module 536 use the Press Kit Parameters 160 combined with the Report Writer 502 to produce the Conjunctive Project Sentences of Credit Construct from a People Point of View (i.e. People Press Kit Reports) 554, the Conjunctive Project Sentences of Credit Construct from a Places Point of View (i.e. Places Press Kit 578) 580, the Conjunctive Project Sentences of Credit Construct from a Projects Point of View (i.e. Projects Press Kit 590) 600, and the Conjunctive Project Sentences of Credit Construct from a Things Point of View (i.e. Things Press Kit 610) 612.

Referring to FIG. 13, the Report Writer 502 transforms the Credit Instances 200 into the Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612 from the Credit Bytes 164. The Report Writer 502 generates the Search Return 528 and the Press Kit Report 550.

As shown in FIG. 13, Query Screens 504, which are screens for entering search criteria for the People 202, Places 204, Projects 216, and the Things 218, pass the Singular Search Argument 632, the Multiple Search Arguments 634, and the Combination Search Arguments 636 into the People Search Engine 518, the Places Search Engine 520, the Projects Search Engine 522, and the Things Search Engine 524, wherein the People, Places, Projects and Things Search Engines 518, 520, 522, 524 Query 622 the Industry Credit Inductive Lineage Construct Matrix 162 according to the Query Matrix Rules for Construct Drill-Down 526, resulting in the Search Return 528 which may also report Relational Information 120.

The People Inquiries (i.e. People Press Kit Requests 624) 638, the Places Inquiries (i.e. Places Press Kit Requests 626) 640, the Projects Inquiries (i.e. Projects Press Kit Requests 628) 642, and the Things Inquiries (i.e. Things Press Kit Requests 630) 644 are passed into the Press Kit Generator 538 which queries the Industry Credit Inductive Lineage Construct Matrix 162 according to the Query Matrix Rules for Construct Combination 548, to create the Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612 in the Press Kit Report 550 which will also report the Relational Information 120. The Press Kit Report 550 is formatted according to the Press Kit Parameters 160 which may be maintained by the Maintain Press Kit Parameters 332 process according to user preferences.

Figure 14:
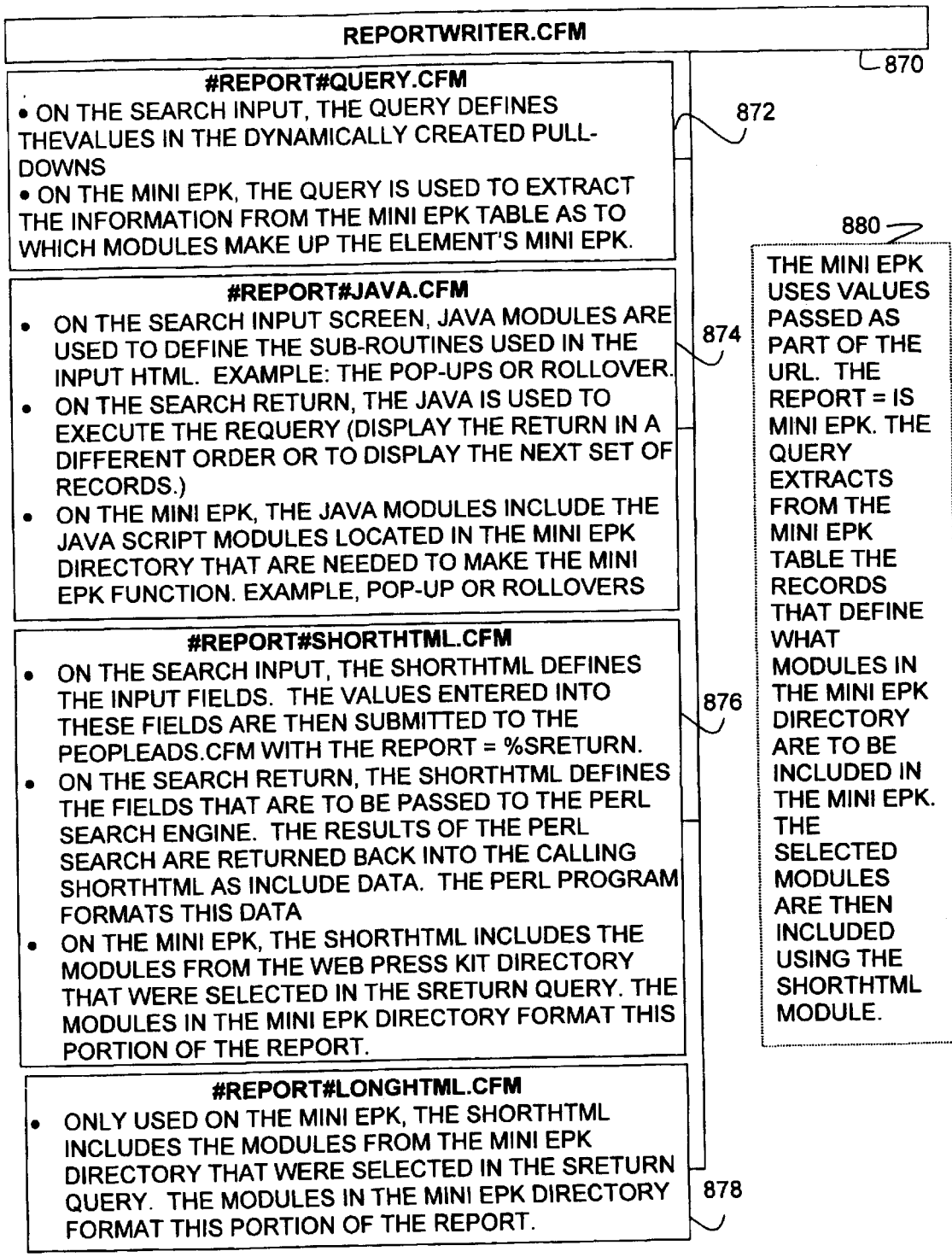
FIG. 14 is a diagram flow chart indicating the Report Writer Module implementation with appropriate text according to the above preferred embodiment of the present invention.

Referring to FIG. 14, according to the preferred embodiment, the Report Writer 502 is implemented as a Report-Writer 870 code module.

Referring to FIG. 15, Query Matrix Rules for Construct Combination 548 are the rules for combining the Credit Bytes 164 that result in the Conjunctive Project Sentences of Credit Construct 551. This is used by the Press Kit Generator 538 in the Report Writer 502 whenever a Conjunctive Project Sentence of Credit Construct 551 is requested for display. Query Matrix Rules for Construct Drill-Down 526 include the steps of conforming the search criteria into the Query Matrix 514 format, locating Credit Instances 200 that contain the values in the Query Matrix 514, and outputting the Credit Bytes 164 as well as the related Relational Information 120 as needed by the People List Module 530, Places List Module 532, Projects List Module 534, and Things List Module 536. These Query Matrix Rules for Construct Drill-Down 526 are used by the People Search Engine 518, Places Search Engine 520, Projects Search Engine 522, and Things Search Engine 524 to retrieve Credit Bytes 164 from Credit Instances 200 whenever a search is executed. The Query Matrix Rules for Construct Combination 548 and the Query Matrix Rules for Construct Drill-Down 526 are applied to the Industry Credit Inductive Lineage Construct Matrix 162 by the Report Writer 502 to yield a Query Matrix 514 which forms the Credit Bytes 164.

Referring to FIG. 16a, the Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612, report Who Did What for Whom, Where, Why, and How in relation to When, as illustrated in block 850 in FIG. 16a, regardless of whether it appears on the People Press Kit 552, the Places Press Kit 578, the Projects Press Kit 590 or the Things Press Kit 610.

Figure 16B:
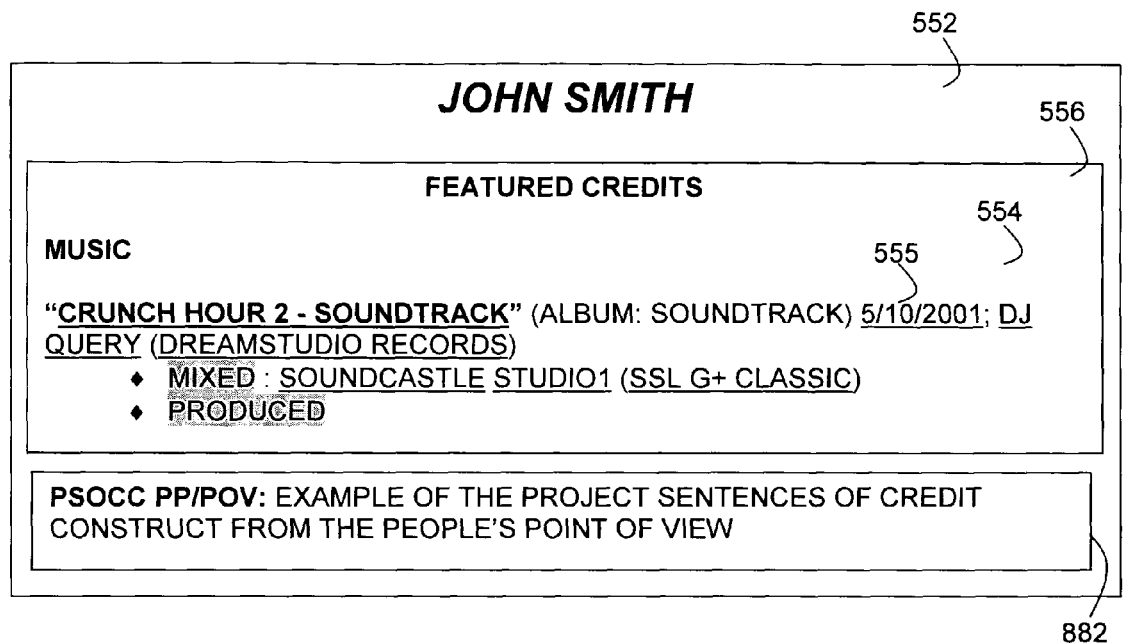
FIG. 16b is a diagram of a People's Press Kit Conjunctive Project Sentence of Credit Construct example within a credit reporting module for Featured Credits, with appropriate People's point of view text, according to the above preferred embodiment of the present invention.
Figure 17C:
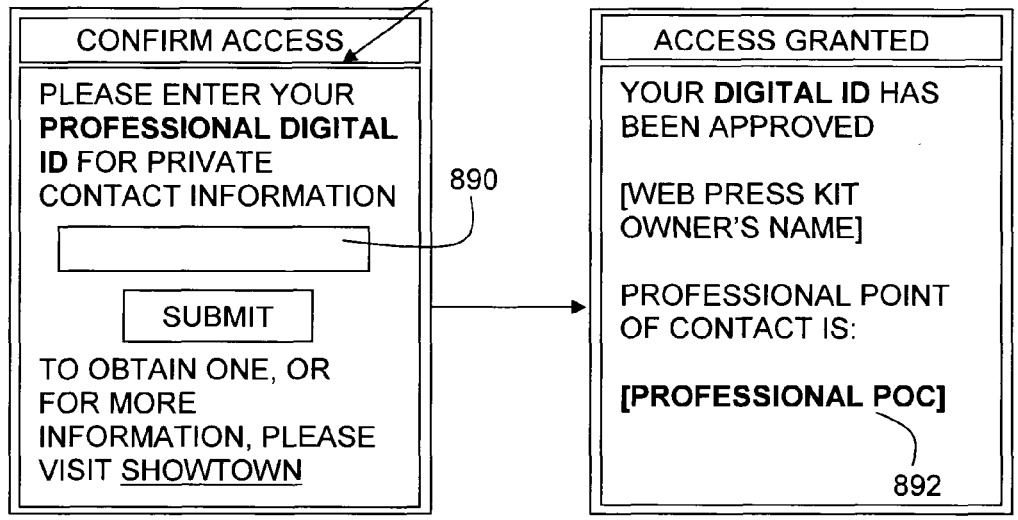
Figure 17D:
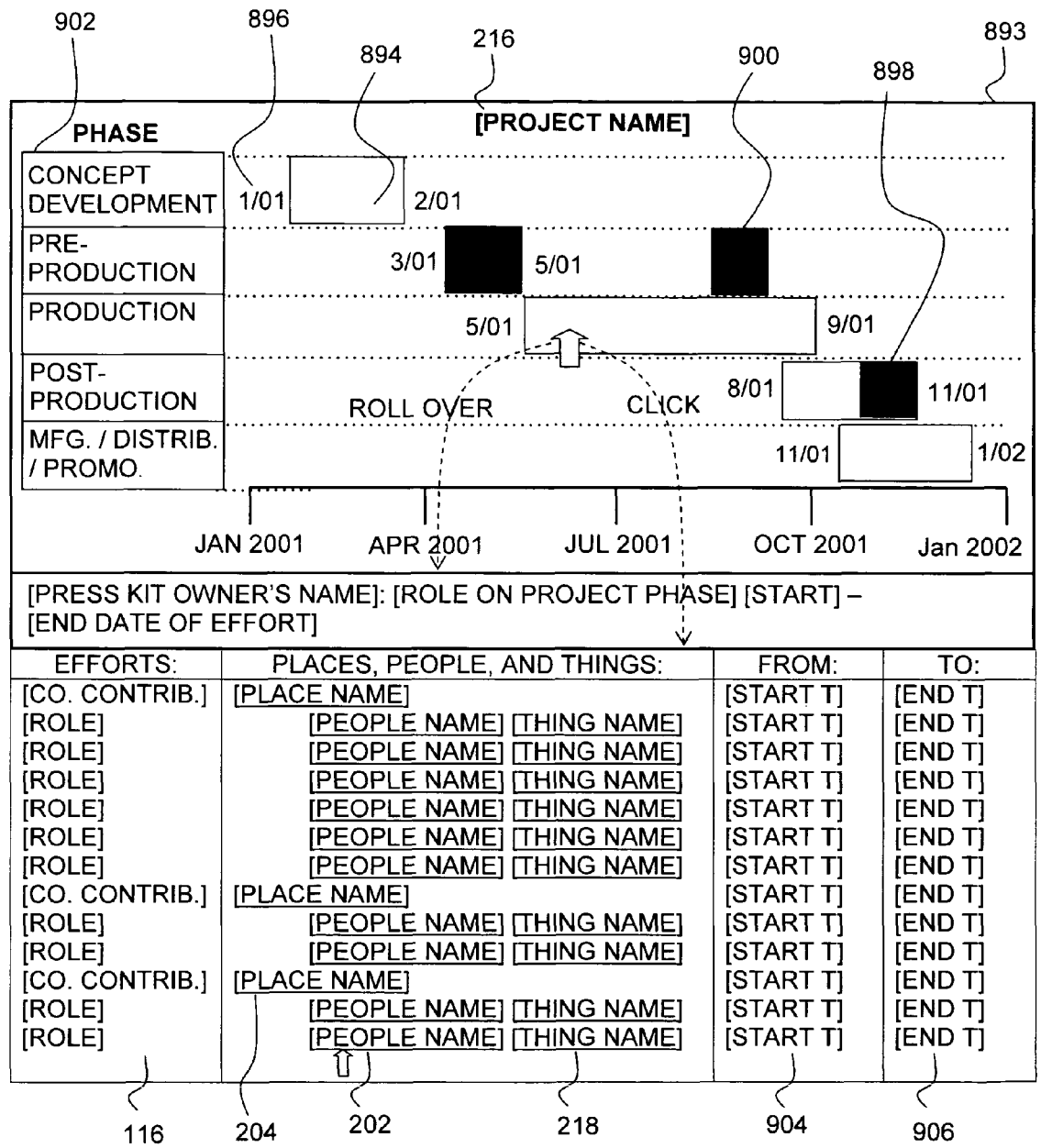
FIG. 17d is a diagram showing the Project Phase Timeline Report displaying the Phases according to the above preferred embodiment of the present invention.

FIG. 16b illustrates an example of the People Press Kit 552 (i.e. Press Kit Report 550 for People 202) that may contain the Featured Credits Module 556 containing the Conjunctive Project Sentences of Credit Construct from the People Point of View 554 whose Project Publication Date 555 links to a People 202 Project Phase Timeline Report 893 as shown in FIGS. 17d and 17f.

Figure 16C:
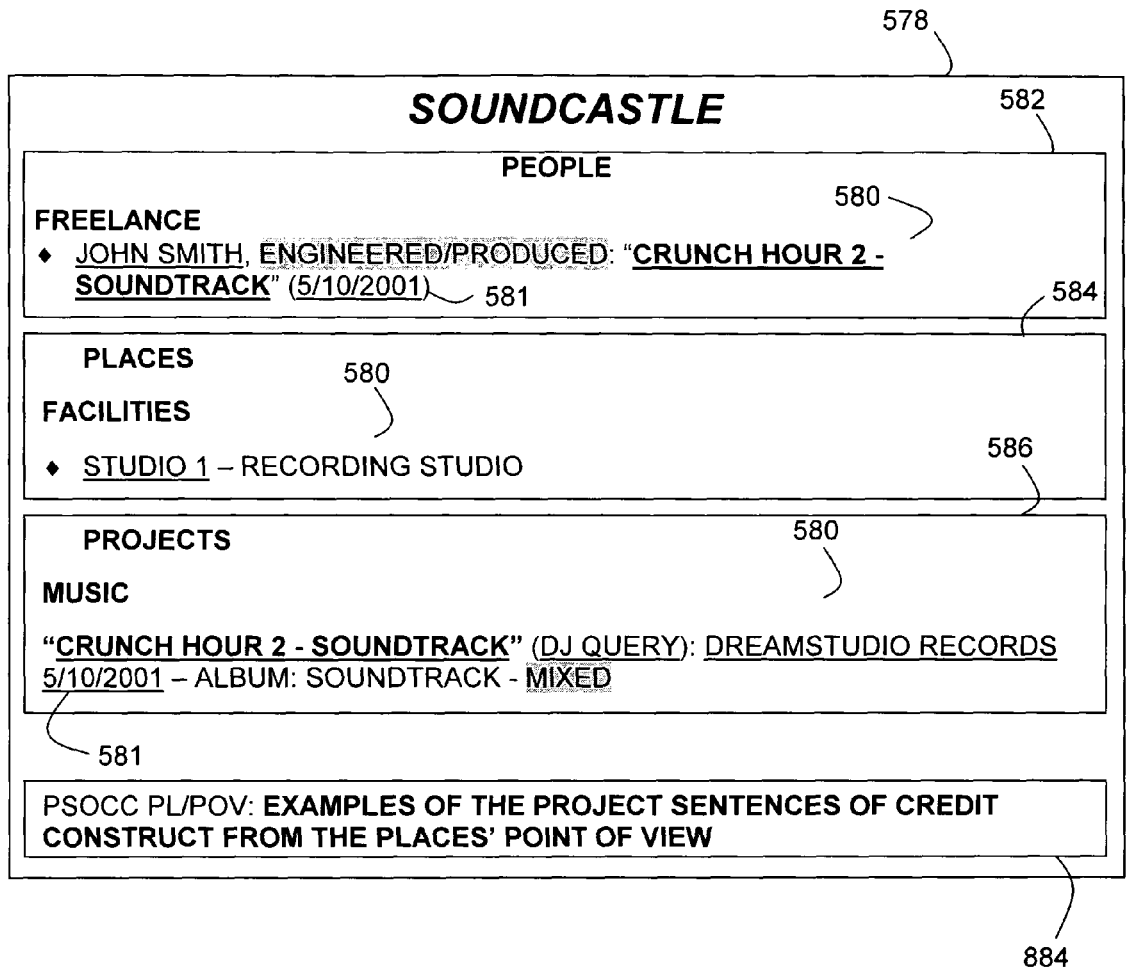
FIG. 16c is a diagram of a Places' Press Kit Conjunctive Project Sentence of Credit Construct example within credit reporting modules for People, Places, and Projects, with appropriate Places' point of view text, according to the above preferred embodiment of the present invention.

FIG. 16c illustrates an example of the Places Press Kit 578 (i.e. Press Kit Report 550 for Places 204) that may contain a Places People Credit Module 582, a Places Places Credit Module 584, and a Places Projects Credit Module 586, containing Conjunctive Project Sentences of Credit Construct from the Places Point of View 580. The Places People Credit Module 582 displays ConjunctiveProject Sentences of Credit Construct 551 containing People 202 Elements 201 in the Places Press Kit 578 and is used in the Places Press Kit 578 to show their Credits 551 and to hyperlink to related People Press Kits 552. The Places Places Credit Module 584 displays Conjunctive Project Sentences of Credit Construct 551 containing Places 204 Elements 201 in the Places Press Kit 578 and is used in the Places Press Kit 578 to show their Credits 551 and to hyperlink to related Places Press Kits 578. The Places Projects Credit Module 586 displays Conjunctive Project Sentences of Credit Construct 551 containing Projects 216 Elements 201 in the Places Press Kit 578 and is used in the Places Press Kit 578 to show their Credits 551 and to hyperlink to related Projects Press Kits 590.

Figure 16D:
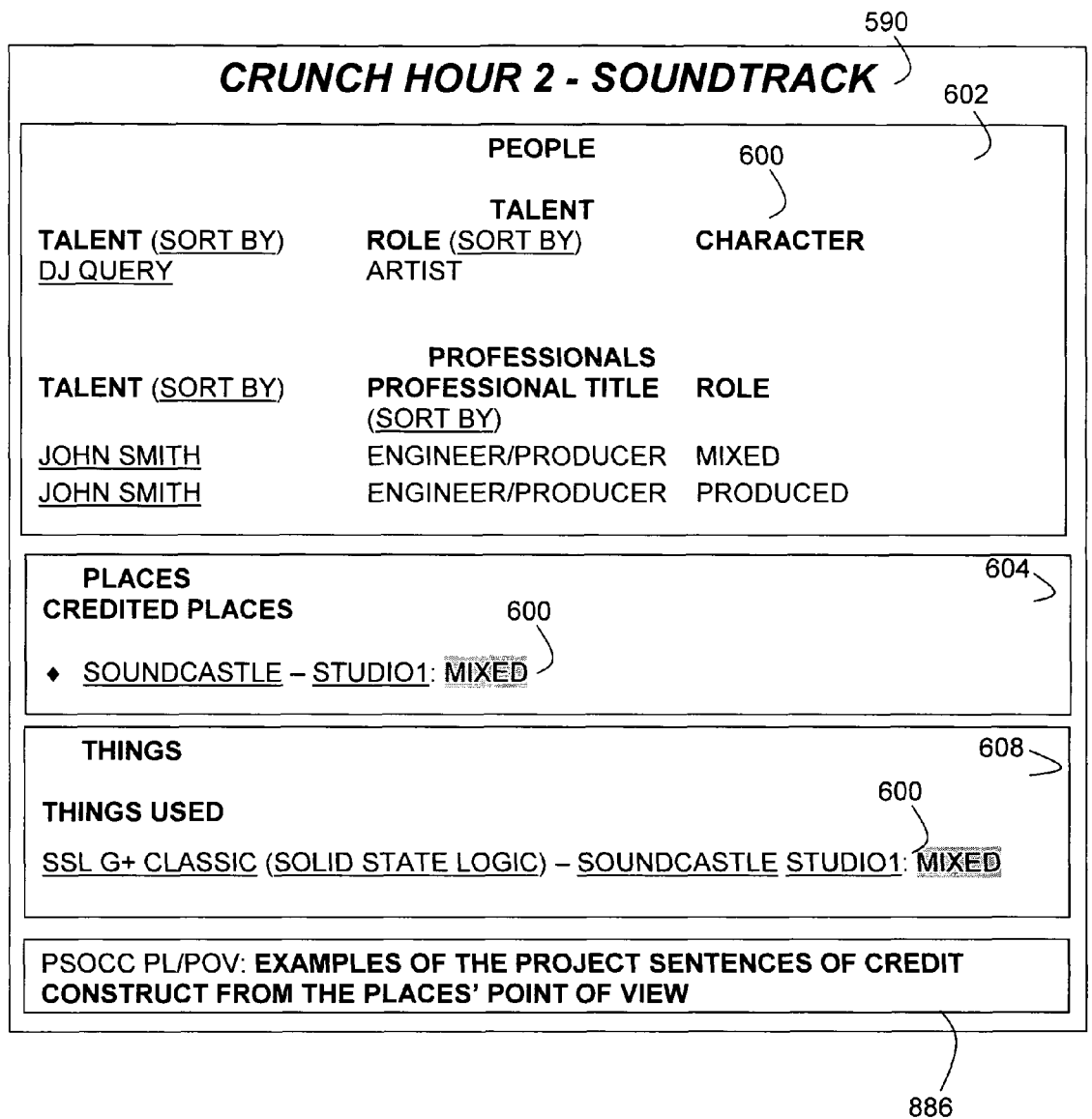
FIG. 16d is a diagram of a Projects' Press Kit Conjunctive Project Sentence of Credit Construct example within credit reporting modules for People, Places, and Things, with appropriate Projects' point of view text, according to the above preferred embodiment of the present invention.

FIG. 16d illustrates an example of the Projects Press Kit 590 (i.e. Press Kit Report 550 for Projects 216) may contain a Projects People Credit Module 602, a Projects Places Credit Module 604, and a Projects Things Credit Module 608, containing Conjunctive Project Sentences of Credit Construct from the Projects Point of View 600. The Projects People Credit Module 602 displays Conjunctive Project Sentences of Credit Construct 551 containing People 202 Elements 201 in the Projects Press Kit 590 and is used in the Projects Press Kit 590 to show their Credits 551 and to hyperlink to related People Press Kits 552. The Projects Places Credit Module 604 displays Conjunctive Project Sentences of Credit Construct 551 containing Places 204 Elements 201 in the Projects Press Kit 590 and is used in the Projects Press Kit 590 to show their Credits 551 and to hyperlink to related Places Press Kits 578. The Projects Things Credit Module 608 displays Conjunctive Project Sentences of Credit Construct 551 containing Things 218 Elements 201 in the Projects Press Kit 590 and is used in the Projects Press Kit 590 to show their Credits 551 and to hyperlink to related Things Press Kits 610.

Figure 16E:
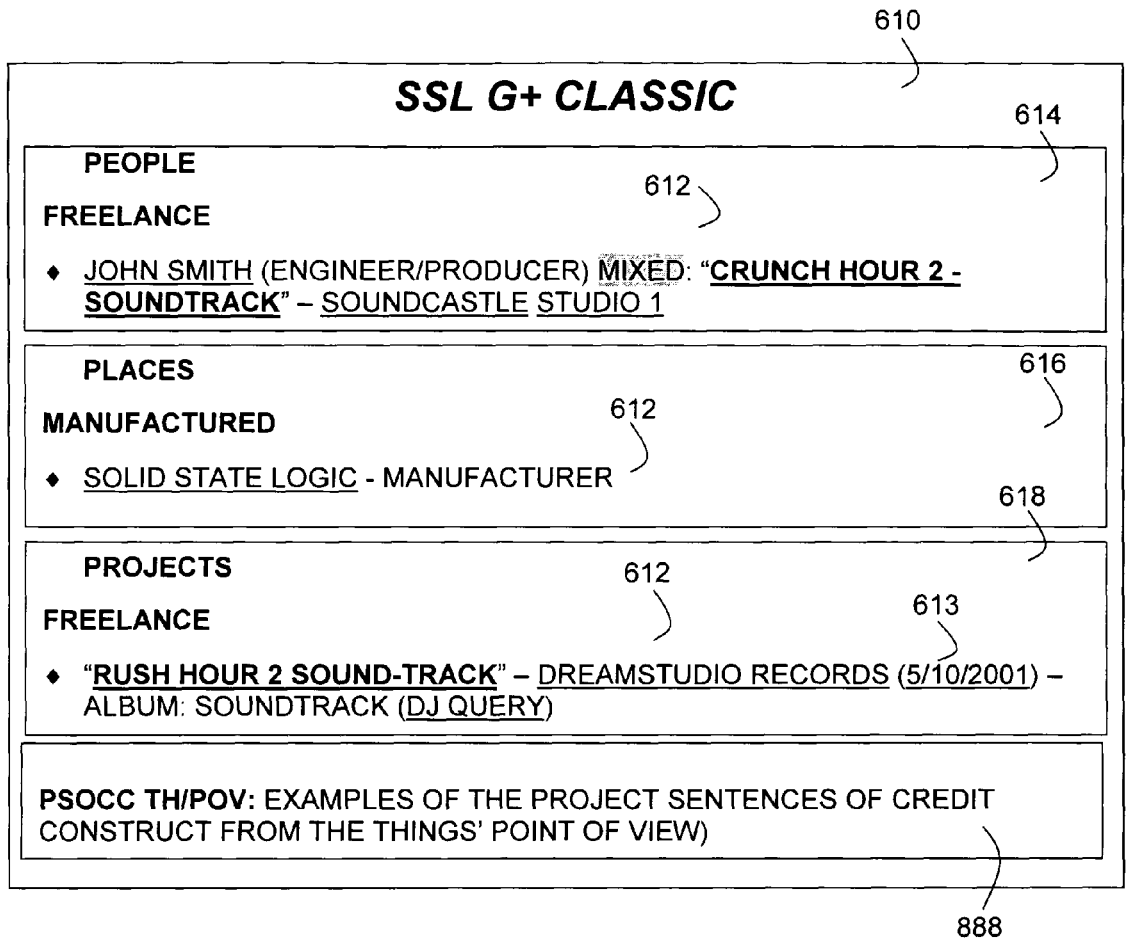
FIG. 16e is a diagram of a Things' Press Kit Conjunctive Project Sentence of Credit Construct example within credit reporting modules for People, Places, and Projects, with appropriate Things' point of view text, according to the above preferred embodiment of the present invention.

FIG. 16e illustrates the Things Press Kit 610 (i.e. Press Kit Report 550 for Things 218) which may contain a Things People Credit Module 614, a Things Places Credit Module 616, and a Things Projects Credit Module 618, containing Conjunctive Project Sentences of Credit Construct from the Things Point of View 612. The Things People Credit Module 614 displays Conjunctive Project Sentences of Credit Construct 551 containing People 202 Elements 201 in the Things Press Kit 610 and is used in the Things Press Kit 610 to show their Credits 551 and to hyperlink to related People Press Kits 552. The Things Places Credit Module 616 displays Conjunctive Project Sentences of Credit Construct containing Places 204 Elements 201 in the Things Press Kit 610 and is used in the Things Press Kit 610 to show their Credits 551 and to hyperlink to related Places Press Kits 578. The Things Projects Credit Module 618 displays Conjunctive Project Sentences of Credit Construct 551 containing Projects 216 Elements 201 in the Things Press Kit 610 and is used in the Things Press Kit 610 to show their Credits 551 and to hyperlink to related Projects Press Kits 590.

Referring to FIG. 17a, FIG. 17b, and FIG. 17c, the People Press Kit 552 may also contain a Header Module 558, a Profile or Highlights Module 560, a Highlights Module 562, a Skills & Talents Module 564, a MediaStyling Module 566, an Affiliations Module 572, an Education Module 574, and an Additional Contacts Module 576 containing a World Address 148, wherein said modules are derived from the Relational Information 120.

The Header Module 558 is a module featuring the Relational Information 120 including the Element's 201 Name 234 wherein the Press Kit Generator 538 retrieves Header Information from the Relational Information 120 and reports it in this Module. The Profile or Highlights Module 560 is a module featuring the Relational Information 120 including the Profile or Highlights 141, wherein the Press Kit Generator 538 retrieves Profile or Highlights 141 information from the Relational Information 120 and reports it in this Module. Highlights Module 562 is a module featuring the Relational Information 120 including the Highlights 141, wherein the Press Kit Generator 538 retrieves Highlights 141 information from the Relational Information 120 and reports it in this Module. The Skills & Talents Module 564 is a Module featuring the Relational Information 120 including the Skills and Talents 140 Relational Information 120, wherein the Press Kit Generator 538 retrieves Skills and Talents 140 information from the Relational Information 120 and reports it in this Module. The MediaStyling Module 566 is a module featuring the Relational Information 120 including the MediaStyling 158 Relational Information 120, wherein the Press Kit Generator 538 retrieves MediaStyling 158 information from the Relational Information 120 and reports it in this Module. The Affiliations Module 572 is a module featuring the Relational Information 120 including the Affiliations 144 Relational Information 120, wherein the Press Kit Generator 538 retrieves Affiliations 144 Information from the Relational Information 120 and reports it in this Module. The Education Module 574 is a Module featuring the Relational Information 120 including the Education 142 Relational Information 120, wherein the Press Kit Generator 538 retrieves Education 142 Information from the Relational Information 120 and reports it in this Module. The Additional Contacts Module 576 is a Module featuring the Relational Information 120 including the Additional Contacts 145 Relational Information 120, wherein the Press Kit Generator 538 retrieves Additional Contacts 145 information from the Relational Information 120 and reports it in this Module.

The Featured Credits Module 556 contains Conjunctive Project Sentences of Credit Construct from the People Point of View 554. Conjunctive Project Sentences of Credit Construct from the People Point of View 554 may also be included or excluded from display according to its reported Elements 201 of People 202, Places 204, Projects 216, or Things 218 where said includes and excludes are defined in the Press Kit Parameters 160 and may be maintained by the Maintain Press Kit Parameters 332 process (as shown in FIG. 3c, FIG. 12, FIG. 19a, and FIG. 19b), according to user preferences.

Referring to FIGS. 16a-17b, it is appreciated that this feature provides the user a means for blocking unwanted Conjunctive Project Sentences of Credit Construct from the People Point of View 554, Conjunctive Project Sentences of Credit Construct from the Places Point of View 580, Conjunctive Project Sentences of Credit Construct from the Projects Point of View 600, and Conjunctive Project Sentences of Credit Construct from the Things Point of View 612 from displaying in the respective People Press Kit 552, Places Press Kit 578, Projects Press Kit 590, or Things Press Kit 610.

As shown in FIG. 17b, An Awards Module 568 in the People Press Kit 552, the Places Press Kit 578, the Projects Press Kit 590, and the Things Press Kit 610 lists the Awards 220 that are associated to the respective People 202, Places 204, Projects 216, and Things 218. A Related Awards Module 570 lists the Awards 220 that are associated to the respective People 202, Places 204, Projects 216, and Things 218 by an Overlapping Credit Construct 199, including the People 202, Places 204, Projects 216, or Things 218 that is pointed to by the Awards 220 to Recipient Associative Value 198 as the recipient. Such Modules may be arranged in an order determined by the Press Kit Parameters 160, which may be set according to user preferences. A Press Release Link 946 may link to Performance Venues 948 on Showire 976, as shown in FIGS. 17a and 21d.

Referring to FIGS. 17b-17c, the Additional Contacts Module 576 contains a Private Professional Contact Link 577, upon click displays a Digital ID Input Box 890 which is a digital ID input box where the user can input their digital ID, such as a password, to gain access to the Private Professional Point of Contact 892. If permission to view is granted, a Private Professional Point of Contact 892 is displayed, which is a Point of Contact (POC) for the Press Kit Owner 908 that can only be viewed by selected users, typically a professional user. It is linked from the Press Kit Report 550 if the user enters a digital ID. The digital ID is checked against a security database which permits any Press Kit Owner 908 to grant or deny access to their Private Professional Point of Contact 892 by any other member. In addition, an Additional Attributes Link 932 links to Physical Attributes 222 (as shown in FIGS. 17a and 17g), wherein the Additional Attributes Link 932 is a link to a page containing physical attributes from the Physical Attributes 222 table on the Press Kit Report 550.

Referring to FIG. 17d, a Project Phase Timeline Report 893 displays the Phases 902 which are Concept Development, Pre-Production, Production, Post-Production, Manufacturing/Distribution/Promotion. These Phases 902 are possible Data 800 for the Point In Time 112 in the Point In Time Table 118. Each of the Phases 902 of the Project 216 has a Start Time 904 and an End Time 906 which are attributes in the Point In Time Table 118. The Associative Value 116 is an Effort on the Phase 898 with its own unique Start Time 904 and End Time 906. The Start Time 904 and End Time 906 corresponding to the Associative Value 116 may appear Within the Phase 898, or Outside the Phase 900, determined by the Start Time 904 and the End Time 906 of the Associative Value 116 compared with that of the Phase 902. The Phases 902 form an Axial Line 896 with the pictorial Phase Box 894.

Figure 17E:
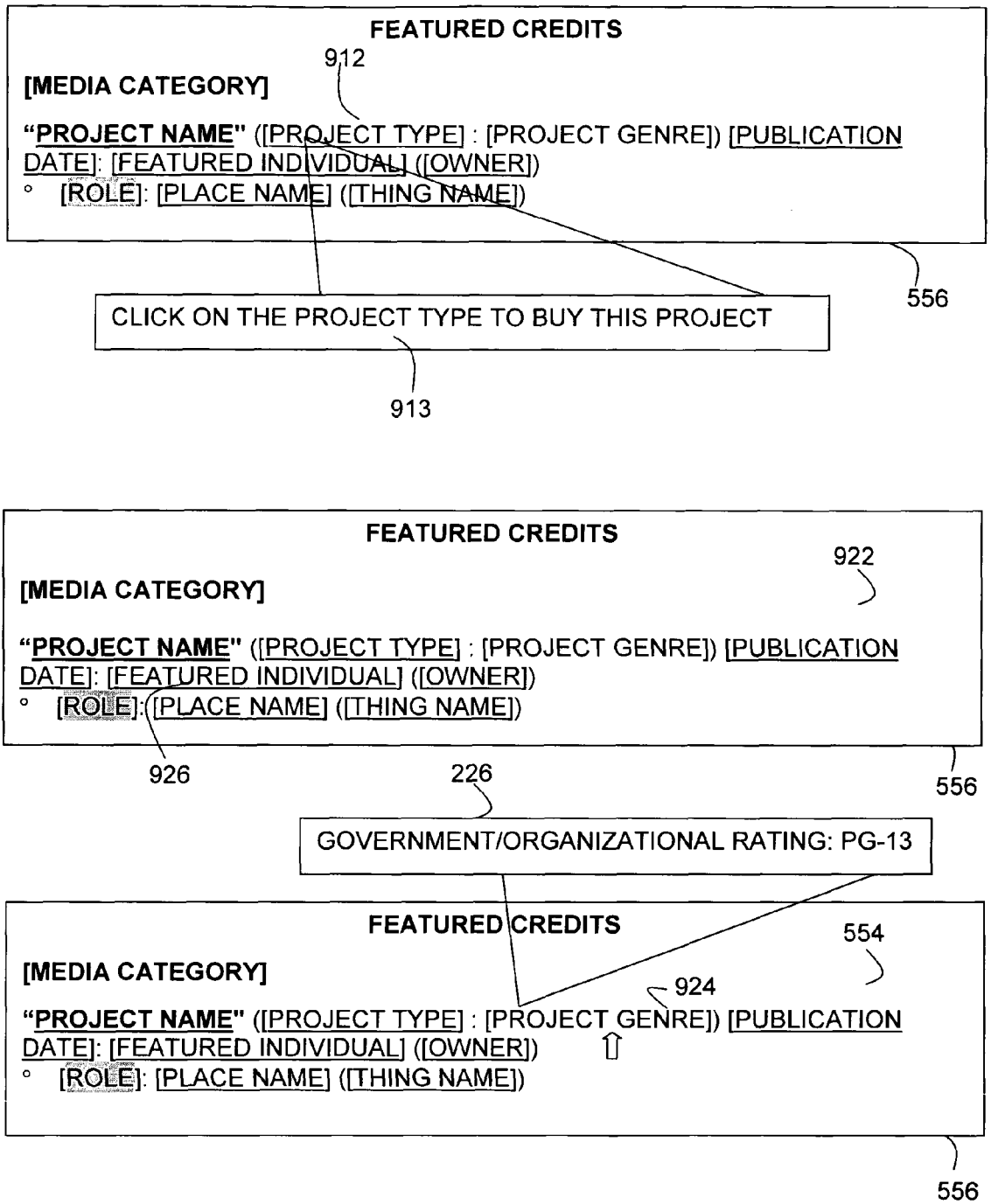
FIG. 17e is a diagram showing the various Conjunctive Project Sentences according to the above preferred embodiment of the present invention.

FIG. 17e illustrates a Project Type Mouseover 913 revealing a Project Buy Dialog Box 912 in order to purchase goods related to the Projects 216. Also, a Project Genre Mouseover 924 reveals the Government/Organizational Rating 226. A Featured Individual 926 is selected by an Associative Value 116 specified in the Press Kit Parameters 160, wherein the Project Genre Mouseover 924 is a slot for an Element 201 that is featured, wherein the Element 201 is selected according to the rules for Featured Individual 926 selection. The Featured Individual 926 slot is a field of the Conjunctive Project Sentence of Credit Construct 551.

FIG. 17f illustrates an example of an Auto Credits Page 918 in the Press Kit Report 550 showing Conjunctive Project Sentences of Credit Construct from the People Point of View 554, Conjunctive Project Sentences of Credit Construct from the Places Point of View 580, Conjunctive Project Sentences of Credit Construct from the Projects Point of View 600, or Conjunctive Project Sentences of Credit Construct from the Things Point of View 612 that were not selected in the Press Kit Parameters 160 as Featured Credits 556 (as shown in FIG. 16b), because the Credits 551 were not chosen by the Press Kit Owner 908 to appear in the Featured Credits 556 section, as shown in FIG. 13. In addition, the Auto Credits Page 918 will display future Projects 216 and Not Yet Released Projects 952. An Input Source Rollover 942, as shown in FIG. 17f, reports the name of the Input Source 1120 and a User Rating 1140 when a user rolls over the Associative Value 116. There are also links for the Media Categories 156 Music 954, Theater 956, Radio 958, Movies 960, Television 962, Multimedia 964, the Web 966, and Other 968. The subcategories of Other 968 can include, but are not limited to, Fashion, Literature, and the Arts.

FIG. 17g illustrates that the Physical Attributes 222 may be displayed. The embodiment may desire to not allow Physical Attributes 222 to be accessed by the People Search Engine 518, Places Search Engine 520, Projects Search Engine 522, or Things Search Engine 524.

Figure 18:
FIG. 18 is a schematic diagram of a homepage of the Automated Press Kits with Auto Credits Report displaying the Conjunctive Project Sentences of Credit Construct according to the above preferred embodiment of the present invention.

Referring to FIG. 18, an Automated Press Kit with Auto Credits Report 920 displays the Conjunctive Project Sentences of Credit Construct from the People Point of View 554, the Conjunctive Project Sentences of Credit Construct from the Places Point of View 580, the Conjunctive Project Sentences of Credit Construct from the Projects Point of View 600, and the Conjunctive Project Sentences of Credit Construct from the Things Point of View 612 that do not appear elsewhere on any Press Kit Report 550, as shown in FIG. 13.

Figure 19A:
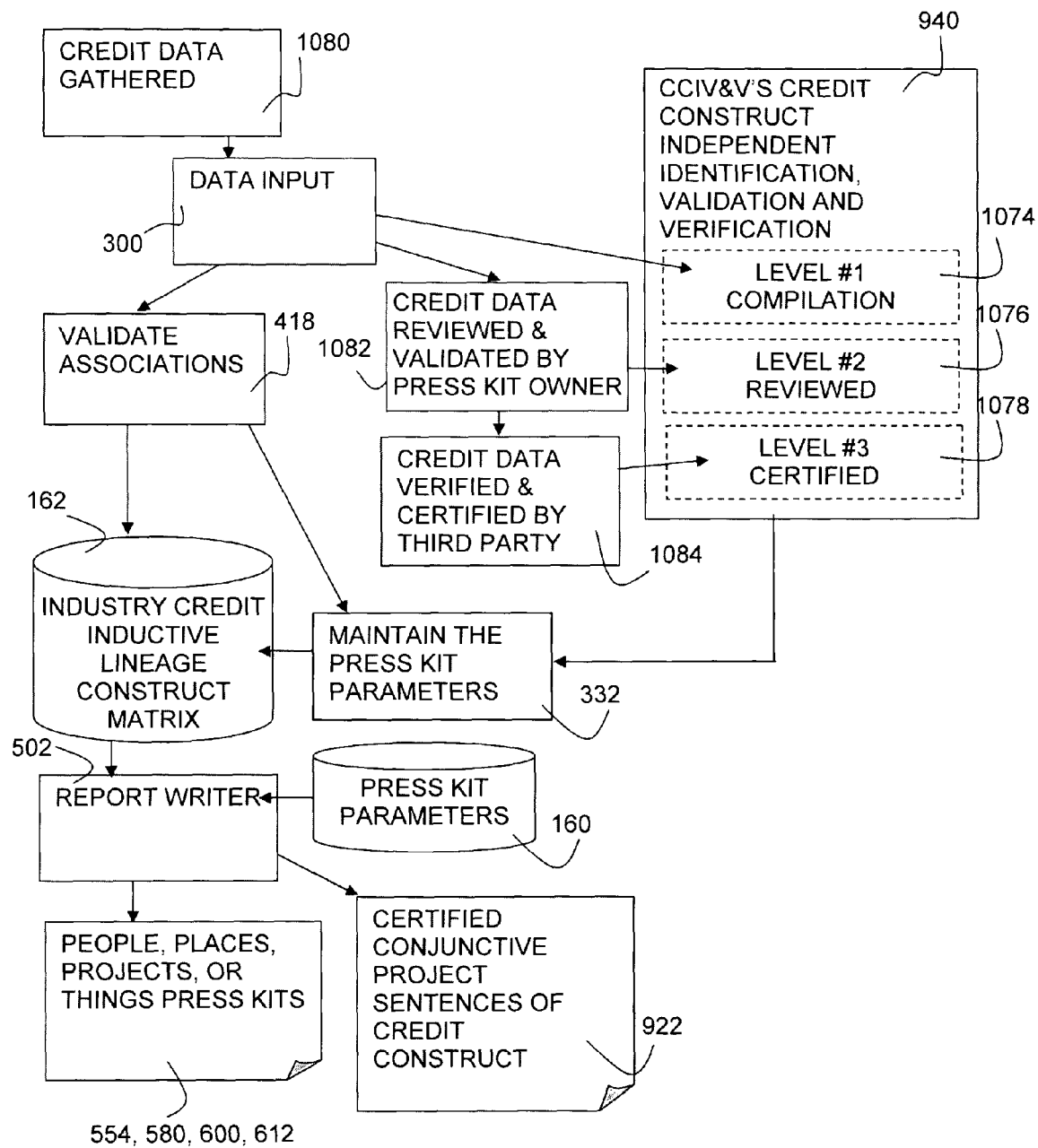
FIG. 19a is a block diagram illustrating the Collect Data Process according to the above preferred embodiment of the present invention.

Referring to FIG. 19a, a process for Credit Construct Independent Identification, Validation, and Verification, CCIV&V's 940 is used for auditing the submitted Credit Data 302. Credit Data Gathered 1080 is sent to the Data Input 300 process, and is classified as CCIV&V's 940 Level 1 Compilation 1074. Credit Data Gathered 1080 is sent to the Data Input 300 process and then sent to the Credit Data Reviewed and Validated by Press Kit Owner Process 1082 and is classified as CCIV&V's 940 Level 2 Reviewed 1076. Credit Data Gathered 1080 is sent to the Data Input 300 process and then sent to the Credit Data Reviewed and Validated by Press Kit Owner Process 1082 and the Credit Data Verified & Certified by a Third Party Process 1084 and is classified as CCIV&V's 940 Level 3 Certified 1078. The Report Writer 502 will report the Conjunctive Project Sentences of Credit Construct from the People Point of View 554, Conjunctive Project Sentences of Credit Construct from the Places Point of View 580, Conjunctive Project Sentences of Credit Construct from the Projects Point of View 600, and Conjunctive Project Sentences of Credit Construct from the Things Point of View 612 that have been Independently Identified, Validated, and Verified according to three Levels of CCIV&V's 940.

Figure 19B:
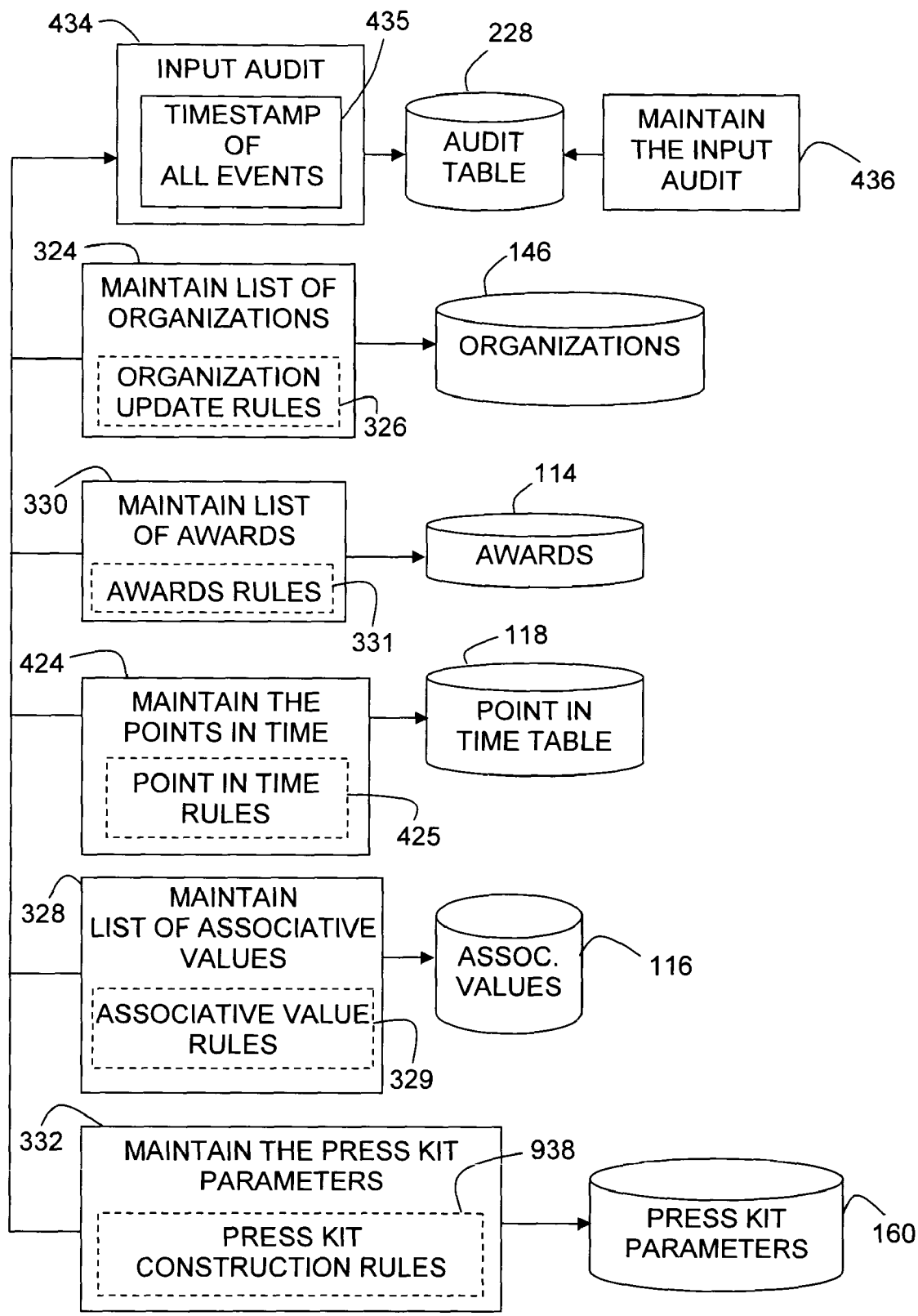
FIG. 19b is a block diagram illustrating the Maintenance Modules according to the above preferred embodiment of the present invention.

FIG. 19b illustrates various Maintenance Modules 322 which are programmed modules used to maintain and edit existing information, including the Press Kit Parameters 160 which may be set according to user preference, the lists of Organizations 146, the Awards 220, the Point In Time Table 118, and the Associative Values 116.

The Press Kit Parameters 160 is maintained by a Maintain Press Kit Parameters 332 which is a process for changing the Press Kit Parameters 160 for a particular Element's 201 Press Kit Report 550, as part of the Data Input 300 process or in response to user request, wherein the Press Kit Construction Rules 938 are the rules for constructing the Press Kit Reports 550 so as to control the selection of Featured Individual 926, the wording of Module titles, and the notation of the Method's CCIV&V's 940.

A Maintain Organizations Process 324, which is used to maintain the list of Organizations 146, to add new Organizations 146, to remove Organizations 146, and to edit Organizations 146, maintains the values found in the list of Organizations 146 in order to eliminate duplicate entries, and incorrectly combined entries, and to ensure that the values are correctly spelled, wherein a set of Organization Update Rules 326 is used to govern the decisions involving the adding, removing, and editing of Organizations 146. These Rules 326 are used by the Maintain Organizations Process 324 to determine what Values of information will be allowed in the Relational Database 100.

A Maintain Associative Values Process 328 is used to maintain the list of Associative Values 116 in order to eliminate duplicate entries, and incorrectly combined entries, and to ensure the values are correctly spelled so as to maintain the list of Associative Values 116, to add new Associative Values 116, to remove the Associative Values 116, and to edit the Associative Values 116, wherein a set of Associative Value Rules 329 is used by the Maintain Associative Values Process 328 to determine what values of information will be allowed in the Relational Database 100, i.e., to govern the decisions involving the adding, removing, and editing of Associative Values 116.

A Maintain Awards Process 330 maintains the Awards Table 114 in order to eliminate duplicate entries, and incorrectly combined entries, and to ensure that the values are correctly spelled so as to maintain the Awards Table 114, to add new Awards 220, to remove Awards 220, and to edit Awards 220. A set of Awards Rules 331 that govern the decisions involving the adding, removing, and editing the Awards Table 114 are used by the Maintain Awards Process 330 to determine what values of information will be allowed in the Relational Database 100.

A Maintain the Point In Time Process 424 maintains the Point In Time Table 118 whenever there is a change to the Point In Time Table 118 such as the Data Input 300 process. Also, an Input Audit 434 process is used to maintain the Audit Table 228 by recording input and maintenance actions by the input and the maintenance processes. Timestamp Changes 435 are processed by the Input Audit 434 process for attaching the current time for any input or maintenance action.

It is appreciated that any Future Modules and/or Processes 334 as illustrated in FIG. 2a, that may access the System, and/or produce different reports from the same information and to illustrate that the reports and the existing Data Input 300 process are not the only means for inputting and outputting from the system.

Figure 20A:
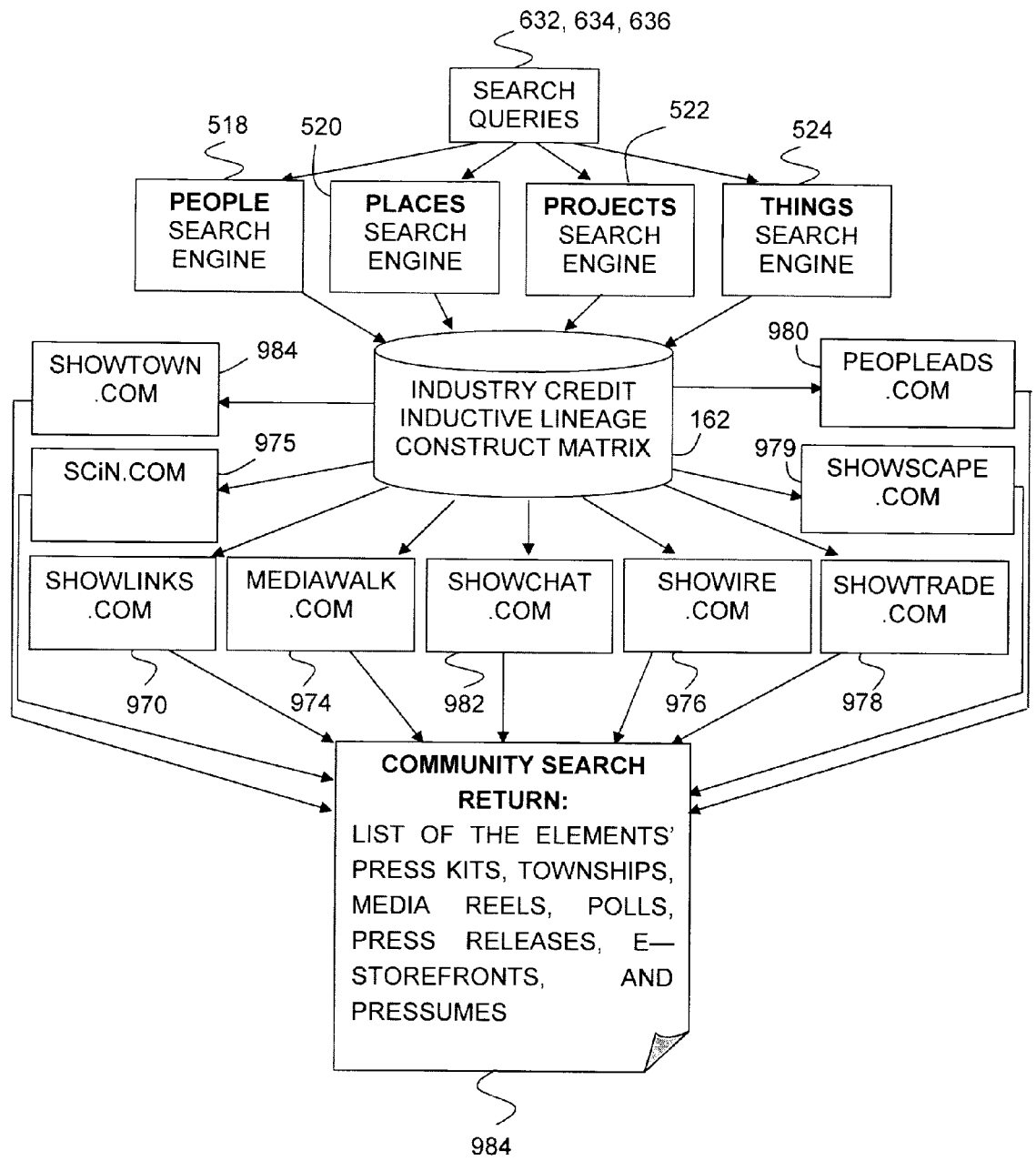
FIG. 20a is a block diagram illustrating the Search Queries and Search Engines for various applications according to the above preferred embodiment of the present invention.

Referring to FIG. 20a, the Search Queries 632, 634, 636 are passed into the People Search Engine 518, the Places Search Engine 520, the Projects Search Engine 522, and the Things Search Engine 524 to Query 622 the Industry Credit Inductive Lineage Construct Matrix 162. A Showtown 984, a Showlinks 970, a Mediawalk 974, a Showire 976, a Showtrade 978, a Peopleads 980, a Showchat 982, a SCiN 975, and a Showscape 972 web site will report whether the People 202, Places 204, Projects 216, or Things 218 in a Community Search Return 986 will have a Press Kit Report 550, a Township 990, a Media Reel 992, a Press Release 994, an E-Storefront 996, a Pressume 998, a Poll 1000, or E-Zine 993, as shown in FIG. 20b.

Figure 21A:
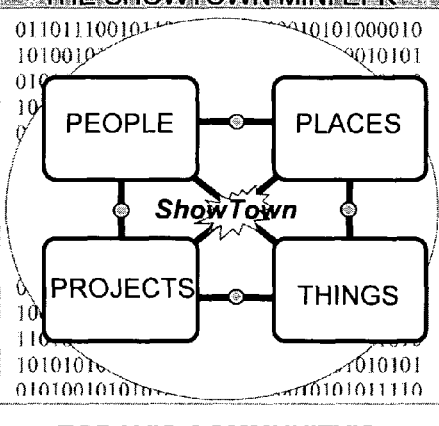
Figure 21C:
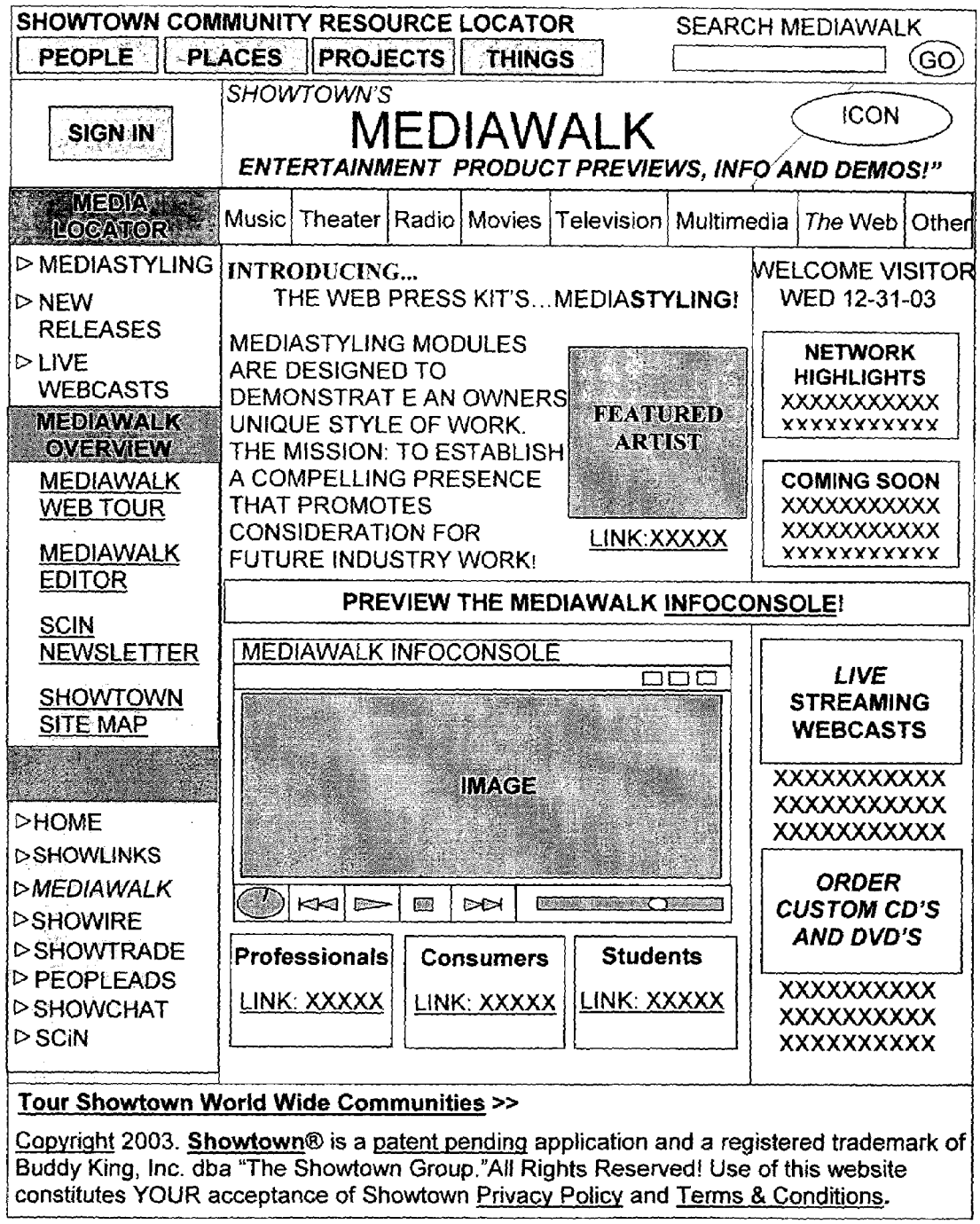
Figure 21E:
Figure 21H:

The Showtown 984 is a Community web site whose main feature is the Township 990, as shown in FIG. 21a. The Showlinks 970 is a Community web site whose main feature is the Press Kit Report 550, as shown in FIG. 21b. The Mediawalk 974 is a Community web site whose main feature is the Media Reel 992, as shown in FIG. 21c. The Showire 976 is a Community web site whose main feature is the Press Release 994, as shown in FIG. 21d. The Showtrade 978 is a Community web site whose main feature is the E-Storefront 996, as shown in FIG. 21e. The Peopleads 980 is a Community web site whose main feature is the Pressume 998, as shown in FIG. 21f. The Showchat 982 is a Community web site whose main feature is the Poll 1000, as shown in FIG. 21g. The SCiN 975 is a Community web site whose main feature is the E-Zine 993, as shown in FIG. 21h. The Showscape 972 is a Community web site whose main feature is the Global Search, as shown in FIG. 21j.

The homepages of the Showtown 984, the Mediawalk 974, the Showchat 982, the Showtrade 978, the Showire 976, the Peopleads 980, the Showlinks 970, the Showtown World Wide, the SCiN 975, and the Showscape 972 are embodied and illustrated in FIGS. 21a to 21j of the present invention. The homepages designs as shown in FIGS. 21a to 21j are used to demonstrate how the System of the present can be embodied through the Internet 714 and operated through the Client Computer System 700 of the user, but not intended to limit the scope of the following claims.

Figure 20B:
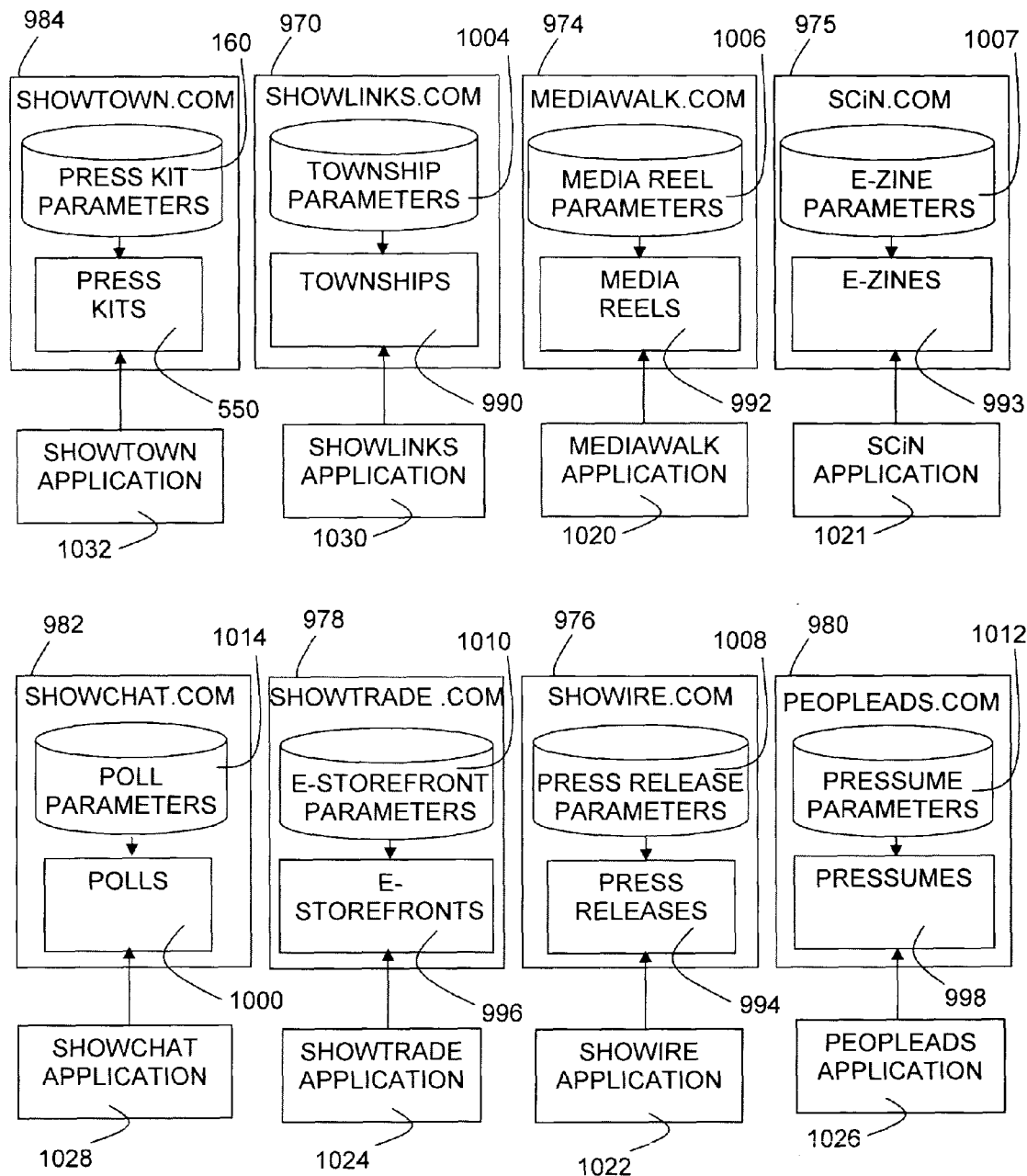
FIG. 20b illustrates the Poll Parameters and Polls for various applications according to the above preferred embodiment of the present invention.

As shown in FIG. 20b, the Showtown 984 comprises Township Parameters 1004 and Townships 990 which are maintained by the Showtown Application 1032. The Showlinks 970 comprises Press Kit Parameters 160 and Press Kit Reports 550 which are maintained by the Showlinks Application 1030. The Mediawalk 974 comprises Media Reel Parameters 1006 and Media Reels 992 which are maintained by the Mediawalk Application 1020. The Showchat 982 comprises Poll Parameters 1014 and the Polls 1000 which are maintained by the Showchat Application 1028. The Showtrade 978 comprises E-Storefront Parameters 1010 and E-Storefronts 996 which are maintained by the Showtrade Application 1024. The Showire 976 comprises Press Release Parameters 1008 and the Press Releases 994 which are maintained by the Showire Application 1022. The Peopleads 980 comprises Pressume Parameters 1012 and Pressumes 998 which are maintained by the Peopleads Application 1026. The SCiN 975 comprises E-Zine Parameters 1007 and E-Zines 993 which are maintained by the SCiN Application 1021.

Regarding the rules for People 202, for People Credit Sentence Structure for Press Kit Report 550, if the Media Category 156 is Music 954, display the Performing Artist 1110. If the Projects 216 is a song, and the parent Projects 216 is an album, display the album name and the owner. If the Projects 216 is an episode and the parent is a TV show, display the TV show name and the owner.

Regarding the rules for Groups, when entering the People 202 information, the following transactions are required:

Note: Groups are treated as facilities

1. Create a Group information record using the Places 204 maintenance screen.

2. Create a Places 204 to Places 204 Association 176 (parent no provider) (used as Places 204 in the Element 201 Association 176).

3. Create an Element 201 Association 176 using the Professional Name 235 (People 202), Group name (Places 204) and Role 178 is Member. Note: no contribution needed.

4. Member of the Group on a Project 216 is known by there being an Element 201 Association 176 containing PROFESSIONAL Name 235 & Group. A PEOPLE Name 234 & Group means that you worked for the Group example (hairdresser).

This will allow the People Press Kit 552 to display that they were a member on a Projects 216. And what they did as a Member of the Group on the Project 216.

When entering the Group information, the following transactions are required:

Note: Groups are treated as Professional Name 235

1. Create a Group information record using the Places 204 maintenance screen.

2. Create a Professional Name 235 record for each Member.

3. Create a People 202 to Places 204 Association 176 using the Professional Name 235, the Associative Values 116 are current Member or past Member, Company Position is what they do in the Group example (drummer) (populates the member section in the Press Kit Report 550).

4. Create a Places 204 to People 202 with the Group as the Professional Name 235 and the Association 176 FreeLance (used as the People 202 record in the Element 201 Association 176).

5. When an individual is no longer a Member, they are removed from the People 202 to Places 204 Association 176.

6. Create an Element 201 Association 176 using the Group Name (People 202), performance location (Places 204 facility) and Role 178.

7. This will allow the Group Press Kit Report 550 to display current Members and the Group's Role 178 on the Projects 216.

Does not allow for the display of the Members that performed with the Group on the Projects 216. For this the user would need to input Member transaction.

If the user performed with the Group (not as a Member), then the Group is the Performing Artist 1110 on Projects 216 and you had a Role 178 on the Projects 216 (backup singer).

Regarding the rules for adding Groups, Groups can be added by creating a transaction similar to the facility transaction. The transaction would consist of the People 202, Projects 216, Places 204 (Group) and the Associative Value 116 would be what they did with the band on this Projects 216. It would display in the People Press Kit 552 as another Role 178 on Projects 216.

Regarding the rules for Places 204, for the Places 204 template, the modules will list in the order of the sequence number that is assigned in the Press Kit Parameters 160.

Regarding the Short_co_header1 module layout for Places Press Kit 578, for fixed selections, only Awards 220 that were directly awarded to the Places 204. Media Category 156 lists all categories separated by a comma. Places 204 type is Places 204 type from the Places 204 header record.

Regarding the accepted parameters, for Significant Positions, Default is "owner, president, executive CEO, vice president, manager, sales." These are company positions. These positions will list in this order. This list can be customized by entering a new list.

In the parameters for "short_co_header1" for Places Press Kit 578 by entering a parameter, the default will be overridden. The column name is "pos_title." The values must be ones that were entered as a Places 204 position. The parameter type is "include."

Regarding Places 204 description, default is null. Entering a parameter in the description module for the "Short_co_header1" module can customize the description. The type is "company description."

Regarding the Short_co_featured_project module layout for Places Press Kit 578, for accepted parameters, if no parameters, the first 5 Projects 216 produced or owned by the company will be displayed in Publication Date 930 order.

Type=Loop controls how many Projects 216 will show. The default is 5.

Type=Order controls the order that the Projects 216 will list. If no order parameter is entered, the Projects 216 default order is Publication Date 930.

Regarding the column name field, for Projects Name 238 (proj_name), or Publication Date 930 (proj_date yyyy), the order parameter can accept both fields on the same record separated by a comma. You can also suffix the list of names in the column name field with description for descending or ascending for ascending.

Type=Includes and Exclude controls what Projects 216 will be displayed.

The program will accept in the Column name field. Places to Projects Associative Value (Contribution Value) 180 (contrib.) will allow Projects 216 for companies other than the owner or producer to show these Projects 216 as featured.

Projects Name 238 (proj_name), Projects 216 ID 101 (proj_id), or Projects 216 Publication Date 930 (proj_date yyyy)

The Value field will contain the Values for that field as in the Relational Database 100. The list is separated by commas.

Type=Sequence controls the absolute order that the Projects 216 will list. If the list of sequence number is less then the Loop number, the remaining Projects 216 will use the default order. Sequence takes precedence over the Order parameter. If Include or Exclude are set, the Sequence will only act upon the Projects 216 that meet the Include or Exclude list.

Regarding the Short_co_buttonsv module layout, this module only adds the links to the Press Kit Report 550 that will display the People 202, Projects 216, Things 218, and Awards 220 that have an Association 176 to the Places 204.

Regarding the Short_co_contact module layout, this module currently has no parameter options and will display all addresses in one column and the other contact information parallel column, telephone numbers.

Regarding the Rules for Places 204 Credit Construct 199, if the credit is in Media Category 156 Television 962 or Radio 958 and Projects 216 type "Commercial," display the Places 204 with role "Ad Agency" 1116. If the Credit 551 is in Media Category 156 Music 954 and there is a "Performing Artist," 1110 display the Performing Artist 1110. If the Credits 551 is in Media Category 156 Multimedia 964 and Projects 216 type "Game," display the Places 204 with the Contribution 180 "Designer" 1118. If the Credit 551 is in Media Category 156 Television 962 and Project Type is not "Commercial", display "Producer" 1114. If the Credit 551 is in Media Category 156 Radio 958 and Project Type is not "Commercial," display "Producer" 1114. If the Credit 551 is in Media Category 156 Movies 960, display "Producer" 1114. If the Credit 551 is in the Media Category 156 the Web 966 display "Designer" 1118.

Regarding the Places 204 to Places 204 Maintenance, the users need to establish what the "reason for the Affiliation" 144 is. The users can have "Peer 214 to Peer 214" Associations 176 which are controlled by the value entered. The users have reserved the following words:

Distribution
Joint Venture
Collaboration
Service
Product
Internal Distribution would be on "Location" record.

In establishing the Associations 176, we have the following rules:

Regarding Supplier/Vendor to Client/Customer, the most common anticipated Association 176 is the following:

Supplier/Vendor to Client/Customer

If there are Supplier/Client Associations 176 in both directions, then you would enter the Association 176 twice—once in each direction.

The Associative Value 116 in this Association 176 would either be "Service" or "Product."

It is the fact that we did not want to make a client's vendor list or customer list available to his competitors. Therefore, a vendor list or customer list would only be available on special request.

Regarding the Performing Artist 1110 collaboration, another scenario would be if two Performing Artists 1110 collaborate on a Projects 216, we would establish the following Association 176:

Performing Artist 1110 to Performing Artist 1110

The "Associative Value 116" would be "Collaboration."

Regarding the two Places 204 doing business together, if two Companies are doing business together under a Distribution arrangement, we would establish the following Association 176:

Places 204 to Places 204

The "Associative Value 116" would be "Distribution."

Regarding the Joint Ventures 213, if two Places 204 are doing a Joint Venture 213 on a Projects 216, we would establish the following Association 176:

Places 204 to Places 204

The "Associative Value 116" for this Association 176 would be "Joint Venture."

Regarding the sample Places to Places Associative Value (Structure Value) 190, the Places 204 would be entered as an Entertainment Company, Manufacturer, Service. The Production Locations and Work Areas would be entered as Facilities. The Places 204 owns the Production Location and the Production Location owns the Work Area.

If accessing the Places 204, the name is "Places Name 236." If accessing the Production Location, the name is "Places Name: Production Location." If accessing the Work Area, the name is "Production Location: Work Area."

The Facilities under Places 204 are:
Places Name: Production Location A
Production Location A: Work Area 1
Production Location A: Work Area 2
Places Name: Production Location B
Production Location B: Work Area 1
Production Location B: Work Area 2
The Facilities under each Production Location are:
Production Location A: Work Area 1
Production Location A: Work Area 2

The Distribution (external) could be another Places 204 or a subsidiary of the current Places 204. The Distribution (internal) would be Places 204 to Places 204 with the same ID 101. When the user asks for the Places 204 sources of distribution, the user would get the external and internal Distribution Places 204 ID 101. When the user asks for the "Production Location B: work area 2" sources of distribution, the user would only get the internal Distribution Places 204 ID 101. All other Production Locations and Work Areas would not return information about the distribution.

Regarding new Places 204 configuration, companies would be entered:

1. Entertainment Places 204—Places 204 involved in the production of the Projects 216. Example, the record label, production company.

2. Manufacturer Place 208—Places 204 that are involved with making the Things 218 that are used on the Projects 216.

3. Services—Places 204 that provided support services for the Projects 216: catering company, wardrobe, location scout, distribution company.

4. Facilities—The physical location where that Projects 216 was produced. This would include studios, theaters, shooting location, concert locations.

A Location would be an Association 176 to either an Entertainment Places 204 (sound studios, back lots, or location where a scene was shot, Manufacturer Place 208 (factory), or Service (distribution Places 204).

All Facilities must have a Parent Places 210. To properly create a Facility, the user needs the following:

1. Create a Places 204 record for the Places 204 that owns the Facility

2. Create a Facility record

3. Create a Places 204 to Places 204 Association 176 with the value of owner. (The Places 204 is the Parent Place 210 and the Facility is the Child Place 212).

If the facilities POC is not the Parent Place 210 then the Facility record will have a POC.

1. The World Address 148 is the Facility where it is located.
2. The Places Name 236 is what it is called.
3. The Type is what it is.

Facilities would only have Telephone 150 numbers if the Facility has a unique POC. The Places 204 could have a World Address 148 and Telephone 150 number—one for POC and one for Additional Contacts. If these Additional Contacts are Locations that belong to the Places 204, they would be entered as Facilities with a Places 204 to Places 204 Association 176.

Reference to the distribution of the manufacturer's product or the production's product is handled using a Places 204 to Places 204 Association 176 to the Places 204 that does the distribution. If the same Places 204 handles the production and distribution, a Places 204 to Places 204 Association 176 with both Places 204 being the same would be used. If the user needs to track distribution activity separately from the production activity, then the distribution would be handled as a separate Places 204.

The same would be true for sales, advertising, marketing, and any other facet of the business that is required to get the product to market.

Regarding the rules for Places to Projects Associative Value (Contribution Value) 180, Facility's Contributions 180 are what the Facility was used for:

Example: post production, overdubbing, shooting location, production location, live theater.

Places 204 Contributions 180 are what the Places 204 does:
Example: produced, own.

Regarding the rules for Locations, for definition of Location:

When searching for Location. By definition, the user is looking for the name of a Places 204 that is located in a particular geographical Location. This Places 204 is referred to as a Facility. The following are the rules for relating Location (World Address 148) records to Facility (Location) records.

Projects 216 can only have a POC World Address 148 that is a contact World Address 148 (Locations are denoted using the Association 176 to a Facility). If the Projects 216 POC is the Production Company, then the Projects 216 does not have a Location (World Address 148) record.

Facilities can have a Location World Address 148 and the POC would default to the Places 204 or Facility. Or the Facility can have a Location WORLD Address 148 and a POC that is a contact World Address 148. Or the POC can be the Location World Address 148.

Places 204 can have a contact World Address 148, and a location World Address 148. Either World Address 148 can be the POC.

People 202 can have a World Address 148 that is their POC plus additional contact World Addresses 148.

Things 218 can only have a POC World Address 148 that is a contact address if the POC is not the Manufacturer Place 208.

When making an Association 176 from a Location (World Address 148) record to a Facility (Location) or Places 204, the following field definitions apply. "Location Address" is a valid value that would go in the Location Type field to show that this is a World Address 148 that denotes the geographical location of a Places 204.

"Contact Address" is a valid value that would go in the Location Type field to show that this is a World Address 148 that can be used as a source of contact.

For example (a P.O. Box could be a Contact Address but not a Location address.) POC can be either a Contact Address or a Location address.

The Location Name field is where you would put the name of the contact. The Location Name Type would be where you would put the identifier of an individual.

For example, the Name field might be John Smith and the Name Type would be Sales Manager This could then be displayed as:
John Smith
Sales Manger
12345 Main Street On Location Type "Location Address," the user would not have a Location Name or Type, unless on a Places 204 record the user is using the Location Address as the POC. This also applies if the Facility is the Places 204.

If the POC is on a Location Address, the addressee is the Places Name 236. If the Location address is the POC and there is a value in the Location Name field, then the Location Name shows as "c/o". If the POC is on a Contact Address, the addressee is the Location Name field and Location Name Type field.

To show the Locations involved with the production of a Projects 216, the user must associate the Projects 216 to a Facility (Location).

To create this Facility (Location), create the three needed records: Places 204, Facility, and Places 204 to Places 204 Association 176. To show that Facility is a "Shooting Location," create an Association 176 Facility to a Projects 216 with the Contribution 180 "Shooting Location" (Facilities are not Shooting Locations until they are used as a Shooting Location).

Regarding the Shooting Location, a Facility (Location) is entered by the name of the Facility (Location) "6$^{th}$ & Main" and the Type would be "public street corner." The Kind is "Facility." The Location Record would have a World Address 148 without a Name or Type unless the POC was not the owner. This record would then have a Places 204 to Places 204 Association 176. The associated Places Name 236 is "City of Los Angeles," the Places Type is "city municipal," and the Kind is "service." The way you know it is a Shooting Location is through its Contribution 180 to a Projects 216 as "Shooting Location"

Regarding the rules for Projects 216, for Series Evolution, the user has a base cast of Featured Individuals 926. The Series is entered by seasons with an Association 176 to the Projects Theme 242. The highest level of Association 176 is the Season Series. The base cast is entered with an Association 176 to the Season Series.

If a base cast Member changes, then the new Member is entered with an Association 176 to the Season Series with the character suffixed with "replacement" or "add" and the date. When cast or crew member has an Association 176 to an Episode, they are displayed in addition to the base cast. When displayed, the character will list the original and the replacement or addition. A cast or crew replacement is entered with an Association 176 to an Episode only if the replacement is temporary. The replacement Association 176 must be entered for each Episode in which they replace the original cast or crew member.

If the replacement is permanent, then the Member is entered with an Association 176 to the Season Series with a character designated as a replacement. When displayed, the character will show the original Member followed by the replacement. To designate a Member as a replacement for the cast, the character is suffixed with the word "replacement." If the cast Member is an addition to the base crew, then the character is suffixed with "add" and the date. If the cast Member is a replacement to the base cast, then the character is suffixed with "replacement" and the date.

The crew works the same as the cast except the designations are on the Role 178 and not the character. This means on a Places 204 record, the Credits 551 in the Media Category 156 will show as follows: Elements 201 that have an Association 176 to multiple Season Series will display their Association 176 as being from and to Season Series.

For example, if Elements 201 are involved only with a particular Episode, then that Element 201 is entered with an Association 176 only to the Episode. When reporting the Element 201, it shows the Credit 551 as "series: episode" [TV Show: Episode 1]. If the Element 201 is involved with many Episodes then the Element 201 is entered with an Association 176 to the Series. When reporting the Element 201, it shows the Credit 551 as the "series (yeary)" [TV Show (1999)]. Because Series are tracked by Season, if an Element 201 has an Association 176 to more then one Season, then the Credit 551 shows as "series (from-to)" [TV Show (1996-1999)].

Regarding the rules for Things 218, Things 218 cannot be tracked as individual items, and can only be reported as a class representation of the Things 218. This means it is not able to identify who provided an individual Thing 218 used on a Projects 216 or who manufactured the individual item. This is because two Places 204 could have provided the same Type of Things 218.

For example, two Places 204 provided Red 66 Mustang convertibles for a chase scene in a movie. The users cannot say which Places 204 provided which car. When reporting from a Things 218 Point of View 850, the Press Kit Report 550 would show the Places 204 that create, distribute, and use this class of Things 218.

For example, if the user says that a Red 66 Mustang convertible was used on a Projects 216, a Red 66 Mustang convertible Press Kit Report 550 would describe the Things 218 that make it a Red 66 Mustang convertible. It would list all of the Places 204 that Manufacture, Distribute, Sell and Use Red 66 Mustang convertibles.

What we are tracking in the Things 218 relations is:
A Projects 216 used a particular Type of Things 218 (This Projects 216 used Red 66 Mustang convertibles).
A Places 204 Provides (sells, rents, distributes) these Type of Things 218. (These Places 204 rent Red 66 Mustang convertibles for use in the movie.) We could not say what Places 204 rented which Red 66 Mustang convertible.
A Manufacturer Place 208 manufactures a particular Type of Things 218. (We could say these Places 204 manufacture Red 66 Mustang convertibles.) The user could not say what Places 204 manufactured either of the Red 66 Mustang convertibles used in the movie.

Regarding the Award Rules 331, Related to Award 220 Winning Elements 201, if a Projects 216 receives an Award 220, then all People 202 and Places 204 that worked on an Award 220 winning Projects 216 have a Related Award 570. The People 202 and Places 204 do not have to be on the same Association 176 record.

If a Places 204 worked on a Projects 216 and received an Award 220 for their effort on the Project 216, then this Award 220 is then included in the total Awards 220 earned for efforts on the Projects 216. The Association 176 record is Places 204 "Contribution" 180 Projects 216. This Association 176 is then assigned to the Award 220.

If a People 202 worked on a Projects 216 and received an Award 220 for their effort on the Project 216, then this Award 220 is then included in the total Awards 220 earned for efforts on the Project 216. The Association 176 record is People 202 "Role" 178 Projects 216. This Association is then assigned to the Award 220.

For a People 202 to get credit for an Award 220 to a Places 204, the People 202 would have to be part of the Places 204 Projects 216 Association 176. The Association 176 record would then read Places 204 "Contribution" 180 Project 216 "Role" 178 People 202. This would apply to individuals whose Role 178 on the Projects 216 was the cause of the Places 204 receiving the Award 220 for the Projects 216.

For a Places 204 to get credit for an Award 220 to a People 202, the Places 204 would have to be part of the People 202 Projects 216 Association 176. The Association 176 record would then read People 202 "Role" 178 Projects 216 "Contribution" 180 Places 204. This would apply to Places 204 whose Contribution 180 on the Projects 180 was the cause of the People 202 receiving the Award 220 for the Project 216.

For a Projects 216 to get credit for an Award 220 to a People 202 or Place 204, the People 202 or Place 204 would have had to receive the Award 220 for their Role 178 or Contribution 180 on the Projects 216. Things 218 can only have direct Awards 220.

Regarding the Rules for the User Rating 1140 of the Input Source 1120, as shown in FIG. 17f, the User Rating 1140 can be derived from a formula, including one of the following, a combination thereof, or any other qualification method established: Number of Credits 551 in the system, Number of years of tenure (experience).

Regarding the Rules for CCIV&V's 940, as shown in FIG. 19a, Credit Data 302 will be gathered according to three Levels of CCIV&V's 940 (based on the three auditing principles of today's accepted practices for good accounting). The three Levels, 1074, 1076, 1078, are Compilation 1074, Reviewed 1076, and Certified 1078. (Level #1) Compilation 1074, the lowest Level, has one check—that of the submitting author (any Credit Data 302 Compiled from another Input Source 1120 not being the Press Kit Owner 908). Level #2 Reviewed 1076, the next Level, has two checks—that of the submitting author plus that of the individual who is the subject of the Press Kit Report 550 (Credit Data Gathered 1080 from the Press Kit Owner 908 or owner's representative, or Credit Data Gathered 1080 from other sources that has been Reviewed and Validated by said Press Kit Owner 1082). Level #3 Certified 1078, the highest Level, has three checks—that of the submitting author, that of the individual who is the subject of the Press Kit Report 550, and lastly third party Verification and Certification (Credit Data 302 reported as Gathered 1080, Reviewed and Validated by the Press Kit Owner 1082, and Verified and Certified by a Third Party 1084, the Method will report said ConjunctiveProject Sentence of Credit Construct 551 as System Certified 922).

Regarding the Rules for Media Category 156, as shown in FIG. 3a, the "Other" 968 Media Category 156 will be comprised of items not found in the other seven Media Categories 156. The Media Category 156 "the Web" 966 will be comprised of Internet 714 related People 202 (e.g., John Skootsky), Places 204 (e.g., DSW), Projects 216 (e.g., Showlinks), and Things 218 (e.g., DSL).

Regarding the Rules for changing the ConjunctiveProject Sentence of Credit Construct 554, 580, 600, 612, a Minor Change is defined as a departure from the standard way of displaying information in a ConjunctiveProject Sentence of Credit Construct 551. A Press Kit Report's 550 Mission allows Minor Changes to be made in the way information is displayed in the ConjunctiveProject Sentence of Credit Construct 551, without changing the Press Kit Report's 550 POV 850. Major Changes can be made to the function of the ConjunctiveProject Sentence of Credit Construct 551 according to the Relational Database 100 Industry Mission. Layout changes do not change the definitions within the Industry Relational Database 100. Different Press Kit Templates can be provided with different ConjunctiveProject Sentence of Credit Construct 551 layouts (Minor Variations) that the Press Kit Owner 908 can choose from. For example, one template might be for Projects 216 within Projects 216.

Figure 23:
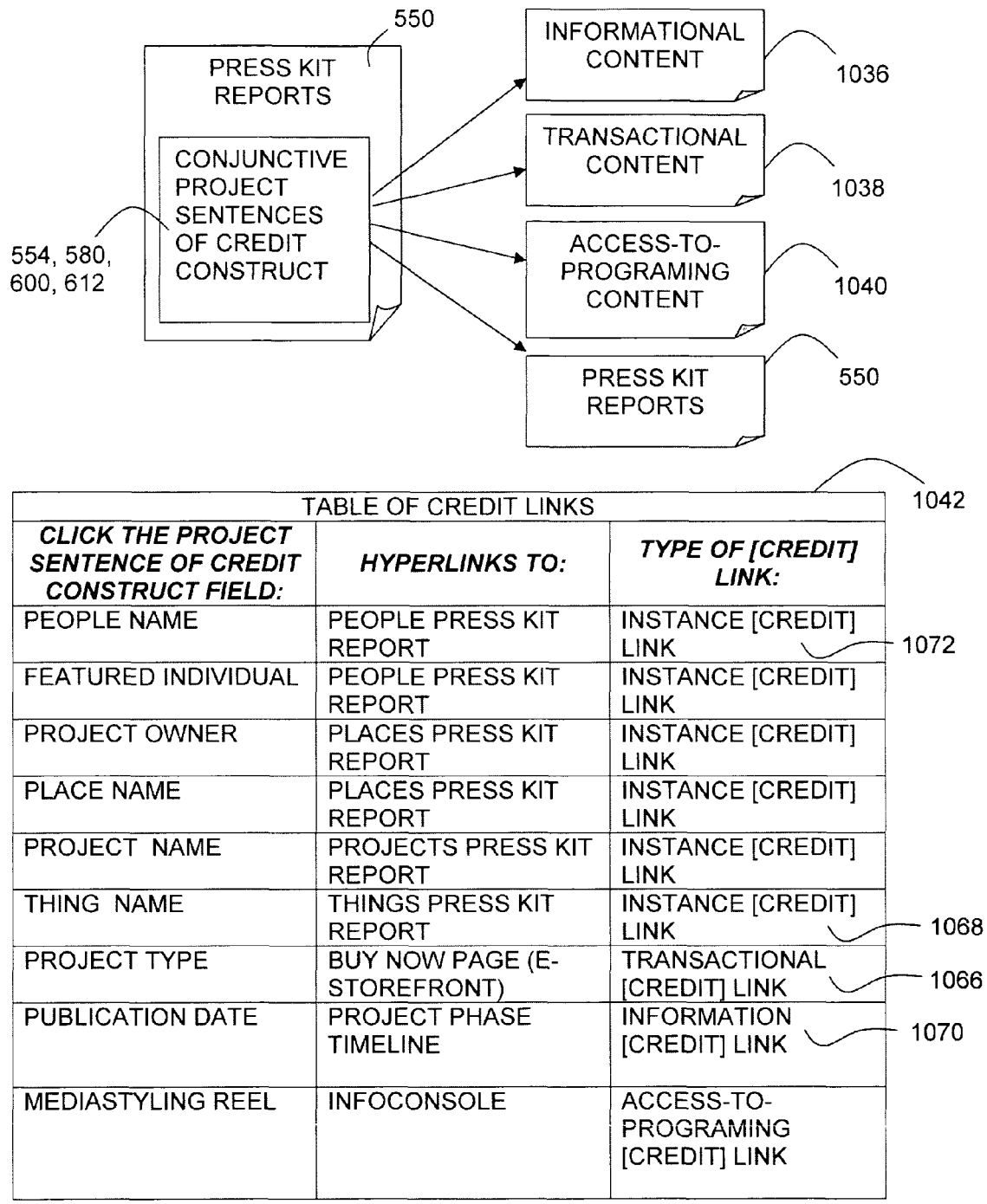
FIG. 23 is a flow chart and table illustrating the reporting of Press Kit Reports, Transactional Content, Access-to-Programming Content, and Informational Content via [Credit] Links within Conjunctive Project Sentences of Credit Constructs according to the above preferred embodiment of the present invention.

Regarding the Rules for the Table of Credit Links 1042, as shown in FIG. 23, Transactional Content 1038 is defined as relevant data where some type of exchange can occur. Access-to-Programming Content 1040 is defined as relevant audio, visual, and/or multimedia content. Informational Content 1036 is defined as additional relevant information. Minor Changes to the Conjunctive Project Sentence of Credit Construct 551 do not require a need to change the Table of Credit Links 1042 Definitions. Major Changes to the Conjunctive Project Sentence of Credit Construct 551 may require a change in Table of Credit Links 1042 Definitions.

The Human Resource Networking System of the present invention can be used in the Crime system—so called "Crime Links", wherein the People 202 are Criminals, the Places 204 are Crime Scenes, the Projects 216 are Crimes, and the Things 218 include Tools & Weapons.

Although the data to be collected and reported is different, the System itself is still the same. The following chart indicates a plurality of applications of the System of the present invention, including Showlinks 970, First Looks, Peopleads 980, Crime Links, Study Links, and Health Links, and their potential users.

| The System | Application Examples | Intended Users |
|---|---|---|
| Independent Bits** of Information Structured in Relations | Showlinks | Entertainment Professionals, etc. |
| | First Looks | Casting Agents, Actors, etc. |
| | Peopleads | Ent. Students, Employers, etc. |
| | Crime Links | Law Enforcement, etc. |
| | Study Links | Students, Schools, etc. |
| | Health Links | Medical Professionals, etc. |

First Looks: is an application that uses the system for the entertainment industry. Other applications may be developed for differing industries.

Study Links, Crime Links, Medical Links, and Applications for any other industries (Projects 216 are composed of People 202, Places 204, and Things 218) would have different reporting requirements and different information, adjunctly for a different intended user base. Instead of reporting information about entertainment Projects 216 it might report information about crimes, events, etc. The System would still create Associations 176, and overlaps between those four main Elements 201.

The same advantages and disadvantages of the System still apply for each other application:

(1) The information related to an Element 201 can be updated by the input from another Element 201 (e.g. one Element 201 can input data for another Element 201).

(2) The application can perform inference of missing data based on the data available.

(3) Because the information is collected in combinations, it allows searching and reporting in combinations (e.g. give me the left-handed guitar player who has worked at Soundcastle).

(4) Collecting the information from the Projects 216 (or other main information repositories) may be the most cost-effective means of verification.

(5) Information of questionable integrity that slips through the Verification can cause costly problems in fixing. Verification is required because inputted data affects reports belonging to different individuals. After-the-fact corrections may be impractical.

Each intended use, or application, uses business methods that are similar in nature, however of course the actual details of each step and each report must be very different because the applications and the users are different.

The core system is that Projects 216 are composed of People 202, Places 204, and Things 218 in relation to a Point in Time 112. What can be modified is:

1. The definitions and groupings of valid Values (e.g., Role 178, Contributions 180, Group, Solo Artist, Facilities, etc.)

2. The attributes (e.g., Skills and Talents 140, Education 142, Media Category 156, Awards 222, Organizations 146)

As the System is used for different applications for different industries, we would evaluate the information and relationships needed. For example, Crime Links could track the city jails in relationship to the federal jails. Organizations 146 could be CIA, FBI, etc. All of this will be done upon further detail work.

Bits 102 are People 202, Places 204, Projects 216, and Things 218, further defined by their attributes, and joined by Valid Associative Values 116 of Roles 178, Contributions 180, Utilizations 182, in relation to a given Point In Time 112. The System is the back bone of the Showtown 984 Community structure.

The present invention satisfies an industry need for a single source locating and identifying talent tool. Industry professionals will be surprised by this invention's novel approach in solving this long-standing need. By being an interactive method for locating particular types of workforce talents existing for hire in developing industry Projects 216 in entertainment and other human resource industries, the application is applicable for expanding needs existing in the unique Project workforce style of the entertainment industry.

Additionally, the automatically generated industry career reports with their Conjunctive Project Sentences of Credit Construct 551 should also be an industry surprise once discovered. The multimedia report combines the function of a resume with the purpose of a press kit. Additionally, the Press Kit Report 550 generates a novel Conjunctive Project Sentence of Credit Construct 551 that is automatically uplifted with the input of another's professional Data Input 300 of relational Credits 551, another industry first for which we expect to find industry acceptance.

However, the most interesting utility the present invention offers is making available for the entire industry of entertainment the secure mode of private transmissions for negotiations, which is just the tip of the iceberg of the advantages in using our Method's Internet 714 technological capabilities that our invention offers to the entire industry; competitive with the existing networking systems used in the industry.

In order to further illustrate how the present invention can be embodied to function as a web community's entire infrastructure, an example of a member (People 202) of a band is used to illustrate how one can be found by using the Credit Bytes 164 of the Human Resource Networking Locator System of the present invention, but in addition, how the People 202, Places 204, Projects 216, and Things 218 infrastructure enables the System to locate other data via Informational (Credit) Links 1066, such as Press Releases 994 (Showire 976), E-storefront 996 merchandise (Showtrade 978), Research Polls 1000 (ShowChat 982), and the ability to demonstrate one's style of work or products from infomercials whose data is controlled by the People 202, Places 204, Projects 216 and Things 218 infrastructure's Mediawalk InfoConsole 1062 as accessed on the site's Mediawalk 974.

This example should also indicate how all System's Communities' People 202, Places 204, Projects 216 and Things 218 infrastructure is accessed from those site's POV and also demonstrate that the System of the present invention can substitute industry studies for industry Credits 551, and other Project 216 data, as a means to track a particular industry's People 202, as in Peopleads 980 First Break: a directory of recent industry graduates.

To collect the data, the members of a band input their Credits 551 by providing Credit Data 302, as shown in FIGS. 9*a* and 9*b*. The Credit Data 302 may be a resume, it may be published material, or it may be a data collection form specifically tailored to the present invention. Note that custom reports are possible, as not all Data 800 collected here is in conjunction (the People 202, Places 204, and Things 218 Pages). Different Press Kit Report 550 Modules may display information differently, according to present needs and data collection feasibility.

The members of the band input their Credits 551 to form the band credits which are input from the Credit Data 302 referencing the People 202, Places 204, Projects 216, and Things 218, as shown in FIG. 10*a*.

First the band members are associated to the band by a People 202 Association 176. This forms the structure of the band which will be used on the Credits 551 that they worked together.

For each Credit 551, one has to input a Credit 551 Association 176 using said People 202 Association 176, and any of the following (for each Credit 551):

(a) a Projects 216 Association 176 including the Projects 216 and any additional information that is known to complete the Projects 216 Association 176 (Places 204 to Projects 216 and/or Projects 216 to Projects 216);

(b) a Places 204 Association 176 featuring the Facility 204 where the work was done and any additional information that is known to complete the Places 204 Association 176 (Places 204 to Places 204); and (c) a Things 218 Association 176 featuring a Things 218 that was used at the Places 204, and any additional information that is known to complete the Things 218 Association 176 (Things 218 to Things 218 and/or Places 204 to Things 218).

The Projects 216, Places 204 and Things 218 Associations 176 which when input will uplift the Credits 551 in the Places 204, Projects 216, and Things 218 Press Kit Reports 554, 580, 600, 612.

Step 1: Input Credit Bits 102 and Credit Constructs 199

(i) The Relational Information 120 is entered into the People Information Table 104, the Places Information Table 106, the Projects Information Table 108, and the Things Information Table 110, as shown in FIG. 3*a*.

(ii) ID 101 numbers are automatically assigned in the sequence of input for each Information Table 104, 106, 108, 110.

(iii) The Associative Values Table 117 is updated with Associative Values 116.

(iv) The Places ID "104" is a second entry for "103" which will be used as the parent in the Places 204 Association 176.

Elements 201

Places: ID 100 (Name=The Abominable, Kind=Group, Type=Band)

Places: ID 101 (Name=NJRIS Records, Kind=Entertainment Company, Type=Distribution)

Places: ID 102 (Name=Korg, Kind=Manufacturer)

Places: ID 103 (Name=The Abominable Home Studio, Kind=Facility)

Places: ID 104 (Name=The Abominable Home Studio, Kind=Entertainment Company)

People: ID 100 (First=Jeff, Last=Henderson)

People: ID 101 (First=Frank, Last=Wilowski)

People: ID 102 (First=Robert, Last=Wiles)

Projects: ID 100 (Name=The Abominable, Type=Album, Genre=Rock & Roll, Category=Music)

Things: ID 100 (Name=Korg Triton, Model=LE, Type=Keyboard)

Associative Values 116

Places 204 to Projects 216 (Contribution 180)=Perform

Point in Time 112

Point in Time 112=Production

From the assignment of IDs 101 to the Elements 201, it has created Credit Constructs 199 for each Element 201 where the other Elements 201 and the Associative Values 116 in these Credit Constructs 199 contain Null Values.

Step 2: Input Construct to Construct Associations 862
    Step 2A: Input People 202 Association 176
    Using the ID's 101 created in Step 1; input the People 202 Association 176 using the Credit Construct to Construct Association Method 862. ID's 101 are created for the People 202 Association 176 so that they may be used in the Credit 551 Association 176, for delineation in this example we have started with ID 200 instead of ID 100, though starting with ID 100 would work equally as well.
    Where Bold=Value Non Bold=Null Value
    People Association: ID 200

```
ID=100-Role-Places-Contribution-Projects-Utilization-Things
         ↑
    People to Places = Current Member
         ↓
People-Role-ID=100-Contribution-Projects-Utilization-Things
```

People Association: ID 201

```
ID=101-Role-Places-Contribution-Projects-Utilization-Things
         ↑
    People to Places = Current Member
         ↓
People-Role-ID=100-Contribution-Projects-Utilization-Things
```

People Association: ID 202

```
ID=102-Role-Places-Contribution-Projects-Utilization-Things
         ↑
    People to Places = Employee
         ↓
People-Role-ID=100-Contribution-Projects-Utilization-Things
```

These Associations 176 will not be used in the Credit 551 Association 176 because the Data 800 was not collected in relation to the Projects 216 (this report did not require it). Therefore it will create another People 202 Association 176 with only the group, which we will use in the Credit 551 Association 176.
    People Association: ID 203

```
People-Role-ID = 100-Contribution-Projects-Utilization-Things
```

Step 2B: Input Places Association
Bold=Value Non Bold=Null Value
Places Association: ID 200

```
People-Role-ID=104-Contribution-Projects-Utilization-Things
         ↑
    People to Places = Facility Owner
         ↓
People-Role-ID=103-Contribution-Projects-Utilization-Things
```

Step 2C: Input Things Association
Bold=Value Non Bold=Null Value
Things Association: ID 200

```
People-Role-ID=102-Contribution-Projects-Utilization-Things
         ↑
    People to Things = Manufacture
         ↓
People-Role-Places-Contribution-Projects-Utilization-ID=100
```

Step 3: Input a Credit 551 Association 176
    Input the Places Association ID, the Project ID, and the Things Association ID, with a Point in Time 112. Also note the Associative Values 116 within Credit 551 Association 176.

```
ID = 203-Perform-Places-Contribution-100-Used-ID = 200
```

The ID "203" is for the People 202 Association 176, the other ID 100 is for the Projects 216 Association 176, and the ID 200 is for the Things 218 Association 176. Normally one would find the Places 204 Association 176 (containing the Facility) being used; however, this portion was not collected in relation to the Project 216 (in conjunction) so we did not use it here.

As shown in FIG. 9b, to convert the data into the Credit Bytes 164, the Data 800 is collected as Credit Data 302. The Credit Bits 102 (Elements 201, Associative Values 116, and Point In Time 112) are extracted from this Credit Data 302, and input into the Relational Database 100. When it comes time to produce a report, the procedure is followed for extracting the Data 800 (see Report Query Matrix Rules 548) which comes out as the Credit Bytes 164.

The full life cycle of the Data 800 is:
    1. Credit Data 302 (collect)
    2. Credit Bits 102 (input)
    Request what you're asking for and how you want to see it:
    3. Credit Constructs 199/Credit Instances 200 (virtual done by the programming)
    4. Credit Bytes 164 (output done by the programming)
    5. Conjunctive Project Sentences of Credit Construct 551 (report done by the programming)

Regarding how the Projects 216 requester (inquiry) works, an inquiry may locate a band member or the band by their Associations 176 of People 202, Projects 216, Places 204, and/or Things 218 using the Find People Query Screen 504. There are also Query Screens 504 for Find Places, Find Projects, and Find Things.

The Press Kit Report 550 may also be located by navigation through the associative hyperlink in the Conjunctive Project Sentences of Credit Construct 551 on those associated Places, Projects, and/or Things Press Kits 552, 578, 590, 610. For example, the Facility that the band worked at has a Press Kit Report 550. There is a link on the band's Press Kit Report 550 to the Facility, and a link from the Facility to the Band. This helps network the band as they have more hyperlinks with other Press Kit Reports 550.

Regarding Press Kit Links, for Supporting Community Features, the Press Kit Reports 550 may also link to add-on services provided by the other community web sites:
    The SHOWiRE 976 Press Release 994 features the Press Releases 994 controlled by the Press Kit Owner 908.

The Showchat 982 Research Poll 1000 features a research poll conducted by the Press Kit Owner 908

The Showtrade 978 E-storefront 996 features items related to the Press Kit Report 550 being sold by the Press Kit Owner 908

The Mediawalk InfoConsole 1062 plays all multimedia, including separately produced Infomercials for new entertainment releases related to the Press Kit Report 550.

For Conjunctive Project Sentences of Credit Construct 551 hyperlinks, Press Kit Reports 550 through Conjunctive-Project Sentences of Credit Construct 551 are linked there between:

How the system makes Credits 551 for People 202, Places 204, Projects 216, and Things 218

To enable the System making Credits 551 for the People 202, Places 204, Projects 216, and Things 218, as the band has input their Credits 551, they have input a People 202 Association 176, and at least one of the following:

a Places 204 Association 176 a Projects 216 Association 176 a Things 218 Association 176

These Associations 176 are then tied together by the Credit 551 Association 176. The band's Press Kit Report 550 displays the information from those Associations 176. Additionally, the Places, Projects, and Things Press Kits 552, 578, 590, 610 (when active) will also display the new information, from their own respective Point of View POV 850.

Therefore the System is not actually creating Credits 551, but is displaying the inputted Credits 551 in the other reports that are Associated 176 according to their own POV 850 format.

To enable the System making credits from Data 800 not inputted by a band member, by the same Method that the band that inputs their credits may uplift the Credits 551 of another, some other Elements 201 may uplift the band's Credits 551. For example, Credits 551 input by the Facility where the band worked will uplift the band members' Press Kit Reports 550. Also note that the band may not be able to provide all the information to complete a Conjunctive Project Sentence of Credit Construct 551. Any missing information may potentially be completed by the other Elements 201.

According to the preferred embodiment, it does not require the use of an Automated Data Collection and Entry system. Without such a system, however, one would have to input each step individually (i.e., Step 1, Step 2, Step 3, etc). With an automated system, one would only have to input the information from Step 1, and the necessary transactions for Steps 2 and 3 would be completed automatically (i.e., one only has to input the Credit Bits 102 and doesn't have to input the Credit Constructs 199 because they are created automatically according to the structure of the Data Collection and input Form). A data input for dummies requires no knowledge of what the Data Input 300 needs to be to obtain the desired output.

Additionally, the use of an Automated Data Collection and Entry system would contain a built-in method for Validating all Associations 176, which may include displaying expanded information for each Element 201 of an Association 176 for proper identification. In addition, an automatic E-mail notification feature would notify the authorities (see Rings of Authority 390, 400, 402, 404, 406) which will help Validate and Verify the Associative Information 121 in an information system.

Whether or not an Automated Data Collection and Entry system is used, a Credit Certification Service may be used which will perform the Validate Associations 418 process.

The Conjunctive Project Sentences of Credit Construct 554, 580, 600, 612 will be reported according to one of the three CCIV&V Levels 1074, 1076, 1078 of audited reports.

Figure 24A:
FIG. 24a is a diagram illustrating a community search screen with the Robocruiter Search Agent according to the above preferred embodiment of the present invention.
Figure 24B:
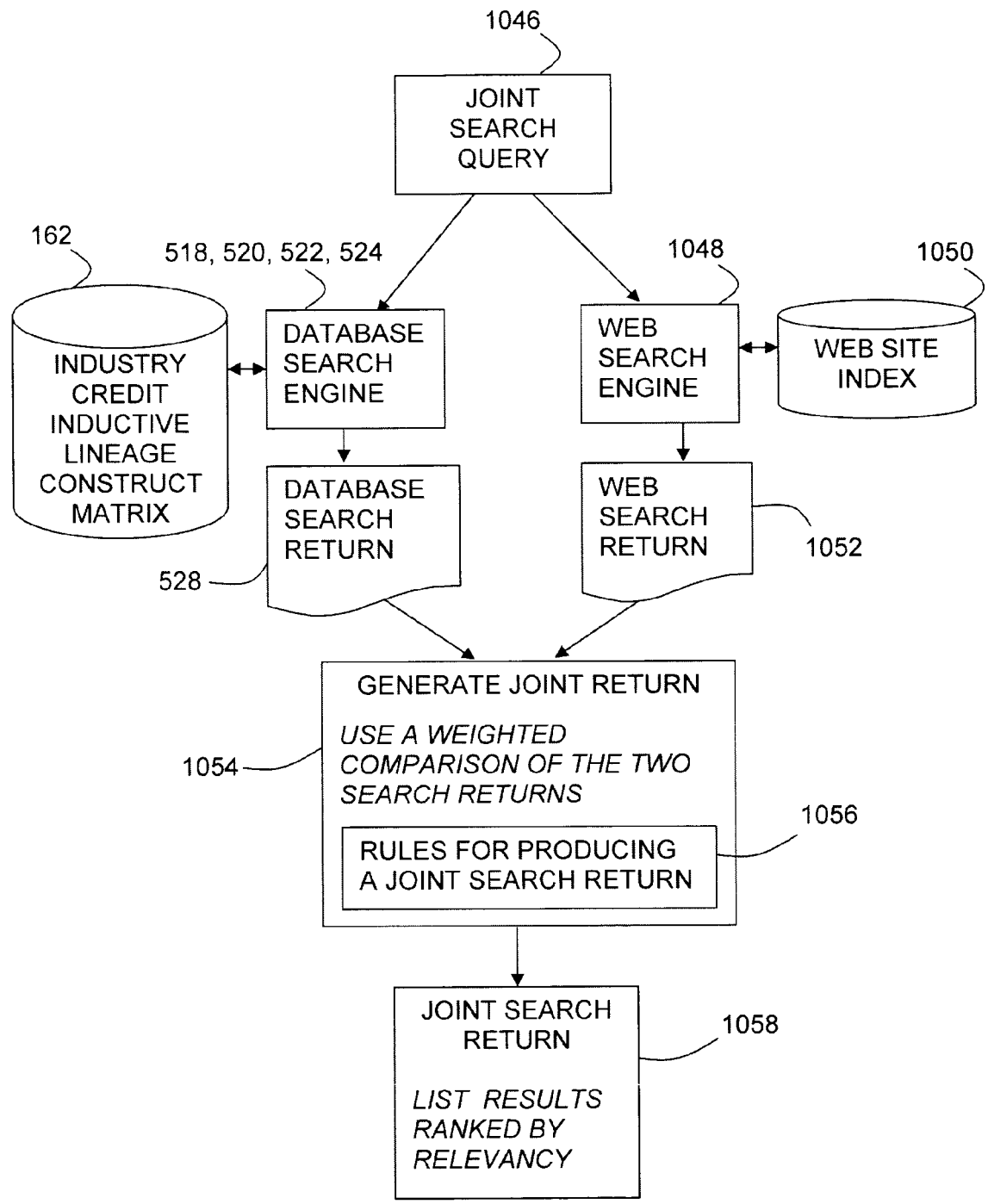
FIG. 24b is a flow chart illustrating the Joint Search performing combined searches via a Database Search Engine and a Web Search Engine in order to produce a Joint Search Return according to the above preferred embodiment of the present invention.
Figure 24C:
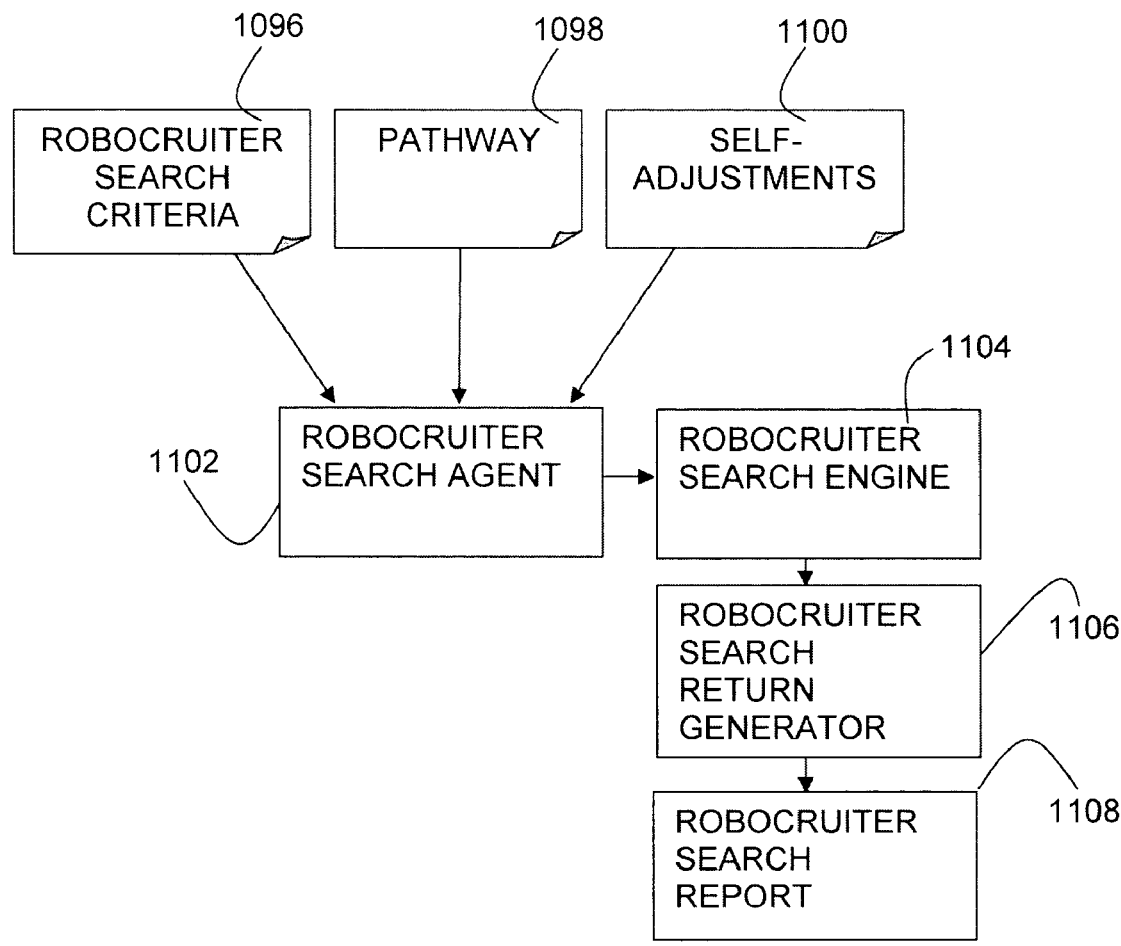
FIG. 24c is a diagram illustrating the reporting of Robocruiter Search Returns via Robocruiter Search Criteria, Robocruiter Pathway, and Robocruiter Self-Adjustments according to the above embodiment of the present invention.

According to the present invention, as shown in FIG. 24c, the Element 201 Searches allow users to locate industry resources by People 202, Places 204, Projects 216, and Things 218. A Robocruiter Search Agent 1102 is a Search Agent designed to be tied to these Element Searches. Robocruiter 1102 links, as well as a Robocruiter 1102 icon, have been placed into the simple search designs demonstrated in our uplifted drawings. The Robocruiter Search Agent 1102 can save a user's Element 201 Robocruiter Search Criteria 1096 implemented while the user is logged off. It will also provide quick access to the saved Search Criteria 1096 while the user is logged on. As shown in FIG. 24c, the Pathway 1098 feature allows the user to select the order in which Search Criteria 1096 is used to perform a search. For example, a user can have the Robocruiter Search Agent 1102 search People 202 criteria, then Projects 216 criteria, then Things 218 criteria, and then Places 204 criteria. The Self-Adjustments 1100 feature allows the user to determine how the Robocruiter Search Report 1108 will be displayed. For example, a user will have the ability to specify a minimum and maximum number of search returns that will appear. Users will receive Robocruiter Search Reports 1108 via email, or the next time they log in.

Figure 22B:
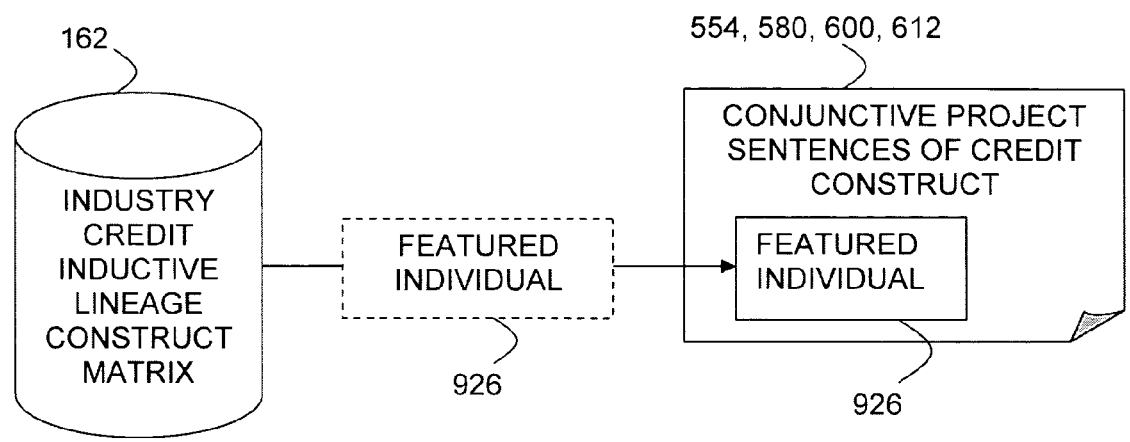
FIG. 22b is a flow chart illustrating the reporting of the Featured Individual within a Conjunctive Project Sentence of Credit Construct according to the above preferred embodiment of the present invention.

Referring to FIG. 22a and FIG. 22b, the Featured Individual 926 may be updated via a Browser Preference Page 1034. The user can select an Associative Value 116 which will appear as the default for said user while browsing a Press Kit Report 550. The Featured Individual 926 is selected according to the Media Category 156 of Project 216 in the Conjunctive Project Sentence of Credit Construct 554, 580, 600, 612.

The Press Kit Owner 908 can change the Featured Individual 926. If the Press Kit Owner 908 does not change the Featured Individual 926, then the Press Kit Report 550 will display the default Featured Individual 926. The default Featured Individual 926 for the Media Category 156 Music 954 is Performing Artist 1110. The default Featured Individual 926 for the Media Category 156 Theater 956 (as shown in FIG. 17f) is Director 1112. The default Featured Individual 926 for the Media Category 156 Radio 958 is Producer 1114 or for Project Type "Commercial" is Ad Agency 1116. The default Featured Individual 926 for the Media Category 156 Movies 960 is Producer 1114. The default Featured Individual 926 for the Media Category 156 Television 962 is Producer 1114 or for Poject Type "Commercial" is Ad Agency 1116. The default Featured Individual 926 for the Media Category 156 Multimedia 964 is Designer 1118. The default Featured Individual 926 for the Media Category 156 "the Web" 966 is Designer 1118.

Figure 22C:
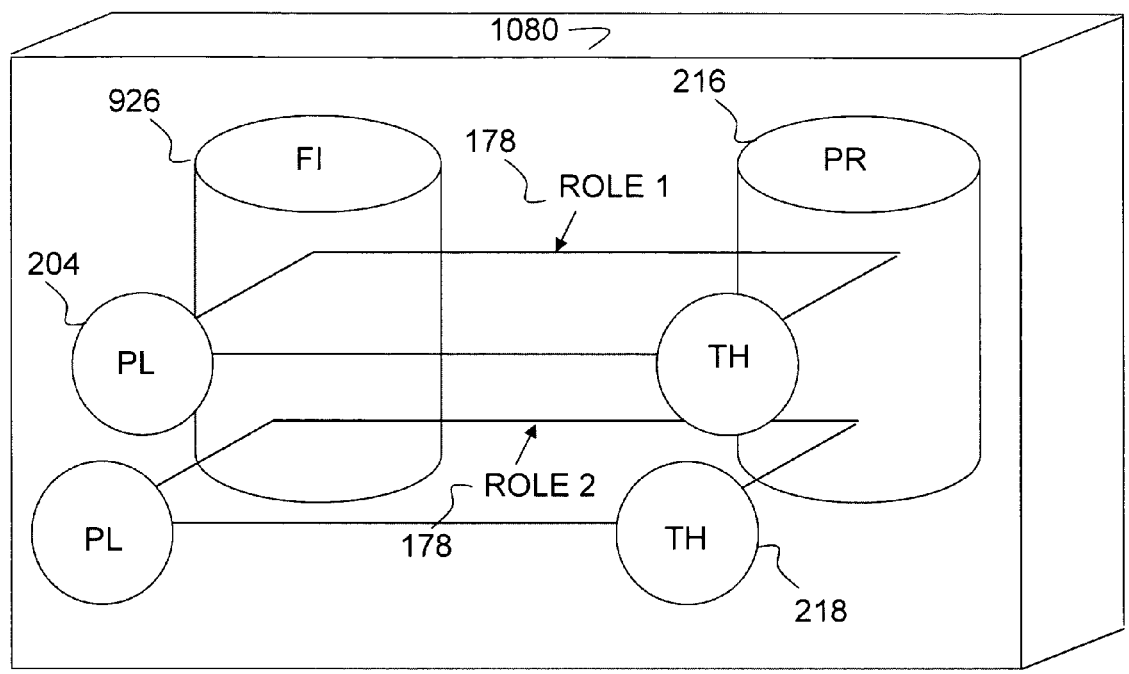
FIG. 22c is a diagram illustrating the Multiple Roles on a Single Project Chart accessed from the Featured Individual within Conjunctive Project Sentences of Credit Construct according to the above preferred embodiment of the present invention.

Referring to FIG. 22c, The Multiple Roles on a Single Projects Chart 1128 displays the Featured Individual 926 performing many instances of a Role 178 on a single Project 216 with associated Places 204 and Things 218.

Figure 22D:
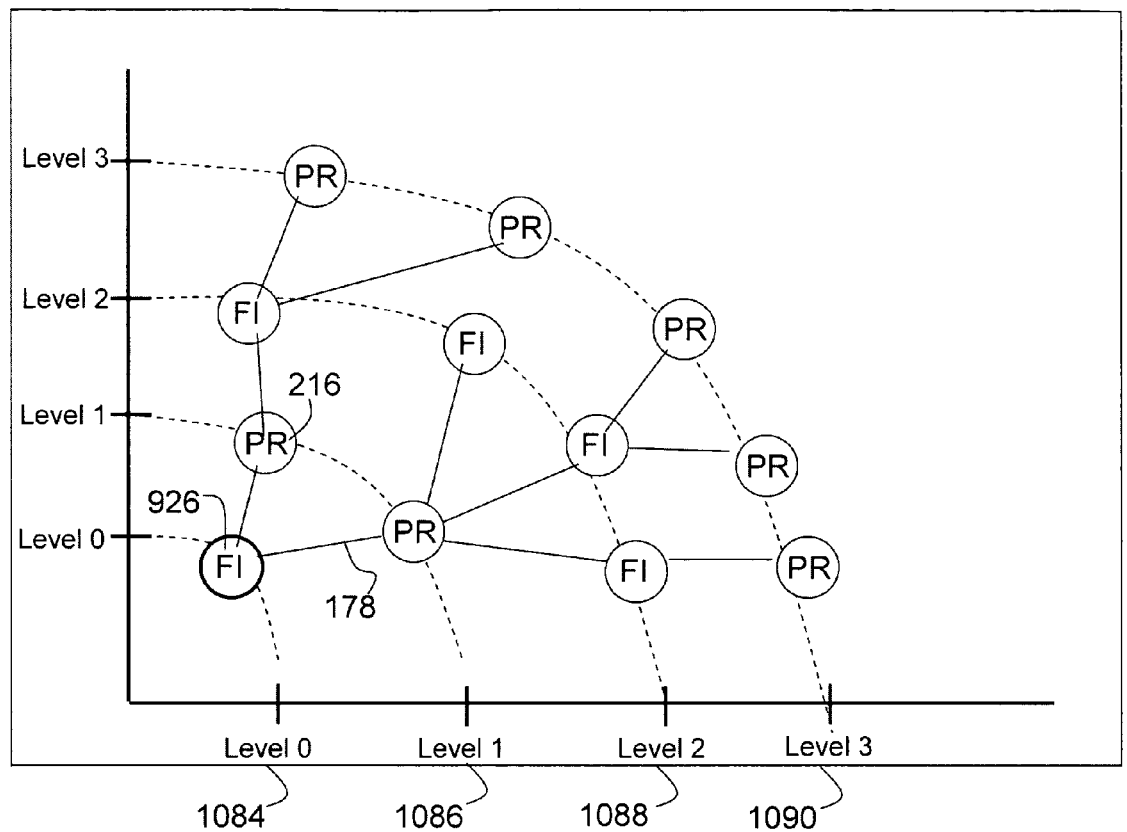
FIG. 22d is a diagram illustrating the Multiple Roles on Various Projects Chart accessed from the Featured Individual within Conjunctive Project Sentences of Credit Construct according to the above preferred embodiment of the present invention.

Referring to FIG. 22d, The Multiple Roles on Various Projects Chart 1130 will appear when a Featured Individual 926 has multiple Roles 178 on multiple Projects 216. At Level 0 1132, the Featured Individual 926 is displayed along with his Role 178 on other Projects 216 at Level 1 1134. Level 2 1136 displays the Featured Individuals 926 for the Projects 216 at Level 1 1134 and their Roles 178 on Projects 216 at Level 3 1138.

Figure 22E:
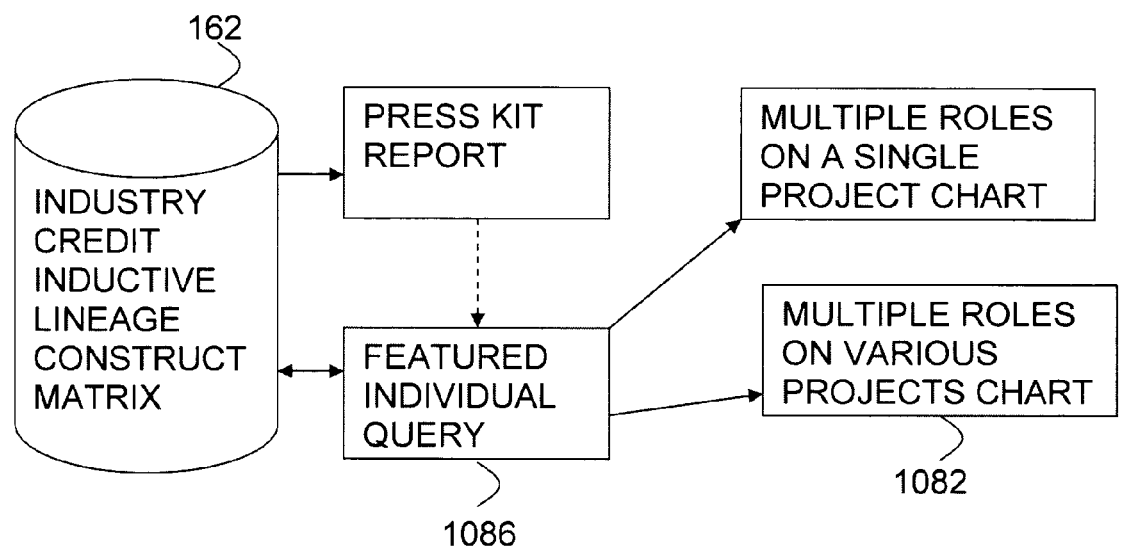
FIG. 22e is a flow chart illustrating the reporting of the Multiple Roles on a Single Project Chart and the Multiple Roles on Various Projects Chart via Featured Individuals according to the above preferred embodiment of the present invention.

Referring to FIG. 22e, The Featured Individual Query 1086 is triggered from the Press Kit Reports 550 to display the Multiple Roles on a Single Project Chart 1128 and/or the Multiple Roles on Various Projects Chart 1130 which are derived from Data 800 in the Industry Credit Inductive Lineage Construct Matrix 162.

Referring to FIG. 23, The Press Kit Report 550 contains the Conjunctive Project Sentences of Credit Construct 554, 580, 600, 612 that link to Informational Content 1036, Transactional Content 1038, Access-to-Programming Content 1040, and Press Kit Reports 550, according to the Table of Credit Links 1042. The Table of Credit Links 1042 defines said Conjunctive Project Sentences of Credit Construct 554, 580, 600, 612 links as Informational [Credit] Links 1066 to Informational Content 1036, Transactional [Credit] Links 1068 to Transactional Content 1038, Access-to-Programming [Credit] Links 1070 to Access-to-Programming Content 1040, and Instance [Credit] Links 1072 to Press Kit Reports 550. Transactional Content 1038 is defined as relevant Data 800 where some type of exchange can occur. Access-to-Programming Content 1040 is defined as relevant audio, visual, and/or multimedia content. Informational Content 1036 is defined as additional relevant information.

Referring to FIGS. 23 and 24*a*, a Resource Locating Search Screen 1044 is available to locate Informational Content 1036, Transactional Content 1038, Access-to-Programming Content 1040, and Press Kit Reports 550.

Referring to FIG. 24*b*, a Database Search Engine 518, 520, 522, 524 and a Web Search Engine 1048 can function together in combination to produce a Joint Search Return 1058. The Joint Search Query 1046 is passed to the Database Search Engine 518, 520, 522, 524 and the Web Search Engine 1048 simultaneously. The Database Search Engine 518, 520, 522, 524 Queries 622 the Industry Credit Inductive Lineage Construct Matrix 162 to produce a Database Search Return 528, while the Web Search Engine 1048 queries the Web Site Index 1050 to produce a Web Search Return 1052. The Generate Joint Return 1054 will produce a Joint Search Return 1058 according to the Rules for Producing a Joint Search Return 1056 which defines how to combine the Search Returns 528, 1052. The Joint Search Return 1058 for the Joint Search Query 1046, Powered by Showscape 972, will display links to People 202, Places 204, Projects 216, and Things 218 and web page URL's 154 within the Showtown 984 Community that have a relationship. In this manner, the Database Search Engine 518, 520, 522, 524 is enhanced by integration with the Web Search Engine 1048. The Joint Search Return 1058 will rank results according to how closely they match what the user is looking for. Weighted returns of People 202, Places 204, Projects 216, and Things 218 that have a returned web page URL 154 will have a higher ranking on the Joint Search Return 1058 than those that don't.

Referring to FIG. 24*c*, The Robocruiter Search Agent 1102 utilizes Robocruiter Search Criteria 1096, Pathway 1098, and Self-Adjustments 1100 used by the Robocruiter Search Engine 1104 to produce a Robocruiter Search Report 1108 by a Robocruiter Search Return Generator 1106.

Figure 25A:
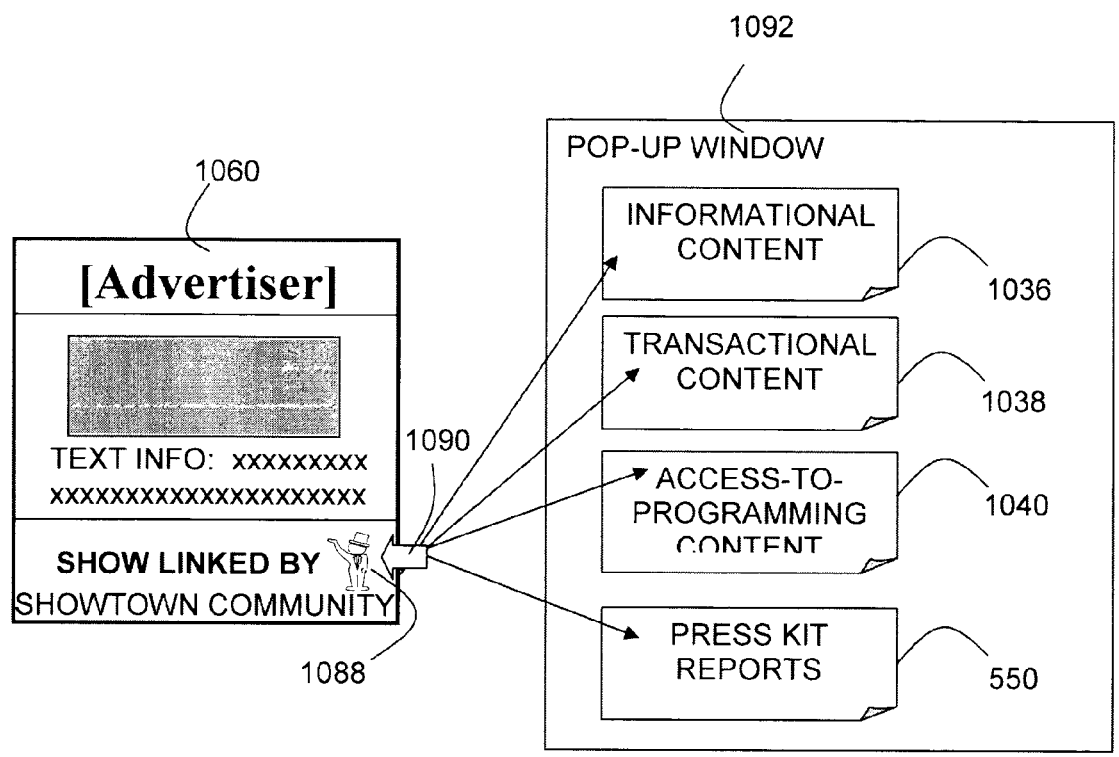
FIG. 25a is a diagram illustrating the reporting of Press Kit Reports, Transactional Content, Access-to-Programming Content, and Informational Content within a Pop-Up Window via an Element Banner Ad according to the above preferred embodiment of the present invention.

Referring to FIG. 25*a*, the Element Banner Ad 1060 contains a Show Link 1088. A Show Link Mouseover 1090 action displays Informational Content 1036, Transactional Content 1038, Access-to-Programming Content 1040, and Press Kit Reports 550 within a Pop-Up Window 1092. The Element Banner Ad 1060 may also contain the customer's name, an image, text information, and a Show Link 1088 of the Mr. Showtown Icon. The customer will determine what People 202, Places 204, Projects 216, or Things 218 content will be accessed when a user rolls over the Show Link 1088.

Figure 25B:
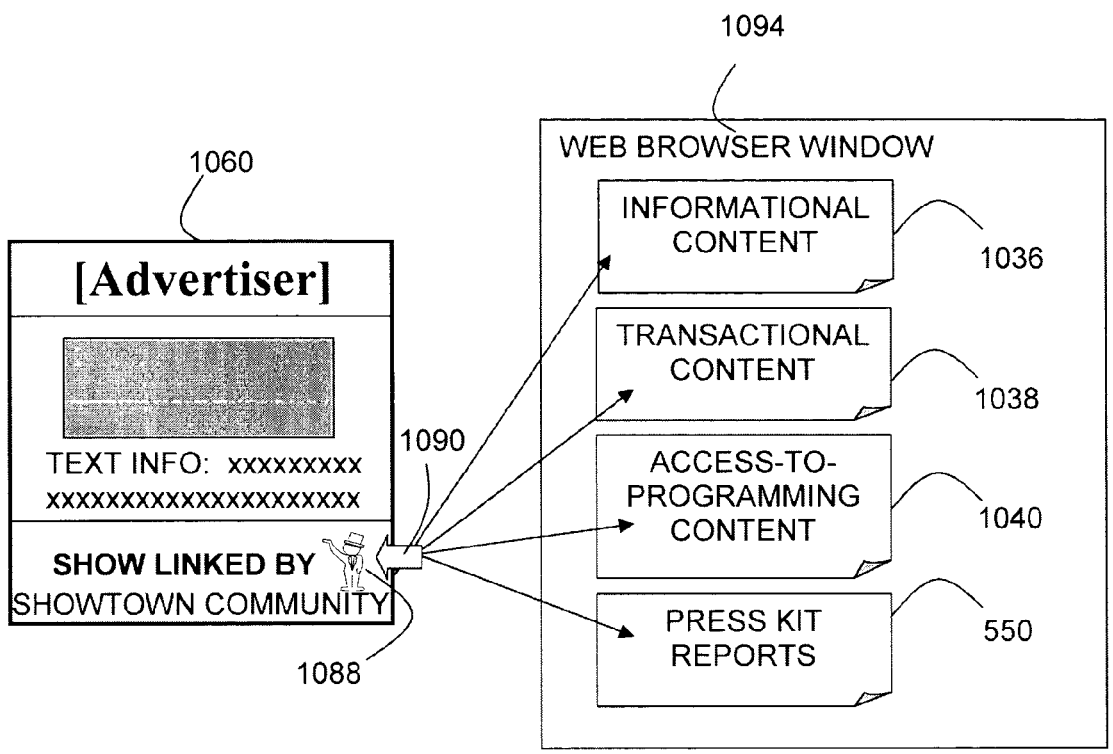
FIG. 25b is a diagram illustrating the reporting of Press Kit Reports, Transactional Content, Access-to-Programming Content, and Informational Content within a Web Browser Window via an Element Banner Ad according to the above preferred embodiment of the present invention.

Referring to FIG. 25*b*, The Element Banner Ad 1060 contains a Show Link 1088. A Show Link Mouseover 1090 will access Informational Content 1036, Transactional Content 1038, Access-to-Programming Content 1040, and Press Kit Reports 550 within a Web Browser Window 1094.

Figure 25C:
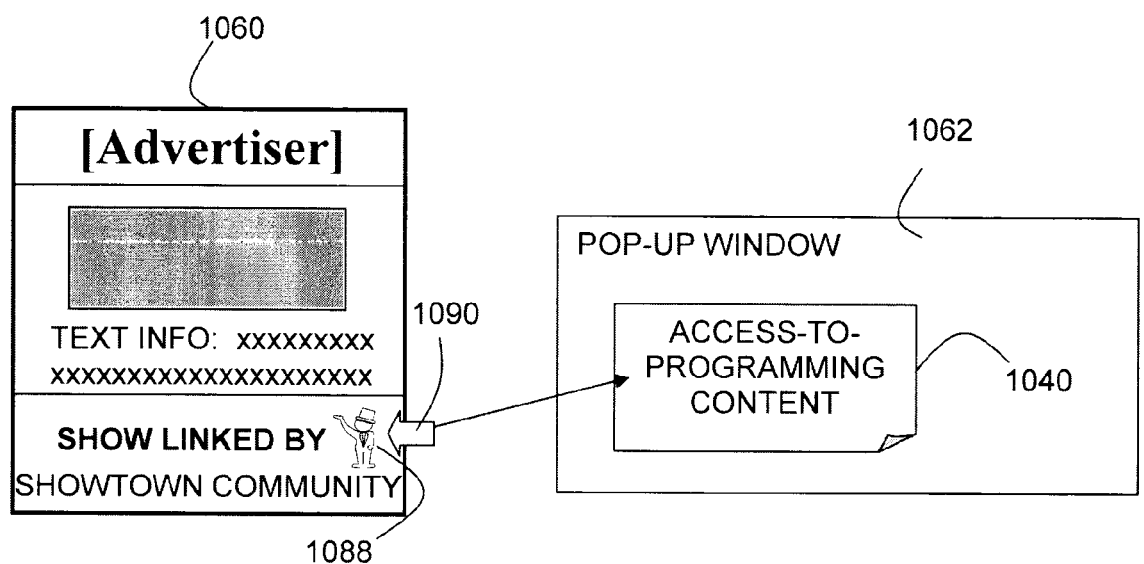
FIG. 25c is a diagram illustrating the reporting of Access-to-Programming Content within the Mediawalk InfoConsole via an Element Banner Ad according to the above preferred embodiment of the present invention.

Referring to FIG. 25*c*, The Element Banner Ad 1060 contains a Show Link 1088. A Show Link Mouseover 1090 will access Access-to-Programming Content 1040 within a Mediawalk InfoConsole 1062.

Figure 26:
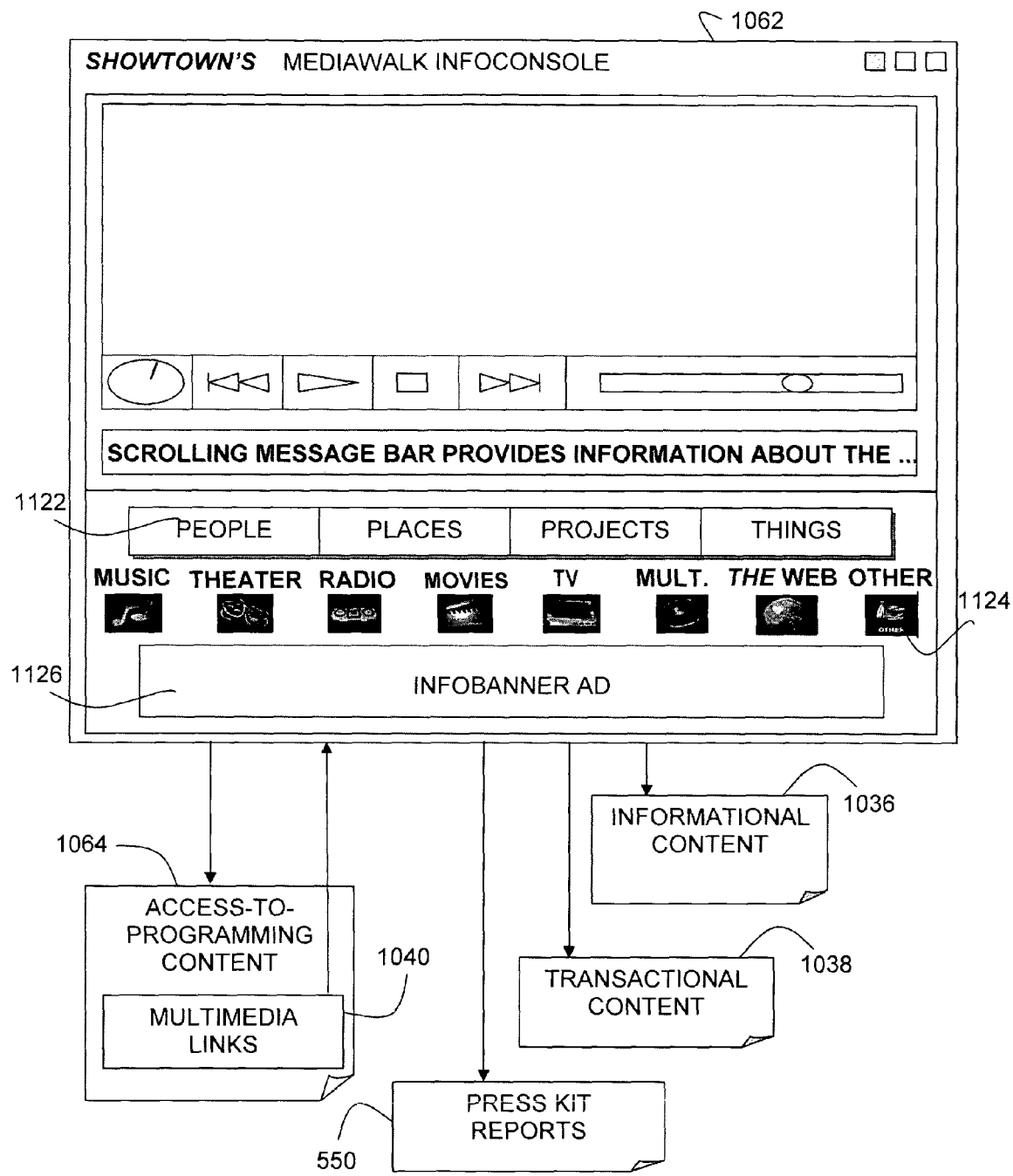
FIG. 26 is a diagram illustrating the reporting of Press Kit Reports, Transactional Content, Access-to-Programming Content, and Informational Content via the Mediawalk Info-Console according to the above preferred embodiment of the present invention.

Referring to FIG. 26, Multimedia Links 1064 on Access-to-Programming Content 1040 will activate a Mediawalk InfoConsole 1062. A Mediawalk InfoConsole 1062 will in turn provide links to Informational Content 1036, Transactional Content 1038, Press Kit Reports 550, as well as Access-to-Programming Content 1040. Said Content may feature People 202, Places 204, Projects 216, and Things 218, which are related to Multimedia Links 1064 via the Industry Credit Inductive Lineage Construct Matrix 162. The Mediawalk InfoConsole 1062 plays all audio, visual, and/or multimedia content (Access-to-Programming Content 1040) within the Showtown 984 Community. The Mediawalk InfoConsole 1062 links relevant Informational Content 1036, Access-to-Programming Content 1040, Transactional Content 1038, and Press Kit Reports 550 through the Element Buttons 1122, Media Category Buttons 1124, and the InfoBanner Ad 1126.

In view of above, the Human Resource Networking System and Method Thereof of the present invention can achieve the following distinctive features:

(1) The Human Resource Networking Method is a novel method establishing a business system for locating, identifying, promoting and assisting in the employing of career project workers in the non-career workforce.

(2) The present invention allows accessibility by any employer and any person of talent anywhere which also includes their business subsidiaries and/or managers located throughout the world.

(3) It is a single industry System for industries of entertainment, the least of which is: Music 954, Theater 956, Movies 960, Radio 958, Television 962, Multimedia 964, the Web 966, and Other 968.

(4) It is a System addressing all industry employment types which include: free lance, independent, contract and employee.

(5) It is a System useful in the entertainment industry for establishing specific skills practiced by People 202 which can be matched with Project 216 developing requirements in the production of Music 954, Theater 956, Movies 960, Radio 958, Television 962, Multimedia 964, the Web 966, and Other 968.

(6) It is a System for all human resource industries with a secure mode of transmission, the least of which is a private e-mail and channel for networking negotiations.

(7) It is a System open to those having union and non-union relationships. The present invention is a tool for all the industry's personnel including those in front of and behind the camera, microphone, stage, cage, phone or desk, in entertainment. With our invention, everyone is related and everyone is located and identified by their industry Credits 551.

(8) It is a System possessing the ability to be operated by professionals with little or no experience. However, for those HR specialists in the head hunting business, this System offers a search system for the advanced, and an ultimate search screen for talent that are computer geeks asking that most complicated of compound questions. This makes it possible to search for industry personnel possessing the most remote of talents from the most remote places.

(9) It is a System open to those having management and to those not having representation. The present invention addresses the industry need for a one-source talent point of contact consisting of addresses, phone numbers with a listing of managers and agents. A listing that can be accessed by the talent enabling said talent to uplift their points of contact when needed.

(10) The present invention provides the industry a System of Press Kit Reports 550, a novel multimedia report which combines the purpose of press kits with the function of a resume. This is automatically linked with other Press Kit Reports 550 for People 202 Places 204, Projects 216 and Things 218, as used in the development of other industry Projects 216 of entertainment.

(11) It provides the industry with automatically generated Conjunctive Project Sentences of Credit Construct 551. These sentences may be automatically uplifted with the implementation of Associated Credits 551 when inputted by another member's Credits 551. The automatically generated Press Kit Reports 550 contains Conjunctive Project Sentences of Credit Construct 551 extracted from the Method's aforementioned Elements 201, which in general report "Who (People 202 type) did What (People 202 function) for Whom (Company owning or producing product project), Where (Places 204), Why (Projects 216) and How (Things 218 used) in relation to When (Point In Time 112)."

(12) The Human Resource Networking System locates, promotes and assists professionals obtain Projects 216 developing world wide work with promotional costs competitively averaging a few dollars a month. This coverage is 24 hours a day, 7 days a week and 52 weeks a year. This price also includes the automatic uplifting of industry Credits 551, which contain the Conjunctive Project Sentence of Credit Construct 551.

(13) It is a System of flexibility that allows future growth for those career minded Project 216 developing personnel that use the Method's core system of People 202, Places 204, Projects 216 and Things 218 to be expanded for future Project 216 workforce managing like when an employer desires to automatically monitor the Projects 216 work cycle productivity of an employee in another state or country connected only by the technologies of the Internet 714.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

The invention claimed is:

1. A Human Resource Networking Method for a system comprising a Relational Database and one or more credit constructs, said method comprising the steps of:

(a) storing People information of at least a person who is involved in one or more projects, Places information of where is each said project taken place, Project information of what nature of each project is classified, and Things information of how is each said project performed, wherein all of said People Information, Places Information, Projects Information, and Things Information are inputted through a communication network by one or more relative people of said person who are involved in said projects other than said person and an employer of said person who is involved in said project;

(b) deriving People Information, Places Information, Projects Information, and Things Information of a person to form People Elements, Places Elements, Projects Elements, and Things Elements which are stored in a Relational Database;

(c) forming one or more Credit Constructs from two or more of said People Elements, said Places Elements, said Projects Elements, and said Things Elements so as to reflect corresponding credentials of a data subject when enquired and requested by an enquirer through said communication; and (d) selectively retrieving said Credit Constructs through said communication network by an enquirer and generating Credit Bytes by combining said Credit Constructs upon a query through said communication network, said credentials of said data subject of said Credit Constructs being accurately and thoroughly evaluated by said enquirer through assessment of said Credit Constructs of said data subject, said Credit Bytes being outputted from said Relational Database and used in Conjunctive Project Sentences of Credit Construct, said enquirer being able to make corresponding decisions regarding said data subject based on said credential shown in said Credit Constructs and said Credit Constructs composed of at least one of said People Information, said Places Information, said Projects Information, and said Things Information selected by said enquirer, so as to discard unnecessary information from said Credit Constructs;

wherein said Relational Database comprises a Relational Information and an Industry Credit Inductive Lineage Construct Matrix for data storage and retrieval, wherein said People Elements, said Places Elements, said Projects Elements, and said Things Elements are stored in said Industry Credit Inductive Lineage Construct Matrix and is selectively retrieved by said enquirer, wherein said Credit Constructs are stored in said Industry Credit Inductive Lineage Construct Matrix of said Relational Database;

wherein said Credit Bytes are outputted from said Industry Credit Inductive Lineage Construct Matrix of said Relational Database and used in a Conjunctive Project Sentence of Credit Construct.

2. The method, as recited in claim 1, wherein said step (b) further comprises a step of assigning an ID to each of said People Elements, said Places Elements, said Projects Elements, and said Things Elements.

3. The method, as recited in claim 1, after the step (c) and before the step (d), further comprising a step of providing Credit Instances each of which is an Association of said Credit Constructs with a Point In Time.

4. The method, as recited in claim 2, after the step (c) and before the step (d), further comprising a step of providing Credit Instances each of which is an Association of said Credit Constructs with a Point In Time.

5. The method, as recited in claim 1, further comprising the steps of:

(e-1) accepting a People Query through a People Credit Query Module;

(e-2) passing Said People Query to a People Search Engine;

(e-3) querying said Relational Database through said People Search Engine; and (e-4) returning one or more People Credit Bytes.

6. The method, as recited in claim 1, further comprising the steps of:

(f-1) accepting a Places Query through a Places Credit Query Module;

(f-2) passing said Places Query to a Places Search Engine;

(f-3) querying said Relational Database through said Places Search Engine; and (f-4) returning one or more Places Credit Bytes.

7. The method, as recited in claim 6, further comprising the steps of:
(g-1) accepting a Projects Query through a Projects Credit Query Module;
(g-2) passing said Projects Query to a Projects Search Engine;
(g-3) querying said Relational Database through said Projects Search Engine; and
(g-4) returning one or more Projects Credit Bytes.

8. The method, as recited in claim 7, further comprising the steps of:
(h-1) accepting a Things Query through a Things Credit Query Module;
(h-2) passing said Things Query to a Things Search Engine;
(h-3) querying said Relational Database through said Things Search Engine; and
(h-4) returning one or more Things Credit Bytes.

9. The method, as recited in claim 8, wherein said People Credit Bytes are associations of People to Places, People to Projects, and People to Things extracted for a People Report, said Places Credit Bytes are associations of Places to People, Places to Projects, and Places to Things extracted for a Places Report, said Projects Credit Bytes are associations of Projects to People, Projects to Places, and Projects to Things extracted for a Projects Report, and said Things Credit Bytes are associations of Things to People, Things to Places, and Things to Projects extracted for a Things Report, in which associations are said People Elements, Places Elements, Projects Elements, and said Things Elements which are joined by Associative Values to specify how two Elements relate to each other.

10. The method, as recited in claim 9, further comprising the steps of:
(i-1) inputting said People Information which is an associative information from People through a People Input Module which is a programmed module;
(i-2) inputting said Places Information which is an associative information from Places through a Places Input Module which is a programmed module;
(i-3) inputting said Projects Information which is an associative information from Projects through a Projects Input Module which is a programmed module; and
(i-4) inputting said Things Information which is an associative information from Things through a Things Input Module which is a programmed module.

11. The method, as recited in claim 10, wherein:
the step (i-1) further comprises a step of editing and updating said Industry Credit Inductive Lineage Construct Matrix with said People Information;
the step (i-2) further comprises a step of editing and updating said Industry Credit Inductive Lineage Construct Matrix with said Places Information;
the step (i-3) further comprises a step of editing and updating said Industry Credit Inductive Lineage Construct Matrix with said Projects Information; and
the step (i-4) further comprises a step of editing and updating said Industry Credit Inductive Lineage Construct Matrix with said Things Information.

12. The method, as recited in claim 11, further comprising the steps of:
(j-1) outputting a Search Return featuring a list of People with hyperlinks to People Press Kits through a People List Module which is a programmed module when said People Press Kits are active;
(j-2) receiving a list of People from said People Search Engine; and
(j-3) formatting said Search Return.

13. The method, as recited in claim 12, further comprising the steps of:
(k-1) outputting said Search Return featuring a list of Places with hyperlinks to Places Press Kits through a Places List Module which is a programmed module when said Places Press Kits are active;
(k-2) receiving a list of Places from said Places Search Engine; and
(k-3) formatting said Search Return.

14. The method, as recited in claim 13, further comprising the steps of:
(l-1) outputting said Search Return featuring a list of Projects with hyperlinks to Projects Press Kits through a Projects List Module which is a programmed module when said Projects Press Kits are active;
(l-2) receiving a list of Projects from said Projects Search Engine; and
(l-3) formatting said Search Return.

15. The method, as recited in claim 14, further comprising the steps of:
(m-1) outputting said Search Return featuring a list of Things with hyperlinks to Things Press Kits through a Things List Module which is a programmed module when said Things Press Kits are active;
(m-2) receiving a list of Things from said Things Search Engine; and
(m-3) formatting said Search Return.

16. The method, as recited in claim 15, further comprising the steps of:
(j-1) outputting a Search Return featuring a list of People with hyperlinks to People Press Kits through a People List Module which is a programmed module when said People Press Kits are active;
(j-2) receiving a list of People from said People Search Engine; and
(j-3) formatting said Search Return.

17. The method, as recited in claim 16, further comprising the steps of:
(k-1) outputting said Search Return featuring a list of Places with hyperlinks to Places Press Kits through a Places List Module which is a programmed module when said Places Press Kits are active;
(k-2) receiving a list of Places from said Places Search Engine; and
(k-3) formatting said Search Return.

18. The method, as recited in claim 17, further comprising the steps of:
(l-1) outputting said Search Return featuring a list of Projects with hyperlinks to Projects Press Kits through a Projects List Module which is a programmed module when said Projects Press Kits are active;
(l-2) receiving a list of Projects from said Projects Search Engine; and
(l-3) formatting said Search Return.

19. The method, as recited in claim 18, before the step (j-1), further comprising a step of generating said People Press Kits in a People Press Kit Generator Module.

20. The method, as recited in claim 19, before the step (k-1), further comprising a step of generating said Places Press Kits in a Places Press Kit Generator Module.

21. The method, as recited in claim 20, before the step (l-1), further comprising a step of generating said Projects Press Kits in a Projects Press Kit Generator Module.

22. The method, as recited in claim 21, before the step (m-1), further comprising a step of generating said Things Press Kits in a Things Press Kit Generator Module.

23. The method, as recited in claim 22, wherein said People Press Kit Generator Module, said Places Press Kit Generator Module, said Projects Press Kit Generator Module, and said Things Press Kit Generator Module, which are used in a Report Writer, create Press Kit Reports in response to Press Kit Requests, using Press Kit Parameters, said Relational Information, and said Industry Credit Inductive Lineage Construct Matrix, wherein said Press Kit Parameters is a table of information that instructs said Press Kit Generator Modules on how to format and what information to display.

24. The method, as recited in claim 23, further comprising the steps of:
(n-1) generating Conjunctive Project Sentences of Credit Construct from a People Point of View (PSOCC-People POV) through said People Press Kit Generator Module;
(n-2) generating Conjunctive Project Sentences of Credit Construct from a Places Point of View (PSOCC-Places POV) through said Places Press Kit Generator Module;
(n-3) generating Conjunctive Project Sentences of Credit Construct from a Projects Point of View (PSOCC-Projects POV) through said Projects Press Kit Generator Module; and
(n-4) generating Conjunctive Project Sentences of Credit Construct from a Things Point of View (PSOCC-Things POV) through said Things Press Kit Generator Module.

25. The method, as recited in claim 24, further comprising a step of: (o) reporting said ConjunctiveProject Sentences of Credit Construct from said People Point of View (PSOCC-People POV), said Conjunctive Project Sentences of Credit Construct from said Places Point of View (PSOCC-Places POV), said Conjunctive Project Sentences of Credit Construct from said Projects Point of View (PSOCC-Projects POV), and said Conjunctive Project Sentences of Credit Construct from said Things Point of View (PSOCC-Things POV) on a Client Computer System.

26. The method, as recited in claim 25, further comprising the steps of:
(p-1) reporting information from said Credit Bytes and from said Relational Information from said People Point of View through said Conjunctive Project Sentences of Credit Construct for People; and
(p-2) displaying in a Credits Module with hyperlinks to said Press Kit Reports of Elements within said Conjunctive Project Sentences of Credit Construct for People.

27. The method, as recited in claim 26, further comprising the steps of:
(q-1) reporting information from said Credit Bytes and from said Relational Information from said Places Point of View through said Conjunctive Project Sentences of Credit Construct for Places; and
(q-2) displaying in said Credits Module with hyperlinks to said Press Kit Reports of Elements within said Conjunctive Project Sentences of Credit Construct for Places.

28. The method, as recited in claim 27, further comprising the steps of:
(r-1) reporting information from said Credit Bytes and from said Relational Information from said Projects Point of View through said Conjunctive Project Sentences of Credit Construct for Projects; and
(r-2) displaying in said Credits Module with hyperlinks to said Press Kit Reports of Elements within said Conjunctive Project Sentences of Credit Construct for Projects.

29. The method, as recited in claim 28, further comprising the steps of:
(s-1) reporting information from said Credit Bytes and from said Relational Information from said Things Point of View through said Conjunctive Project Sentences of Credit Construct for Things; and
(s-2) displaying in said Credits Module with hyperlinks to said Press Kit Reports of Elements within said Conjunctive Project Sentences of Credit Construct for Things.

30. The method, as recited in claim 29, further comprising the steps of:
(t-1) outputting said People Press Kit, containing Conjunctive Project Sentences of Credit Construct from said People Point of View, from said People Press Kit Generator Module in said Report Writer in response to said Press Kit Requests for People;
(t-2) outputting said Places Press Kit, containing Conjunctive Project Sentences of Credit Construct from said Places Point of View, from said Places Press Kit Generator Module in said Report Writer in response to said Press Kit Request and reporting for a given Parent Place;
(t-3) outputting said Projects Press Kit, containing Conjunctive Project Sentences of Credit Construct from said Projects Point of View, from said Projects Press Kit Generator Module in said Report Writer in response to said Press Kit Request for Projects and reports for a given Project; and
(t-4) outputting said Things Press Kit, containing ConjunctiveProject Sentences of Credit Construct from said Things Point of View, from said Things Press Kit Generator Module in said Report Writer in response to a Press Kit Request and reports for Things.

31. The method, as recited in claim 30, further comprising the steps of:
(u-1) associating said People Elements to a member selected from a group consisting of Place, Group and Solo Artist by a People to Places Associative Value, whose Association Validation Rules are delegated to a Place, Group, or Solo Artist Ring of Authority;
(u-2) associating a Child Place and a Peer Place to said Parent Place by a Places to Places Associative Value, whose Association Validation Rules are delegated to a Parent Place Ring of Authority, wherein said Project is associated to People by a People to Projects Associative Value (Role Value);
(u-3) associating said Projects Elements to a Child Place by a Places to Projects Associative Value (Contribution Value);
(u-4) associating said Projects Elements to said Things Elements by a Things to Projects Associative Value (Utilization Value), whose Association Validation Rules are delegated to a Project Owner Ring of Authority;
(u-5) associating said Things Elements to said Places Elements by a Things to Places Associative Value, whose Association Validation Rules are delegated to a Manufacturer Place Ring of Authority; and
(u-6) associating said People Elements to said Things Elements by a People to Things Associative Value, whose Association Validation Rules are delegated to a Project Owner Ring of Authority.

32. The method, as recited in claim 31, further comprising a step of associating Awards to one of said Credit Constructs which is an Association between said People Elements, said Places Elements, said Projects Elements, and said Things Elements joined by Associative Values of People to Projects Associative Value (Role Value), Places to Projects Associative Value (Contribution Value), and Things to Projects Associative Value (Utilization Value).

33. The method, as recited in claim 32, after the step (c) and before the step (d), further comprising a step of providing Credit Instances each of which is an Association of said Credit Construct with a Point In Time and comprises said People Elements, said Places Elements, said Projects Elements, and said Things Elements associated by different Associative Values including a People to Projects Associative Value (Role Value), a Places to Projects Associative Value (Contribution Value), and a Things to Projects Associative Value (Utilization Value) in relation to a Point In Time.

34. The method, as recited in claim 33, wherein Credit Instance to Credit Instance associations include a People to Places Associative Value, a People to Things Associative Value, and a Places to Things Associative Value, and that Lineage Associations, achieved through said Credit Instance to Credit Instance associations, comprises a Places to Places Associative Value, a Things to Things Associative Value, a Projects to Projects Associative Value, and a People to People Associative Value.

35. The method, as recited in claim 34, wherein said People Elements, said Places Elements, said Projects Elements, and said Things Elements are associated to achieve different Associative Values which are Database fields that describe said association between two of said People Elements, Places Elements, Projects Elements, and said Things Element.

36. The method, as recited in claim 35, wherein said Associative Values include a People to Projects Associative Value (Role Value) which joins said People Elements to said Projects Elements, wherein said Role Value is what People did on Projects and is used in said association of said People Elements to said Projects Elements within said Credit Construct.

37. The method, as recited in claim 35, wherein said Associative Values include a Places to Projects Associative Value (Contribution Value) which joins said Places Elements to said Projects Elements, wherein said Contribution Value is what Places did on Projects and is used in said association of said Places Elements to said Projects Elements within said Credit Constructs.

38. The method, as recited in claim 35, wherein said Associative Values include a Things to Projects Associative Value (Utilization Value) which joins said Things Elements to said Projects Elements, wherein said Utilization Value is used in said association of said Things Elements to said Projects Elements within said Credit Constructs.

39. The method, as recited in claim 35, wherein said Associative Values include a People to Places Associative Value which joins said People Elements to said Places Elements and uses a fixed list of Values selecting from a group consisting of "employ", "perform", "represent", "member," and "freelance", wherein said People to Places Associative Value is used in said association of said People Elements to said Places Elements between said Credit Constructs.

40. The method, as recited in claim 35, wherein said Associative Values include a People to Things Associative Value which joins said People Elements to said Things Elements and jues a fixed list of Values including "used", wherein said People to Things Associative Value is used in said association of said People Elements to said Things Elements between said Credit Constructs.

41. The method, as recited in claim 35, wherein said Associative Values include a Places to Things Associative Value which joins said Places Elements to said Things Elements and uses a Value selecting from a group consisting of "manufacture", "design", "create", "distribute", "sell", "rent" and "provide", wherein said Places to Things Associative Value is used in said association of said Places Elements to said Things Elements between said Credit Constructs.

42. The method, as recited in claim 35, wherein said Associative Values include a Places to Places Associative Value (Structure Value) which joins said Places Elements to said Places Elements and uses a Value selected from a group consisting of "facility", "subsidiary", "division", and "partner", wherein said Structure Value is used in said association of said Places Elements to said Places Elements between said Credit Constructs.

43. The method, as recited in claim 35, wherein said Associative Values include a Things to Things Associative Value (Integration Value) which joins said Things Elements to said Things Element, wherein said Integration Value uses Values including "component" and is used in said association of said Things Elements to said Things Elements between said Credit Constructs.

44. The method, as recited in claim 35, wherein said Associative Values include a Projects to Projects Associative Value (Usage Value) which joins said Projects Elements to said Projects Elements, wherein said Usage Value uses Values including "component" and is used in said association of said Projects Elements to said Projects Elements between said Credit Constructs.

45. The method, as recited in claim 35, wherein said Associative Values include a People to People Associative Value (Organization Value) joins said People Elements to said People Elements, wherein said Organization Value uses Values including "colleague" and is used in said association of said People Elements to said People Elements between said Credit Instances.

46. The method, as recited in claim 35, wherein said Relational Information comprises a People Information Table, a Places Information Table, a Projects Information Table, and a Things Information Table which are related to said Credit Construct via a One to Many Relationship which is used in said Industry Credit Inductive Lineage Construct Matrix.

47. The method, as recited in claim 46, wherein said People to People Associative Value, said Places to Places Associative Value, said Projects to Projects Associative Value, and said Things to Things Associative Value have a One to One Relationship used in said Industry Credit Inductive Lineage Construct Matrix with said Credit Constructs.

48. The method, as recited in claim 46, wherein said People Information Table, Places Information Table, said Projects Information Table, and said Things Information Table are linked to said People Relational Information Table, said Places Relational Information Table, said Projects Relational Information Table, and said Things Relational Information Table, respectively.

49. The method, as recited in claim 48, wherein said Credit Constructs are related to said Credit Instances by said One to Many Relationship and said Point in Time within said Credit Instances comes from said Point in Time Table which is a Table that stores said Points In Time, and phase start and end times.

50. The method, as recited in claim 49, wherein said People Information Table, said Places Information Table, said Things Information Table, and said Projects Information Table are associated to an Awards, and said People Elements, Places Elements, Projects Elements, and said Things Elements are used in said Industry Credit Inductive Lineage Construct Matrix, joined by said Associative Values.

51. The method, as recited in claim 50, wherein input goes to an Input Audit Process which tracks all changes to said Relational Databases, wherein said Input Audit Process is a process for recording input and maintenance actions by an input and maintenance process, wherein an Audit Table is used by said Input Audit Process to hold information that tracks said input and maintenance actions that have occurred throughout a life of said system.

52. The method, as recited in claim 31, further comprising the steps of:
(v-1) transforming said Credit Instances into Conjunctive Project Sentences of Credit Construct from, a People Point of View, Conjunctive Project Sentences of Credit Construct from a Places Point of View, Conjunctive Project Sentences of Credit Construct from a Projects Point of View, and Conjunctive Project Sentences of Credit Construct from a Things Point of View from said Credit Bytes; and
(v-2) generating a Search Return and at least a Press Kit Report.

53. The method, as recited in claim 31, further comprising the steps of:
(w-1) entering search criteria for said People Elements, said Places Elements, said Projects Elements, and said Things Elements;
(w-2) passing a Singular Search Argument, Multiple Search Arguments, and Conjunctive Search Arguments into said People Search Engine, said Places Search Engine, said Projects Search Engine, and said Things Search Engine; and
(w-3) querying said Industry Credit Inductive Lineage Construct Matrix according to Construct Drill-Down Rules through said People, Places, Projects and Things Search Engines and resulting in a Search Return.

54. The method, as recited in claim 53, further comprising the steps of:
(x-1) passing People Inquiries, Places Inquiries, Projects Inquiries, and Things Inquiries into a Press Kit Generator;
(x-2) querying said Industry Credit Inductive Lineage Construct Matrix according to said Construct Combination Rules; and
(x-3) creating said Conjunctive Project Sentences of Credit Construct from said People Point of View, said Conjunctive Project Sentences of Credit Construct from said Places Point of View, said Conjunctive Project Sentences of Credit Construct from said Projects Point of View, and said Conjunctive Project Sentences of Credit Construct from said Things Point of View in said Press Kit Reports.

55. The method, as recited in claim 54, further comprising the steps of:
(y-1) reporting said Relational Information through each of said Press Kit Reports said Relational Information; and
(y-2) formatting each of said Press Kit Reports according to said Press Kit Parameters which is maintained by said Maintain Press Kit Parameters process according to user preferences.

56. The method, as recited in claim 55, wherein said Conjunctive Project Sentences of Credit Construct is from said People Point of View, said Conjunctive Project Sentences of Credit Construct is from said Places Point of View, said Conjunctive Project Sentences of Credit Construct is from said Projects Point of View, and said Conjunctive Project Sentences of Credit Construct from said Things Point of View, report Who Did What for Whom, Where, Why, and How in relation to When, regardless of whether appearing on one of said People, Places, Projects, and Things Press Kits Reports.

57. The method, as recited in claim 56, wherein said People Press Kit contains a Featured Credits Module containing said Conjunctive Project Sentences of Credit Construct from said People Point of View which Project Publication Date links to a People view of a Project Phase Timeline Report.

58. The method, as recited in claim 57, wherein said Places Press Kit contains a Places People Credit Module, a Places Places Credit Module, a Places Projects Credit Module, and a Places Things Module containing said Conjunctive Project Sentences of Credit Construct from said Places Point of View which Project Publication Date links to a Places view of the Projects Phase Timeline, wherein said Places People Credit Module displays said Conjunctive Project Sentences of Credit Construct containing said People Elements in said Places Press Kit and is used in said Places Press Kit to show Credits thereof and to hyperlink to said respective People Press Kit, wherein said Places Places Credit Module displays said Conjunctive Project Sentences of Credit Construct containing said Places Elements in said Places Press Kit and is used in said Places Press Kit to show said Credits thereof and to hyperlink to said respective said Places Press Kit, wherein said Places Projects Credit Module displays said Conjunctive Project Sentences of Credit Construct containing said Projects Elements in said Places Press Kit and is used in said Places Press Kit to show said Credits thereof and to hyperlink to said respective Projects Press Kit, wherein said Places Things Credit Module displays said Conjunctive Project Sentences of Credit Construct containing said Things Elements in said Places Press Kit and is used in said Places Press Kit to show said Credits thereof and to hyperlink to said respective Things Press Kit.

59. The method, as recited in claim 58, wherein said Projects Press Kit contains a Projects People Credit Module, a Projects Places Credit Module, a Projects Things Credit Module, and a Projects Projects Credit Module containing said Conjunctive Project Sentences of Credit Construct from said Places Point of View which Project Publication Date links to a Projects view of the Projects Phase Timeline, wherein said Project People Credit Module displays said ConjunctiveProject Sentences of Credit Construct containing said People Elements in said Projects Press Kit and is used in said Projects Press Kit to show Credits thereof and to hyperlink to said respective Press Kit for People, wherein said Projects Places Credit Module displays said Conjunctive Project Sentences of Credit Construct containing said Places Elements in said Projects Press Kit and is used in said Projects Press Kit to show said Credits thereof and to hyperlink to said respective Places Press Kit, wherein said Projects Things Credit Module displays said Conjunctive Project Sentences of Credit Construct containing said Things Elements in said Projects Press Kit and is used in said Projects Press Kit to show said Credits thereof and to hyperlink to said respective Things Press Kit, wherein said Projects Projects Credit Module displays said Conjunctive Project Sentences of Credit Construct containing said Projects Elements in said Projects Press Kit and is used in said Products Press Kit to show said Credits thereof and to hyperlink to said respective Projects Press Kit.

60. The method, as recited in claim 59, wherein Things Press Kit contains a Things People Credit Module, a Things Places Credit Module, a Things Projects Credit Module, and a Things Things Credit Module containing said Conjunctive Project Sentences of Credit Construct from said Things Point of View which Project Publication Date links to a Things view of the Projects Phase Timeline, wherein said Things People Credit Module displays said Conjunctive Project Sentences of Credit Construct containing said People Elements in said Things Press Kit and is used in said Things Press Kit to show Credits thereof and to hyperlink to said respective People Press Kit, wherein said Things Places Credit Module displays said Conjunctive Project Sentences of Credit Construct containing said Places Elements in said Things Press Kit and is used in said Things Press Kit to show said Credits thereof and to hyperlink to said respective Places Press Kit, wherein said Things Projects Credit Module displays Conjunctive Project Sentences of Credit Construct containing said Projects Elements in said Things Press Kit and is used in said Things Press Kit to show said Credits thereof and to hyperlink to said respective Projects Press Kit, wherein said Things Things Credit Module displays said Conjunctive Project Sentences of Credit Construct containing said Things Elements in said Things Press Kit and is used in said Things Press Kit to show said Credits thereof and to hyperlink to said respective Things Press Kit.

61. The method, as recited in claim 60, wherein said People Press Kit comprises a Header Module, a Profile or Highlights Module, a Skills & Talents Module, a MediaStyling Module, an Affiliations Module, an Education Module, and an Additional Contacts Module containing a World Address, wherein said modules are derived from said Relational Information, wherein said Header Module is a module featuring said Relational Information, wherein said Press Kit Generator retrieves a Header Information from said Relational Information and reports said Header Information therein, wherein said Profile or Highlights Module is a module featuring said Relational Information including Profile or Highlights, wherein said Press Kit Generator retrieves a Profile or Highlights Information from said Relational Information and reports said Profile or Highlights Information therein, wherein said Skills & Talents Module is a Module featuring said Relational Information including a Skills Relational Information, wherein said Press Kit Generator retrieves said Skills Relational Information from said Relational Information and reports said Skills Information therein, wherein said MediaStyling Module is a module featuring said Relational Information including a MediaStyling Relational Information, wherein said Press Kit Generator retrieves said MediaStyling Relational Information from said Relational Information and reports said MediaStyling Relational Information therein, wherein said Affiliations Module is a module featuring said Relational Information including an Affiliations Relational Information, wherein said Press Kit Generator retrieves said Affiliations Relational Information from said Relational Information and reports said Affiliations Relational Information therein, wherein said Education Module is a module featuring said Relational Information including an Education Relational Information, wherein said Press Kit Generator retrieves said Education Relational Information from said Relational Information and reports said Education Relational Information therein, wherein said Additional Contacts Module is a Module featuring said Relational Information including an Additional Contacts Information, wherein said Press Kit Generator retrieves said Additional Contacts Information from said Relational Information and reports said Additional Contacts Information therein.

62. The method, as recited in claim 61, wherein said Featured Credits Module contains said Conjunctive Project Sentences of Credit Construct from said People Point of View, wherein said Conjunctive Project Sentences of Credit Construct from said People Point of View is selectively being included or excluded from display according to said People Elements, said Places Elements, said Projects Elements, said Things Elements.

63. The method, as recited in claim 62, further comprising a step of blocking unwanted Conjunctive Project Sentences of Credit Construct is from said People Point of View, Conjunctive Project Sentences of Credit Construct is from said Places Point of View, Conjunctive Project Sentences of Credit Construct is from said Projects Point of View, and Conjunctive Project Sentences of Credit Construct is from said Things Point of View from displaying in said respective People Press Kit Report, Places Press Kit Report, Projects Press Kit Report, and Things Press Kit Report.

64. The method, as recited in claim 63, further comprising the step of:
   (z-1) listing Awards from an Awards Module in said People Press Kit, said Places Press Kit, said Projects Press Kit, and said Things Press Kit; and
   (z-2) associating said Awards to said People Elements, said Places Elements, said Projects Elements, and said Things Elements.

65. The method, as recited in claim 64, further comprising the steps of:
   (i) listing said Awards from a Related Awards Module;
   (ii) associating said Awards to said People Elements, said Places Elements, said Projects Elements, and said Things Elements by an Overlapping Credit Construct, including said People Elements, said Places Elements, said Projects Elements, and said Things Element, that is pointed to by said Awards to a Recipient Associative Value as a Recipient.

66. The method, as recited in claim 1, further comprising a Credit Construct Independent Identification, Validation, and Verification (CCIV&V) process for auditing inputting Credit Data, wherein said CCIV&V process includes the steps of: sending said inputting Credit Data to a Data Input Process, and classifying said inputting Credit Data as CCIV&V Level-1 Compilation.

67. The method, as recited in claim 1, further comprising a Credit Construct Independent Identification, Validation, and Verification (CCIV&V) process for auditing inputting Credit Data, wherein said CCIV&V process includes the steps of:
   sending said inputting Credit Data to a Data Input Process,
   reviewing and validating said inputting Credit Data by a Press Kit Owner Process, and
   classifying said reviewed and validated inputting Credit Data as CCIV&V's Level-2 Reviewed.

68. The method, as recited in claim 67, wherein said CCIV&V process further comprises the steps of:
   sending said inputting Credit Data to said Data Input Process,
   reviewing and validating said inputting Credit Data by a Press Kit Owner Process, and
   classifying said reviewed and validated inputting Credit Data as CCIV&V's Level-2 Reviewed.

69. The method, as recited in claim 1, further comprising a Credit Construct Independent Identification, Validation, and Verification (CCIV&V) process for auditing inputting Credit Data, wherein said CCIV&V process includes the steps of:
   sending said inputting Credit Data to a Data Input Process,
   reviewing and validating said inputting Credit Data by a Press Kit Owner Process,
   verifying and certifying said reviewed and validated inputting Credit Data by a Third Party Process, and
   classifying said verified and certified inputting Credit Data as CCIV&V's Level-3 Certified.

70. The method, as recited in claim 66, further comprising a Credit Construct Independent Identification, Validation, and Verification (CCIV&V) process for auditing inputting Credit Data, wherein said CCIV&V process includes the steps of:
sending said inputting Credit Data to said Data Input Process, reviewing and validating said inputting Credit Data by said Press Kit Owner Process,
verifying and certifying said reviewed and validated inputting Credit Data by a Third Party Process, and
classifying said verified and certified inputting Credit Data as CCIV&V's Level-3 Certified.

71. The method, as recited in claim 67, further comprising a Credit Construct Independent Identification, Validation, and Verification (CCIV&V) process for auditing inputting Credit Data, wherein said CCIV&V process includes the steps of:
sending said inputting Credit Data to said Data Input Process, reviewing and validating said inputting Credit Data by said Press Kit Owner Process,
verifying and certifying said reviewed and validated inputting Credit Data by a Third Party Process, and
classifying said verified and certified inputting Credit Data as CCIV&V's Level-3 Certified.

72. The method, as recited in claim 68, further comprising a Credit Construct Independent Identification, Validation, and Verification (CCIV&V) process for auditing inputting Credit Data, wherein said CCIV&V process includes the steps of:
sending said inputting Credit Data to said Data Input Process, reviewing and validating said inputting Credit Data by said Press Kit Owner Process,
verifying and certifying said reviewed and validated inputting Credit Data by a Third Party Process, and
classifying said verified and certified inputting Credit Data as CCIV&V's Level-3 Certified.

73. The method, as recited in claim 30, further comprising a Credit Construct Independent Identification, Validation, and Verification (CCIV&V) process for auditing inputting Credit Data, wherein said CCIV&V process includes the steps of: sending said inputting Credit Data to a Data Input Process, and classifying said inputting Credit Data as CCIV&V Level-1 Compilation.

74. The method, as recited in claim 30, further comprising a Credit Construct Independent Identification, Validation, and Verification (CCIV&V) process for auditing inputting Credit Data, wherein said CCIV&V process includes the steps of:
sending said inputting Credit Data to a Data Input Process,
reviewing and validating said inputting Credit Data by a Press Kit Owner Process, and
classifying said reviewed and validated inputting Credit Data as CCIV&V's Level-2 Reviewed.

75. The method, as recited in claim 74, wherein said CCIV&V process further comprises the steps of:
sending said inputting Credit Data to said Data Input Process,
reviewing and validating said inputting Credit Data by a Press Kit Owner Process, and
classifying said reviewed and validated inputting Credit Data as CCIV&V's Level-2 Reviewed.

76. The method, as recited in claim 30, further comprising a Credit Construct Independent Identification, Validation, and Verification (CCIV&V) process for auditing inputting Credit Data, wherein said CCIV&V process includes the steps of:
sending said inputting Credit Data to a Data Input Process,
reviewing and validating said inputting Credit Data by a Press Kit Owner Process,
verifying and certifying said reviewed and validated inputting Credit Data by a Third Party Process, and
classifying said verified and certified inputting Credit Data as CCIV&V's Level-3 Certified.

77. The method, as recited in claim 73, further comprising a Credit Construct Independent Identification, Validation, and Verification (CCIV&V) process for auditing inputting Credit Data, wherein said CCIV&V process includes the steps of:
sending said inputting Credit Data to said Data Input Process, reviewing and validating said inputting Credit Data by said Press Kit Owner Process,
verifying and certifying said reviewed and validated inputting Credit Data by a Third Party Process, and
classifying said verified and certified inputting Credit Data as CCIV&V's Level-3 Certified.

78. The method, as recited in claim 74, further comprising a Credit Construct Independent Identification, Validation, and Verification (CCIV&V) process for auditing inputting Credit Data, wherein said CCIV&V process includes the steps of:
sending said inputting Credit Data to said Data Input Process, reviewing and validating said inputting Credit Data by said Press Kit Owner Process,
verifying and certifying said reviewed and validated inputting Credit Data by a Third Party Process, and
classifying said verified and certified inputting Credit Data as CCIV&V's Level-3 Certified.

79. The method, as recited in claim 75, further comprising a Credit Construct Independent Identification, Validation, and Verification (CCIV&V) process for auditing inputting Credit Data, wherein said CCIV&V process includes the steps of:
sending said inputting Credit Data to said Data Input Process, reviewing and validating said inputting Credit Data by said Press Kit Owner Process,
verifying and certifying said reviewed and validated inputting Credit Data by a Third Party Process, and
classifying said verified and certified inputting Credit Data as CCIV&V's Level-3 Certified.

80. The method, as recited in claim 79, wherein said Report Writer reports said Conjunctive Project Sentences of Credit Construct is from said People Point of View, said Conjunctive Project Sentences of Credit Construct is from said Places Point of View, said Conjunctive Project Sentences of Credit Construct is from said Projects Point of View, and said Conjunctive Project Sentences of Credit Construct from said Things Point of View that have been Independently Identified, Validated, and Verified according to said CCIV&V's Level-1, Level-2 and Level-3.

81. The method, as recited in claim 80, further comprising Maintenance Modules which are Programmed Modules used to maintain and edit existing information, including said Press Kit Parameters which are set according to user preference, said lists of Organizations, said Awards, said Point In Time Table, and said Associative Values.

82. The method, as recited in claim 81, wherein Press Kit Parameters are maintained by a Maintain Press Kit Parameters Process which is a process for changing said Press Kit Parameters for one of said People, Places, Projects, and Things Press Kits Reports, selectively as part of said Data Input process and in response to user request, wherein Press Kit Construction Rules are used for constructing said Press Kits so as to control said selection of Featured Individual, said wording of Module titles, and said notation of said CCIV&V process.

83. The method, as recited in claim 82, further comprising a Maintain Organizations Process, which is used to maintain said list of Organizations, comprising the steps of adding new Organizations, removing said Organizations, editing said Organizations, maintaining Values found in said List of Organizations in order to eliminate duplicate entries, incorrectly combined entries, and ensuring said Values being correctly spelled.

84. The method, as recited in claim 83, wherein a set of Organization Update Rules is used to govern said decisions involving said adding, removing, and editing of Organizations, wherein said set of Organization Update Rules are used by said Maintain Organizations Process to determine what Values of information is allowed in said Relational Database.

85. The method, as recited in claim 84, further comprising a Maintain Associative Values Process which is used to maintain a list of Associative Values, comprising the steps of eliminating duplicate entries, incorrectly combined entries, ensuring said Values are correctly spelled so as to maintain said list of Associative Values, adding new Associative Values, removing said Associative Values, and editing said Associative Values.

86. The method, as recited in claim 85, wherein a set of Associative Value Rules is used by said Maintain Associative Values Process to determine what Values of information is allowed in said Relational Database, so as to govern decisions involving said adding, removing, and editing of said Associative Values.

87. The method, as recited in claim 86, further comprising a Maintain Awards Process which comprises the steps of maintaining said list of Awards in order to eliminate duplicate entries, incorrectly combined entries, ensuring said Values are correctly spelled so as to maintain said list of Awards, adding new Awards, removing said Awards, and editing said Awards.

88. The method, as recited in claim 87, wherein a set of Awards Rules that govern decisions involving said adding, removing, and editing said list of Awards are used by said Maintain Awards Process to determine what Values of information is allowed in said Relational Database.

89. The method, as recited in claim 88, further comprising a Maintain said Point In Time Process which comprising the steps of maintaining said Point In Time Table whenever there is a change to said Point In Time Table.

90. The method, as recited in claim 89, further comprising an Input Audit Process which comprises a step of maintaining said Audit Table by recording input and maintenance actions by said input and said maintenance processes.

91. The method, as recited in claim 90, wherein Timestamp Changes are processed by said Input Audit Process for attaching said current time for any input or maintenance action.

* * * * *